United States Patent
Kim et al.

(10) Patent No.: US 11,231,810 B2
(45) Date of Patent: Jan. 25, 2022

(54) DETECTION SENSOR AND DISPLAY DEVICE

(71) Applicant: Samsung Display Co., Ltd., Yongin-si (KR)

(72) Inventors: Do Ik Kim, Suwon-si (KR); Kang Won Lee, Seoul (KR); Choon Hyop Lee, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 43 days.

(21) Appl. No.: 16/906,563

(22) Filed: Jun. 19, 2020

(65) Prior Publication Data

US 2021/0004135 A1 Jan. 7, 2021

(30) Foreign Application Priority Data

Jul. 2, 2019 (KR) .......................... 10-2019-0079366

(51) Int. Cl.
*G06F 3/041* (2006.01)
*G06F 3/044* (2006.01)

(52) U.S. Cl.
CPC ........ *G06F 3/04182* (2019.05); *G06F 3/0412* (2013.01); *G06F 3/0446* (2019.05); *G06F 3/0443* (2019.05); *G06F 2203/04106* (2013.01); *G06F 2203/04111* (2013.01)

(58) Field of Classification Search
CPC .. G06F 3/04182; G06F 3/0443; G06F 3/0412; G06F 3/04166; G06F 3/0446; G06F 3/04164; G06F 2203/04111; G06F 2203/04112; G06F 2203/04106; G06F 2203/04108

USPC ......................................... 345/173, 174, 156
See application file for complete search history.

(56) References Cited

U.S. PATENT DOCUMENTS

| | | |
|---|---|---|
| 2014/0009428 A1 | 1/2014 | Coulson et al. |
| 2014/0184552 A1 | 7/2014 | Tanemura |
| 2014/0253499 A1 | 9/2014 | Lee et al. |
| 2015/0077391 A1 | 3/2015 | Bertrand |
| 2018/0095584 A1* | 4/2018 | Lee ..................... G06F 3/04164 |
| 2019/0102015 A1 | 4/2019 | Kim et al. |

(Continued)

FOREIGN PATENT DOCUMENTS

| | | |
|---|---|---|
| EP | 3633499 A1 | 4/2020 |
| KR | 10-2011-0096042 A | 8/2011 |
| KR | 10-1362843 B1 | 2/2014 |

(Continued)

*Primary Examiner* — Jimmy H Nguyen
(74) *Attorney, Agent, or Firm* — Lewis Roca Rothgerber Christie LLP

(57) ABSTRACT

A display device includes: a base substrate; a self-light emitting element on the base substrate; a thin film encapsulation layer on the self-light emitting element; a first sensing electrode on the thin film encapsulation layer and including an opening; a second sensing electrode on the thin film encapsulation layer and spaced apart from the first sensing electrode; a conductive pattern in the opening and spaced apart from the first sensing electrode; and a sensor controller configured to detect a change of a mutual capacitance between the first sensing electrode and the second sensing electrode in a first mode and configured to detect a change of a mutual capacitance between the conductive pattern and the first sensing electrode in a second mode different from the first mode.

27 Claims, 62 Drawing Sheets

(56) References Cited

U.S. PATENT DOCUMENTS

2020/0110484 A1   4/2020   Kim et al.

FOREIGN PATENT DOCUMENTS

KR   10-2014-0063315 A   5/2014
KR   10-2018-0090936 A   8/2018

* cited by examiner

DETECTION SENSOR AND DISPLAY DEVICE

CROSS-REFERENCE TO RELATED APPLICATION

The present application claims priority to and the benefit of Korean Patent Application No. 10-2019-0079366 filed on Jul. 2, 2019 in the Korean Intellectual Property Office, the disclosure of which is incorporated herein by reference in its entirety.

BACKGROUND

1. Field

Aspects of some example embodiments of the present invention relate to a detection sensor and a display device.

2. Description of the Related Art

A display device for displaying images may be used for various electronic appliances for providing images to users, such as smart phones, tablet PCs, digital cameras, notebook computers, navigators, and televisions. A display device may include a display panel for generating and displaying an image and various input devices or mechanisms.

For example, a touch sensor for recognizing a touch input, a proximity sensor for detecting the proximity of an object, and the like may be utilized with a display device. Additionally, a display devise may include various sensors having various functions, and some or all of the sensor functions may be integrated into or performed by one sensor.

The above information disclosed in this Background section is only for enhancement of understanding of the background and therefore the information discussed in this Background section does not necessarily constitute prior art.

SUMMARY

Some example embodiments according to the present invention may include a detection sensor capable of performing a proximity sensor function.

Some example embodiments according to the present invention may include a detection sensor in which a proximity sensor function and a touch sensor function are integrated with each other.

However, aspects and characteristics of the present invention are not restricted to those specifically set forth herein. The above and other aspects of embodiments according to the present invention will become more apparent to one of ordinary skill in the art to which the present invention pertains by referencing the detailed description of the present invention given below.

According to some example embodiments of the present invention, a detection sensor includes a first electrode member on a base layer and including a plurality of first sensing electrodes each including a first opening and electrically connected to each other along a first direction; a second electrode member on the base layer and including a plurality of second sensing electrodes electrically connected to each other along a second direction crossing the first direction; a first conductive member including a plurality of first conductive patterns electrically connected to each other along the first direction; a second conductive member including a plurality of second conductive patterns electrically connected to each other along the first direction and spaced apart from the first conductive member; and a sensor controller configured to detect a change of a mutual capacitance between the first electrode member and the second electrode member in a first mode and configured to detect a change of a mutual capacitance between the first conductive member and the second conductive member in a second mode different from the first mode, wherein the plurality of first electrode members are arranged along the second direction to form electrode rows, the first conductive pattern is in at least one of the electrode rows and is in the first opening, and the second conductive pattern is in an electrode row other than at least one of the electrode rows in which the first conductive pattern is located, and is in the first opening.

According to some example embodiments of the present invention, a detection sensor includes a first electrode member on a base layer and including a plurality of first sensing electrodes each including a first opening and electrically connected to each other along a first direction; a second electrode member on the base layer and including a plurality of second sensing electrodes each including a second opening and electrically connected to each other along a second direction crossing the first direction; a first conductive member including a plurality of first conductive patterns electrically connected to each other along the first direction; a second conductive member including a plurality of second conductive patterns electrically connected to each other along the first direction and spaced apart from the first conductive member; and a sensor controller configured to detect a change of a mutual capacitance between the first electrode member and the second electrode member in a first mode and configured to detect a change of a mutual capacitance between the second conductive member and the second electrode member or a change of a mutual capacitance between the second conductive member and the first electrode member in a second mode different from the first mode, wherein the first conductive pattern is in the first opening, and the second conductive pattern is in the second opening.

According to some example embodiments of the present invention, a display device includes a base substrate; a self-light emitting element on the base substrate; a thin film encapsulation layer on the self-light emitting element; a first sensing electrode located on the thin film encapsulation layer and including an opening; a second sensing electrode located on the thin film encapsulation layer and spaced apart from the first sensing electrode; a conductive pattern located in the opening and spaced apart from the first sensing electrode; and a sensor controller configured to detect a change of a mutual capacitance between the first sensing electrode and the second sensing electrode in a first mode and configured to detect a change of a mutual capacitance between the conductive pattern and the first sensing electrode in a second mode different from the first mode.

BRIEF DESCRIPTION OF THE DRAWINGS

The above and other aspects and characteristics of the present invention will become more apparent by describing in detail aspects of some example embodiments thereof with reference to the attached drawings, in which:

FIGS. 8 and 9 are example block diagrams of detection sensors according to an embodiment included in the display device according to some example embodiments, in which FIG. 8 is a block diagram showing an operation of the detection sensor in a first mode and FIG. 9 is a block diagram showing an operation of the detection sensor in a second mode;

FIGS. 32 and 33 are example block diagrams of detection sensors included in the display device according to some example embodiments, in which FIG. 32 is a block diagram showing an operation of the detection sensor in a first mode and FIG. 33 is a block diagram showing an operation of the detection sensor in a second mode;

FIGS. 45 and 46 are example block diagrams of detection sensors included in the display device according to some example embodiments, in which FIG. 45 is a block diagram showing an operation of the detection sensor in a first mode and FIG. 46 is a block diagram showing an operation of the detection sensor in a second mode;

DETAILED DESCRIPTION

Figure 1:
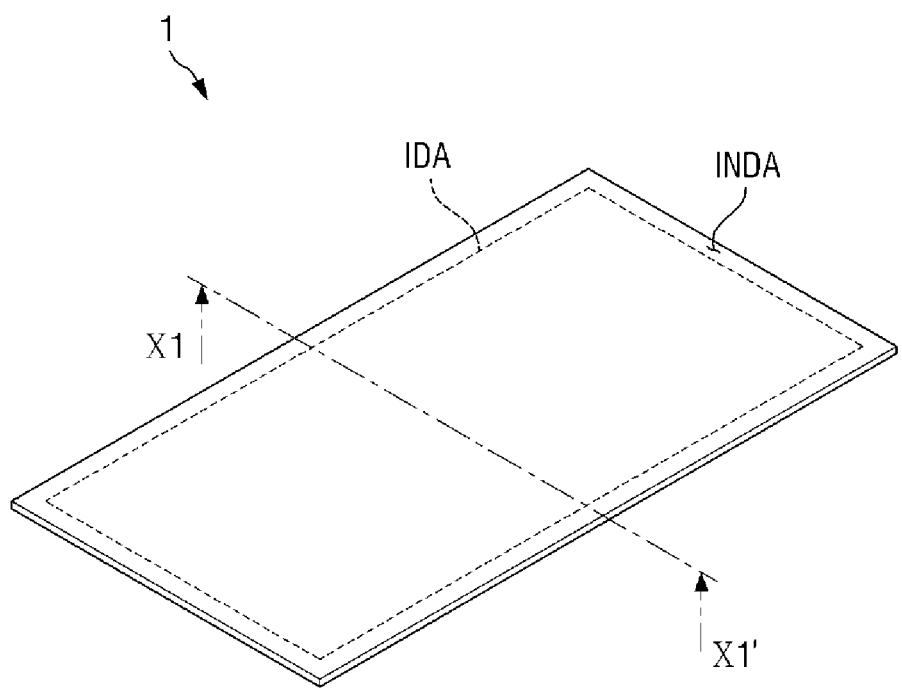
FIG. 1 is a perspective view of a display device according to some example embodiments.
Figure 1:
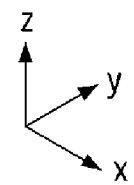

The present invention will now be described more fully hereinafter with reference to the accompanying drawings, in which example embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Embodiments are described herein with reference to plan and cross-section illustrations that are schematic illustrations of idealized embodiments of the present disclosure. As such, variations from the shapes of the illustrations as a result, for example, of manufacturing techniques and/or tolerances, are to be expected. Thus, embodiments of the present disclosure should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the present disclosure.

The size, number and thickness of each component illustrated in the drawings are shown for convenience of explanation, and the present invention is not necessarily limited to the size, number and thickness of each of the illustrated components.

Hereinafter, embodiments of the present invention will be described with reference to the attached drawings.

FIG. 1 is a schematic perspective view of a display device according to some example embodiments.

Referring to FIG. 1, a display device 1 may be applied to portable terminals and the like. The portable terminals may include table PCs, smart phones, personal digital assistants (PDAs), portable multimedia players (PMPs), game machines, and watch type electronic appliances. However, the present invention is not limited to the specific kind of the display device 1. For example, in another embodiment of the present invention, the display device 1 may be used in not only large electronic appliances such as televisions and external billboards but also middle and small electronic appliances such as personal computers, notebook computers, car navigators, smart watches, cameras, and monitors.

Unless otherwise defined, in this specification, the "on", "over", "top", "upper side", or "upper surface" refers to a side to which an arrow of a third direction z interesting a first direction x and a second direction y is directed based on the drawing, and the "beneath", "under", "bottom", "lower side", or "lower surface" refers to a side opposite to a direction in which the arrow of the third direction z is directed.

In some embodiments, the display device 1 may be a rigid display device or a flexible display device.

The display device 1 may include both short sides extending in the first direction x and both long sides extending in the second direction y crossing the first direction x. An edge where the long side meets the short side in the display device 1 may be at a right angle, but is not limited thereto. In another example, the edge of the display device 1 may form a curved surface. Alternatively, the edge of the display device 1 may be chamfered to reduce a risk of breakage. In addition, the planar shape of the display device 1 is not limited to that illustrated, and may be applied in a circular or other shape.

When dividing an area of the display device 1 depending on whether an image is displayed or not, the display device 1 includes a display area IDA where an image is displayed, and a peripheral area INDA adjacent to the display area IDA. The display area IDA is an area where an image is displayed, and the peripheral area INDA is an area where an image is not displayed.

In some embodiments, the planar shape of the display area IDA may be substantially rectangular. In some embodiments, the display area IDA may be substantially flat, but is not limited thereto. In some other embodiments, portions adjacent to both long sides of the display area IDA may have curved surfaces or may be bent toward the lower side of the display device 1. In some other embodiments, portions adjacent to both short sides of the display area IDA may have curved surfaces or may be bent toward the lower side of the display device 1. In some other embodiments, both the portions adjacent to both long sides of the display area IDA and the portions adjacent to both short sides of the display area IDA may have curved surfaces or may be bent toward the lower side of the display device 1.

The peripheral area INDA may surround the display area IDA.

The display device 1 may include a detection sensor. In some embodiments, the detection sensor may be used as an input device of the display device 1, and may replace a physical button. In some embodiments, the detection sensor may detect the proximity of an object on the display device 1.

Figure 2:
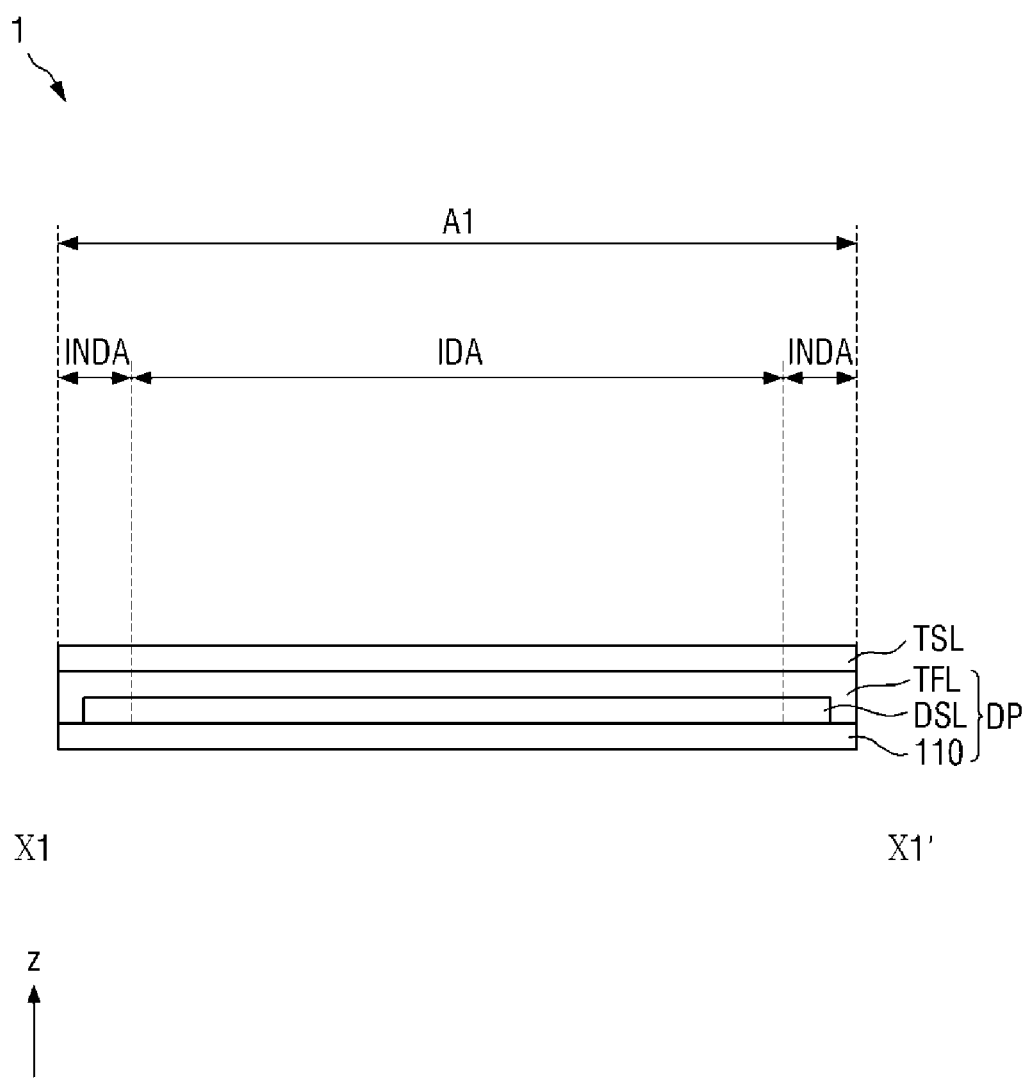
FIG. 2 is a cross-sectional view taken along the line X1-X1' of FIG. 1.
Figure 3:
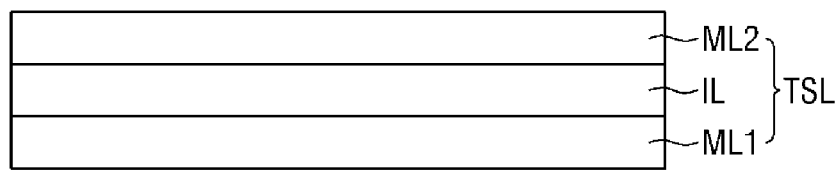
FIG. 3 is an enlarged cross-sectional view of the sensor layer shown in FIG. 2.
Figure 4:
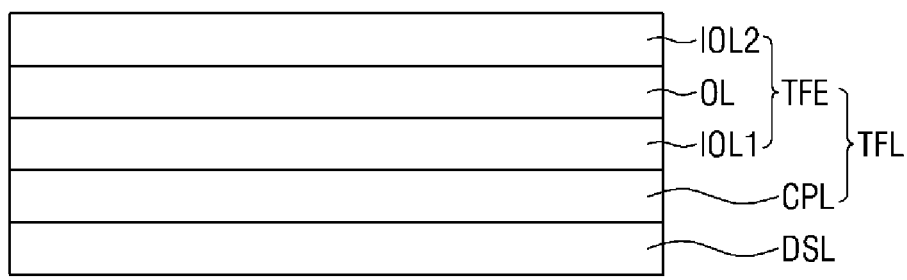
FIG. 4 is an enlarged cross-sectional view of the upper insulating layer shown in FIG. 2.

FIG. 2 is a cross-sectional view taken along the line X1-X1' of FIG. 1, FIG. 3 is an enlarged cross-sectional view of the sensor layer shown in FIG. 2, and FIG. 4 is an enlarged cross-sectional view of the upper insulating layer shown in FIG. 2.

Referring to FIGS. 2 to 4, the display device 1 includes a display panel DP and a detection sensor. The detection sensor may include a sensor layer TSL located on the display panel DP. The display panel DP generates an image. The detection sensor may acquire coordinate information about an external input (touch event) and detect the proximity of object.

According to some example embodiments, the display device 1 may further include a protection member located on the lower side of the display panel DP, an antireflection member located on the upper side of the sensor layer TSL, and/or a window member.

The kind of the display panel DP is not particularly limited. For example, the display panel DP may be a self-light emitting display panel such as an organic light emitting display panel (OLED panel), a quantum dot light emitting display panel (QLED panel), a micro light emitting diode display panel, or a nano light emitting diode display panel. In some embodiments, the self-light emitting display panel may include a self-light emitting element. According to some example embodiments, the self-light emitting element may include at least one of an organic light emitting diode, a quantum dot light emitting diode, an inorganic material-based micro light emitting diode (for example, a micro light emitting diode), or an inorganic material-based nano light emitting diode (for example, a nano light emitting diode). Hereinafter, for convenience of explanation, a case where the self-light emitting element is an organic light emitting diode will be described as an example.

The display panel DP may include a base substrate 110, an element layer DSL located on the base substrate 110, and an upper insulating layer TFL located on the element layer DSL.

The base substrate 110 is a substrate supporting the element layer DSL. In some embodiments, the base substrate 110 may include an insulating material. In some embodiments, the base substrate 110 may be a flexible substrate, and may include an insulating material such as a polymer resin. Examples of the polymer resin include polyethersulphone (PES), polyacrylate (PA), polyarylate (PAR), polyetherimide (PEI), polyethylene naphthalate (PEN).), polyethylene terepthalate (PET), polyphenylene sulfide (PPS), polyallylate, polyimide (PI), polycarbonate (PC), cellulose triacetate (CAT), cellulose acetate propionate (CAP), and combinations thereof. However, the present invention is not limited thereto, and the base substrate 110 may be a rigid substrate.

The element layer DSL is located on the base substrate 110. In some embodiments, the element layer DSL may include a plurality of pixels and a plurality of display signal lines located on the base substrate 110. Each of the pixels may include a thin film transistor (TFT), a capacitor, and a light emitting element, which will be described later. The plurality of display signal lines may include a scan line transmitting a scan signal to each of the pixels and a data line transmitting a data signal to each of the pixels.

In some embodiments, the pixels included in the element layer DSL may be arranged in the display area IDA.

The element layer DSL may be located on the base substrate, and may further include elements and wirings arranged in the peripheral area INDA. The elements and wirings may generate various signals applied to pixels, and may transmit the corresponding signals to the pixels. The upper insulating layer TFL may be located on the element layer DSL. The upper insulating layer TFL may protect the element layer DSL.

As shown in FIG. 4, the upper insulating layer TFL may include a thin film encapsulation layer TFE, and may further include a capping layer CPL.

The thin film encapsulation layer TFE may include a first inorganic layer IOL1, an organic layer OL, and a second inorganic layer IOL2.

The capping layer CPL may be located on the element layer DSL, and in some embodiments, may be located on a cathode electrode of the element layer DSL. In some embodiments, the capping layer CPL may be in contact with the cathode electrode. The capping layer CPL may include an organic material.

The first inorganic layer IOL1 is located on the capping layer CPL to be in contact with the capping layer CPL. The organic layer OL is located on the first inorganic layer IOL1 to be in contact with the first inorganic layer IOL1. The second inorganic layer IOL2 is located on the organic layer OL to be in contact with the organic layer OL.

The capping layer CPL protects the cathode electrode from a subsequent process such as a sputtering process, and improves the light emission efficiency of a self-light emitting element. The capping layer CPL may have a refractive index greater than that of the first inorganic layer IOL1.

The first inorganic layer IOL1 and the second inorganic layer IOL2 may protect the element layer DSL from moisture/oxygen. The organic layer OL may protect the element layer DSL from foreign substances such as dust particles. The first inorganic layer IOL1 and the second inorganic layer IOL2 may be any one of a silicon nitride layer, a silicon oxy nitride layer, and a silicon oxide layer. Each of the first inorganic layer IOL1 and the second inorganic layer IOL2 may be any one of a silicon nitride layer, a silicon oxynitride layer, and a silicon oxide layer. According to some example embodiments, each of the first inorganic layer IOL1 and the second inorganic layer IOL2 may include a titanium oxide layer, an aluminum oxide layer, or the like. The organic layer OL may include an acrylic organic layer, but is not limited thereto.

In an embodiment of the present invention, an inorganic layer such as a lithium fluorine (LiF) layer may be further located between the capping layer CPL and the first inorganic layer IOL1. The lithium fluorine (LiF) layer can improve the light emission efficiency of a self-light emitting element.

The sensor layer TSL may be located on the upper insulating layer TFL. In some embodiments, the sensor layer TSL may be located on the thin film encapsulation layer TFE, and there may be no separate bonding layer (for example, an adhesive layer, etc.) between the thin film encapsulation layer TFE and the sensor layer TSL. Illustratively, at least one of the electrode members, conductive members or wirings included in the sensor layer TSL may be located directly on the thin film encapsulation layer TFE. Alternatively, when a separate buffer layer or insulating layer is located between the sensor layer TSL and the thin film encapsulation layer TFE, at least one of the electrode members, conductive members, or wiring of the sensor layer TSL may be located directly on the insulating layer on the thin film encapsulation layer TFE. That is, the base layer providing a base surface to the sensor layer TSL may be the thin film encapsulation layer TFE itself or may include the thin film encapsulation layer TFE.

The detection sensor including the sensor layer TSL may recognize a touch input by a user and a location of the touch input. Here, the touch input may include a case where an object such as a finger or a stylus is in direct contact with the display device 1. The detection sensor including the sensor layer TSL may detect the proximity of a user or the proximity of an object. Here, the proximity is a concept that includes a proximity event, such as a case where a user or an object is not in physical or mechanical contact with the display device 1, although it is close to the display surface of the display device 1. Further, the proximity may include a proximity touch, for example, a case where an object is located over the display device 1 in proximity to the display surface of the display device 1 without being contact with the display surface thereof. Illustratively, the detection sensor including the sensor layer TSL may detect that an object such as a user's face, a user's ear, or the like is located in proximity to the display surface of the display device 1 or located within a distance (e.g., a set or predetermined distance) from the display surface of the display device 1.

That is, the detection sensor may function as a proximity sensor, and may also function as a touch sensor.

In some embodiments, the detection sensor may combine a touch detecting function and a proximity detecting function, and may detect various types of touches such as a short (tap) touch, a long touch, a multi touch, a drag touch, a flick touch, a pinch-in touch, a pinch-out touch, a swipe touch, and a hovering touch.

In some embodiments, the detection sensor including the sensor layer TSL may detect whether a touch and a proximity occurs in a capacitance manner. In the capacitance manner, the touch event or the proximity event may be detected in a self-capacitance manner or a mutual capacitance manner. Hereinafter, for convenience of explanation, a case where the sensor layer TSL has a mutual capacitance type structure will be described as an example, but the present invention is not limited thereto.

In some embodiments, a portion of the sensor layer TSL located in the display area IDA may include an electrode member, and a portion of the sensor layer TSL located in the peripheral area INDA may include a wiring for transmitting a signal to the electrode member and/or receiving a signal from the electrode member.

Explaining the laminate structure of the sensor layer TSL, in some embodiments, as shown in FIG. 3, the sensor layer TSL may include a first conductive layer ML1, an insulating layer IL, and a second conductive layer ML2.

The first conductive layer ML1 may include an opaque conductive material. In some embodiments, the first conductive layer ML1 may include a metal such as gold (Au), silver (Ag), aluminum (AL), molybdenum (Mo), chromium (Cr), titanium (Ti), nickel (Ni), neodymium (Nd), copper (Cu), or platinum (Pt), or an alloy thereof. In some embodiments, the first conductive layer ML1 may have a single-layer structure and may have a multi-layer structure. Illustratively, the first conductive layer ML1 may have a three-layer structure of titanium/aluminum/titanium.

The insulating layer IL may be located on the first conductive layer ML1. The insulating layer IL may be located between the first conductive layer ML1 and the second conductive layer ML2. The insulating layer IL may include an insulating material. In some embodiments, the insulating material may be an inorganic insulating material or an organic insulating material. The inorganic insulating material may include at least one of aluminum oxide, titanium oxide, silicon oxide, silicon oxynitride, zirconium oxide, or hafnium oxide. The organic insulating material may include at least one of acrylic resin, methacryl resin, polyisoprene, vinyl resin, epoxy resin, urethane resin, cellulose resin, siloxane resin, polyimide resin, polyamide resin, or perylene resin.

The second conductive layer ML2 may be located on the insulating layer IL. In some embodiments, the second conductive layer ML2 may include a conductive material having light transmittance. Illustratively, the conductive material having light transmittance may be silver nanowires (AgNW), indium tin oxide (ITO), indium zinc oxide (IZO), antimony zinc oxide (AZO), indium tin zinc oxide (ITZO), zinc oxide (ZnO), tin oxide (SnO2)), carbon nanotubes, graphene, or a conductive polymer (for example, PEDOT). Alternatively, the second conductive layer ML2 may include a conductive material such as a metal or an alloy thereof as long as light transmittance is secured. The metal may be gold (Au), silver (Ag), aluminum (AL), molybdenum (Mo), chromium (Cr), titanium (Ti), nickel (Ni), neodymium (Nd), copper (Cu), or platinum (Pt) In some embodiments, when the second conductive layer ML2 is made of a metal or an alloy thereof, the second conductive layer ML2 may have a mesh structure to prevent the second conductive layer ML2 from being visually recognized by the user. Hereinafter, a case where the second conductive layer ML2 has a mesh structure will be described as an example.

Figure 5:
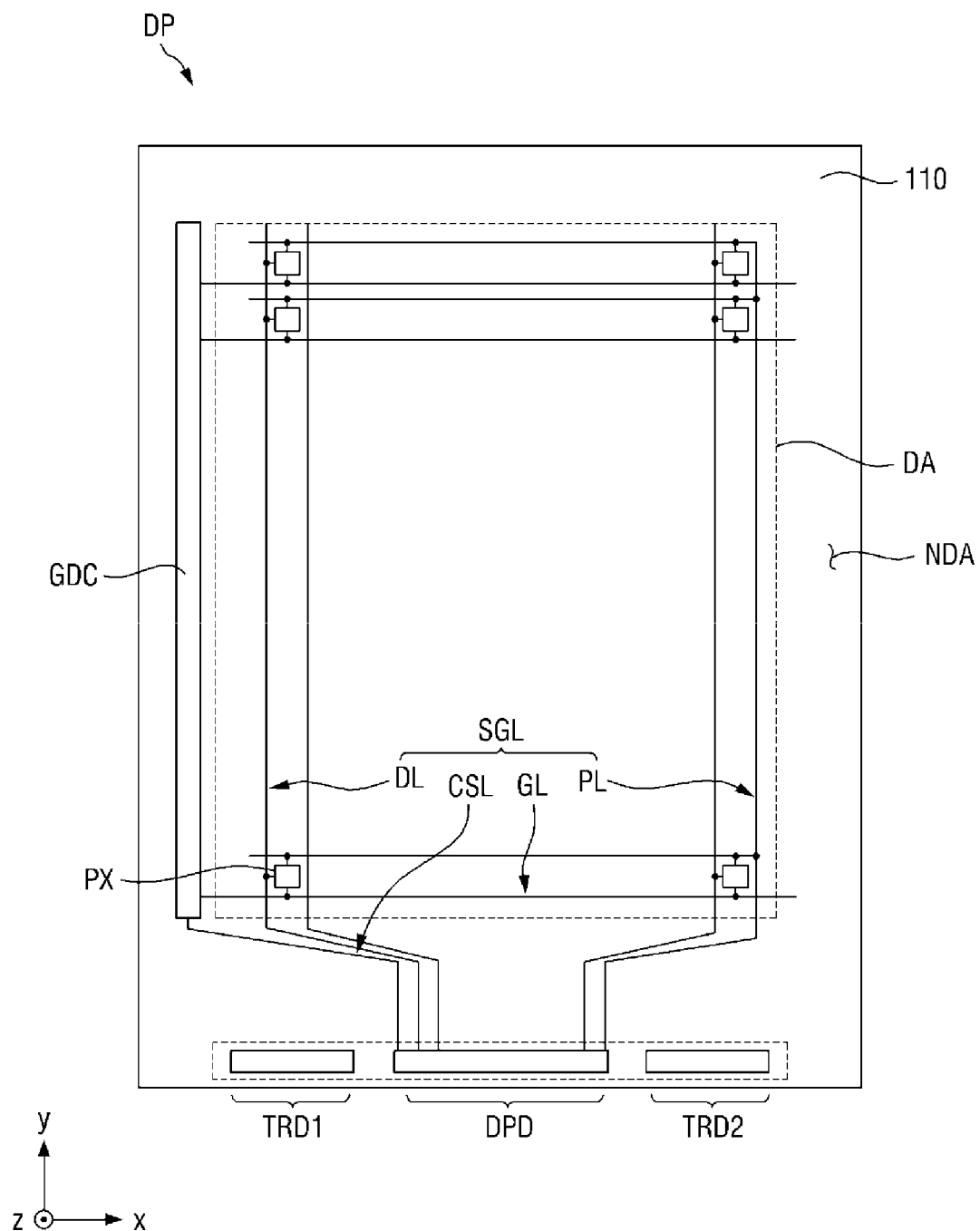
FIG. 5 is a schematic plan view of a display panel included in the display device according to some example embodiments.
Figure 6A:
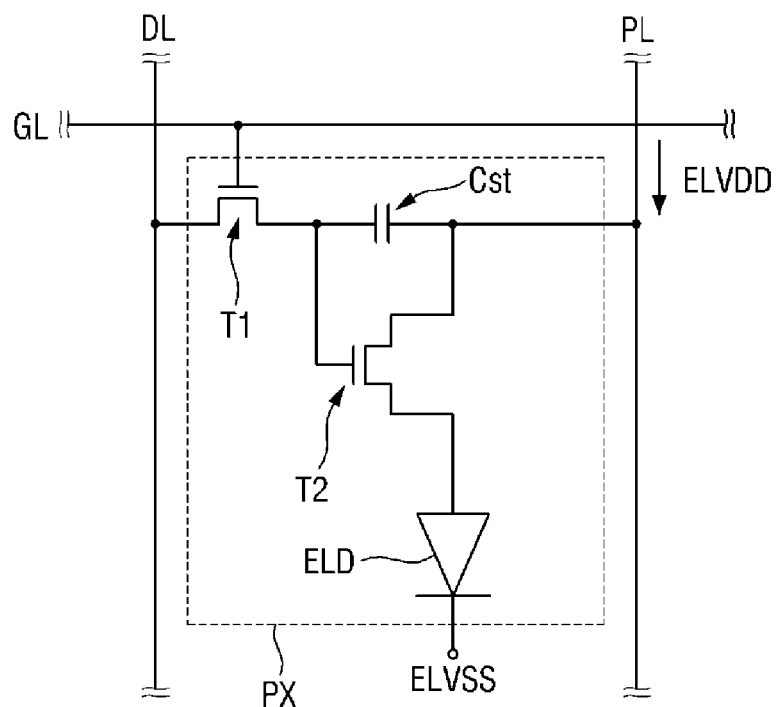
FIG. 6A is an example equivalent circuit diagram of the pixel shown in FIG. 5.
Figure 6B:
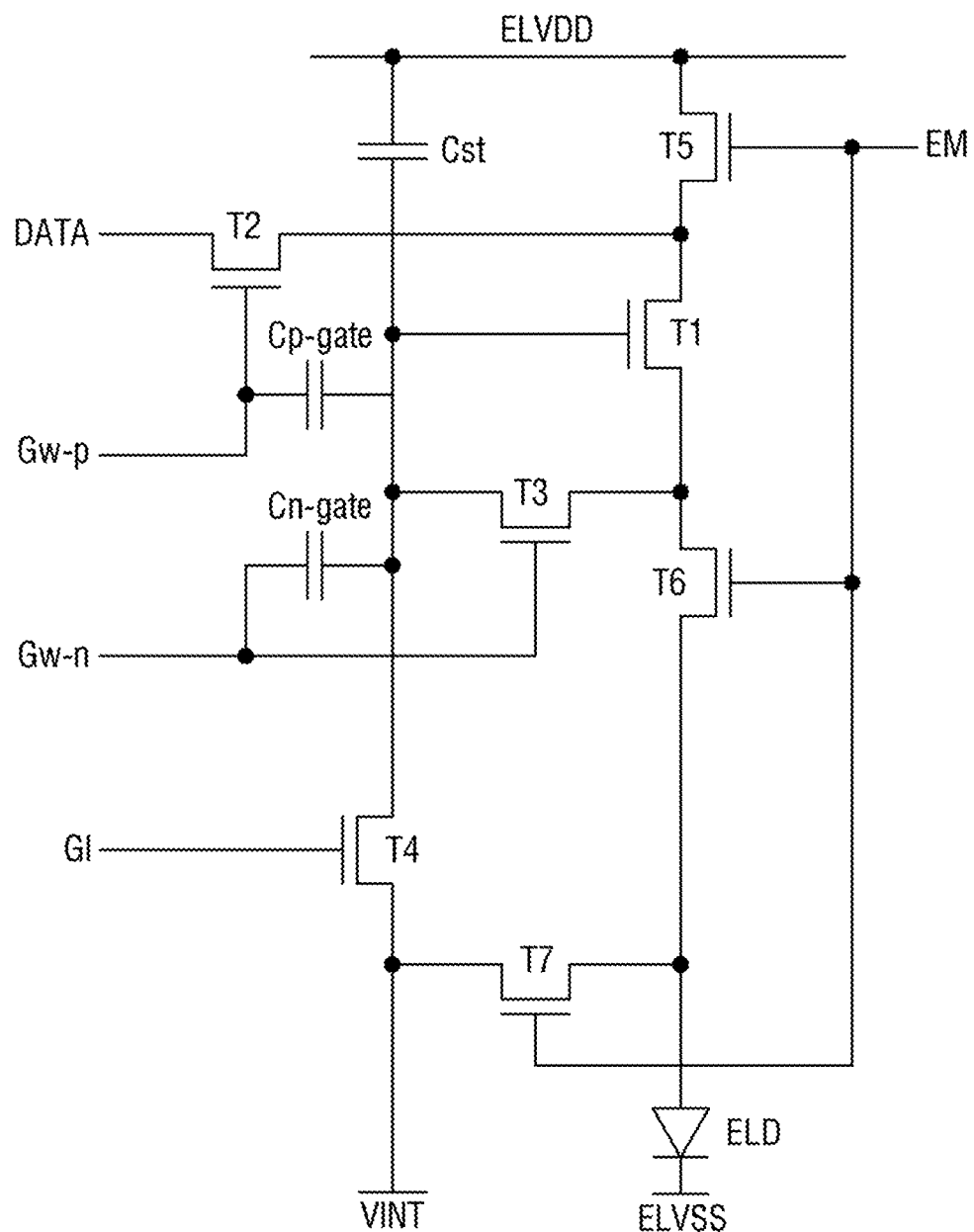
FIG. 6B is an example equivalent circuit diagram of a modified example of the pixel shown in FIG. 6A.
Figure 7:
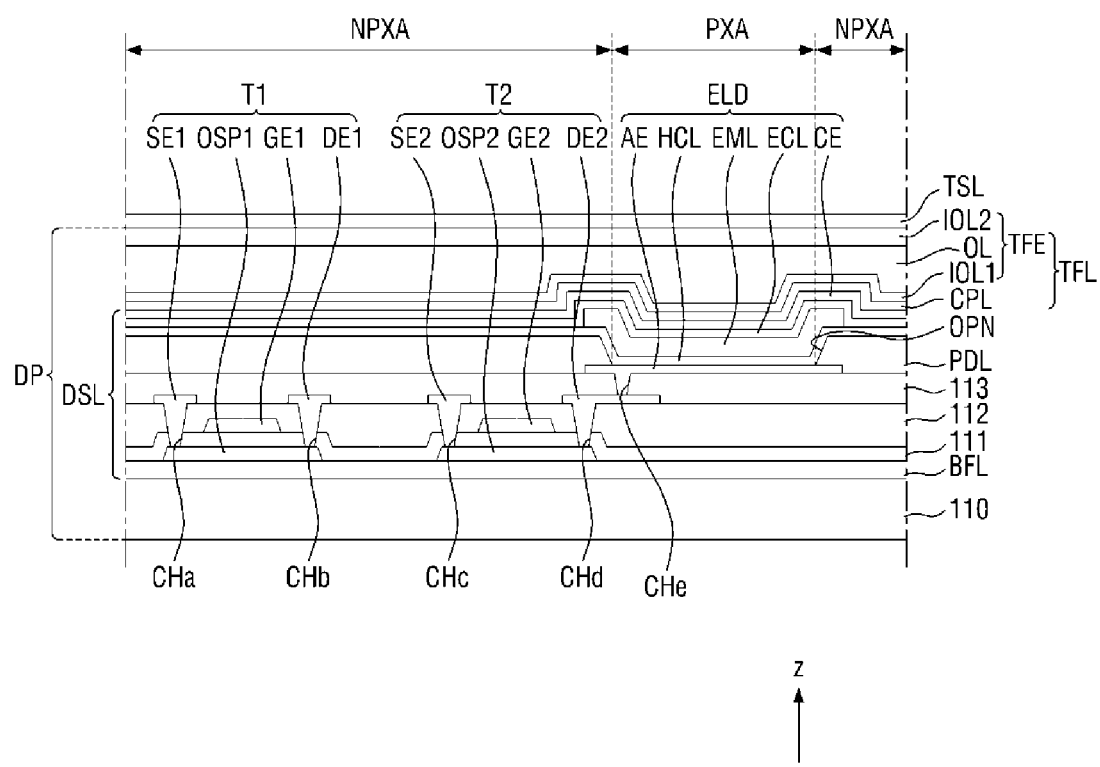
FIG. 7 is a schematic cross-sectional view of the pixel shown in FIG. 6A and a display device including this pixel.

FIG. 5 is a schematic plan view of a display panel included in the display device according to some example embodiments, FIG. 6A is an example equivalent circuit diagram of the pixel shown in FIG. 5, FIG. 6B is an example equivalent circuit diagram of a modified example of the pixel shown in FIG. 6A, and FIG. 7 is a schematic cross-sectional view of the pixel shown in FIG. 6A and a display device including this pixel.

Referring to FIGS. 5 to 7, a display area DA and a non-display area NDA corresponding to the display area IDA and peripheral area INDA of the display device 1 shown in FIG. 1 are defined in the display panel DP or the base substrate 110. Hereinafter, the case that one area and another area correspond to each other means that the two areas overlap each other and is not limited to a case that the two areas have the same area.

In the display area DA, a plurality of signal lines SGL and a plurality of pixels PX may be arranged on the base substrate 110.

In the non-display area NDA, a signal pad portion DPD may be located on the base substrate 110. In some embodiments, in the non-display area NDA, sensor pad portions TPD1 and TPD2 connected to the wirings included in the sensor layer may further be located on the base substrate 110. In some embodiments, the signal pad portion DPD and the sensor pad portions TPD1 and TPD2 may be located at one side of the display area DA, for example, may be located at the lower side of the display area DA based on the drawing.

In the non-display area NDA, a scan driver GDC may be located on the base substrate 110. The scan driver GDC may generate a scan signal and transmit the scan signal to a scan line GL. In some embodiments, the scan driver GDC may be located at the left side of the display area DA based on the drawing. According to some example embodiments, the scan driver GDC may be further located at the right side of the display area DA.

The signal lines SGL, the pixels PX, and the signal pad portion DPD may be included in the element layer DSL. In some embodiments, the sensor layer DSL may further include the sensor pad portions TPD1 and TPD2.

The signal lines SGL may include a scan line GL, a data line DL, and a power supply line PL.

The scan line GL is connected to the scan driver GDC and the corresponding pixel PX of the plurality of pixels PX to transmit a scan signal to the pixel PX.

The data line DL is connected to the corresponding pixel PX of the plurality of pixels PX to transmit a data signal to the pixel PX.

The power supply line PL is connected to the plurality of pixels PX to transmit a driving voltage to the pixels PX.

The signal pad portion DPD is located in the non-display area NDA, and may be connected to the signal lines SGL, for example, the data line DL. The signal pad portion DPD may receive a data signal from the outside.

In some embodiments, each scan line GL may extend along the first direction x, and the data line DL may extend along the second direction y. In some embodiments, the power supply line PL may extend along the same second direction y as the data line DL, but is not limited thereto.

FIG. 6A shows any one scan line GL, any one data line DL, a power supply line PL, and a pixel PX connected thereto.

The pixel PX includes a self-light emitting element ELD, and a first transistor T1 (or a switching transistor), a second transistor T2 (or a driving transistor), and a storage capacitor Cst, as a pixel driving circuit for driving the self-light emitting element ELD. A first power supply voltage ELVDD is provided to the second transistor T2, and a second power supply voltage ELVSS is provided to the self-light emitting element ELD. The second power supply voltage ELVSS may be lower than the first power supply voltage ELVDD.

The first transistor T1 outputs a data signal applied to the data line DL in response to a scan signal applied to the scan line GL. The storage capacitor Cst charges a voltage corresponding to the data signal received from the first transistor T1. The second transistor T2 is connected to the self-light emitting element ELD. The second transistor T2 controls a driving current flowing through the self-emitting element ELD in response to the amount of charge stored in the storage capacitor Cst.

The equivalent circuit is only one embodiment, and is not limited thereto. The pixel PX may further include a plurality of transistors, and may include a larger number of capacitors. The self-light emitting element ELD may be connected between the power supply line PL and the second transistor T2.

In some embodiments, as described above, the self-light emitting element ELD may be an organic light emitting diode. However, the present invention is not limited thereto, and the self-light emitting element ELD may be any one of a quantum dot light emitting diode, an inorganic material-based light emitting diode, an inorganic material-based micro light emitting diode, and an inorganic material-based nano light emitting diode.

However, the circuit structure of the pixel PX is not limited to that shown in FIG. 6A, and may be variously modified.

FIG. 6B is an example equivalent circuit diagram of a modified example of the pixel shown in FIG. 6A. For convenience of explanation, the scan line GL, the power line PL, and the data line DL are omitted in FIG. 6B, and a signal applied to the circuit is shown in FIG. 6B.

Referring to FIG. 6B in addition to FIG. 6A, the circuit of the pixel according to a modified example includes a self-light emitting element ELD, a plurality of transistors T1 to T7, and a storage capacitor Cst. A data signal DATA, a first scan signal Gw-p, a second scan signal Gw-n, a third scan signal GI, a light emission control signal EM, a first power supply voltage ELVDD, a second power supply voltage ELVSS, and an initialization voltage VINT are applied to the circuit of the pixel of FIG. 6B.

The self-light emitting element ELD includes an anode electrode and a cathode electrode. The storage capacitor Cst includes a first electrode and a second electrode.

The plurality of transistors may include first to seventh transistors T1 to T7. Each of the transistors T1 to T7 includes a gate electrode, a first electrode, and a second electrode. One of the first and second electrodes of each of the transistors T1 to T7 is a source electrode, and the other thereof is a drain electrode.

Each of the transistors T1 to T7 may be a thin film transistor. Each of the transistors T1 to T7 may be any one of a PMOS transistor and an NMOS transistor. In some embodiments, the first transistor T1 as a driving transistor, the second transistor T2 as a data transmission transistor, the fifth transistor T5 as a first light emission control transistor, and the sixth transistor T6 as a second light emission control transistor are PMOS transistors. In contrast, the third transistor T3 as a compensation transistor, the fourth transistor T4 as a first initialization transistor, and the seventh transistor T7 as a second initialization transistor are NMOS transistors. The PMOS transistor and the NMOS transistor have different characteristics. The third transistor T3, the fourth transistor T4, and the seventh transistor T7 may be formed as NMOS transistors having relatively high turn-off characteristics, thereby reducing the leakage of a driving current Id during the light emission period of the self-light emitting element ELD.

However, the present invention is not limited thereto, and all of the transistors T1 to T7 may be PMOS transistors. Hereinafter, for convenience of explanation, a case where the first transistor T1, the second transistor T2, the fifth transistor T5, and the sixth transistor T6 are PMOS transistors, and the third transistor T3, the fourth transistor T4, and the seventh transistor T7 are NMOS transistors will be described as an example.

Hereinafter, each configuration will be described in detail.

The gate electrode of the first transistor T1 is connected to the first electrode of the storage capacitor Cst. The first electrode of the first transistor T1 is connected to a first power supply voltage ELVDD terminal via the fifth transistor T5. The second electrode of the first transistor T1 is connected to the anode electrode of the self-light emitting element ELD via the sixth transistor T6. The first transistor T1 receives a data signal DATA according to the switching operation of the second transistor T2 and supplies a driving current Id to the self-light emitting device ELD.

The gate electrode of the second transistor T2 is connected to a first scan signal Gw-p terminal. The first electrode of the second transistor T2 is connected to a data signal DATA terminal. The second electrode of the second transistor T2 is connected to the first power voltage ELVDD terminal via the fifth transistor T5 while being connected to the first electrode of the first transistor T1. The second transistor T2 is turned on according to the first scan signal Gw-p to perform a switching operation of transmitting the data signal DATA to the first electrode of the first transistor T1.

The gate electrode of the third transistor T3 is connected to a second scan signal Gw-n terminal. The first electrode of the third transistor T3 is connected to the anode of the self-light emitting element ELD via the sixth transistor T6 while being connected to the second electrode of the first transistor T1. The second electrode of the third transistor T3 is connected together with the first electrode of the storage capacitor Cst, the first electrode of the fourth transistor T4, and the gate electrode of the first transistor T1. The third transistor T3 is turned on according to the second scan signal Gn-p to connect the gate electrode and second electrode of the first transistor T1 to each other to diode-connect the first transistor T1. Thus, a voltage difference may be generated between the first electrode and gate electrode of the first transistor T1 by a threshold voltage of the first transistor T1, and the data signal DATA whose threshold voltage is compensated may be supplied to the gate electrode of the first transistor T1, thereby compensating for the threshold voltage deviation of the first transistor T1.

The gate electrode of the fourth transistor T4 is connected to a third scan signal GI terminal. The second electrode of the fourth transistor T4 is connected to an initialization voltage VINT terminal. The first electrode of the fourth transistor T4 is connected together with the first electrode of the sustain capacitor Cst, the second electrode of the third transistor T3, and the gate electrode of the first transistor T1. The fourth transistor T4 is turned on according to the third scan signal GI to transmit the initialization voltage VINT to the gate electrode of the first transistor T1 to perform an operation of initializing the voltage of the gate electrode of the first transistor T1.

The gate electrode of the fifth transistor T5 is connected to a light emission control signal EM terminal. The first electrode of the fifth transistor T5 is connected to a first power supply voltage ELVDD terminal. The second electrode of the fifth transistor T5 is connected to the first electrode of the first transistor T1 and the second electrode of the second transistor T2.

The gate electrode of the sixth transistor T6 is connected to the light emission control signal EM terminal. The first electrode of the sixth transistor T6 is connected to the second electrode of the first transistor T1 and the first electrode of the third transistor T3. The second electrode of the sixth transistor T6 is connected to the anode electrode of the self-light emitting element ELD.

The fifth transistor T5 and the sixth transistor T6 are simultaneously turned on according to the light emission control signal EM, so that the driving current Id flows through the self-light emitting element ELD.

The gate electrode of the seventh transistor T7 is connected to the light emission control signal EM terminal. The first electrode of the seventh transistor T7 is connected to the anode electrode of the self-light emitting element ELD. The second electrode of the seventh transistor T7 is connected to the initialization voltage VINT terminal. The seventh transistor T7 is turned on according to the light emission control signal EM to initialize the anode electrode of the self-light emitting element ELD.

Although the seventh transistor T7 receives the same light emission control signal EM as the fifth transistor T5 and the sixth transistor T6, the seventh transistor T7, the fifth transistor T5, and the sixth transistor T6 may be turned on at different time from each other because the seventh transistor T7 is an NMOS transistor, whereas the fifth transistor T5 and the sixth transistor T6 are PMOS transistors. That is, when the light emission control signal EM is at a high level, the seventh transistor T7 is turned on, and the fifth transistor T5 and the sixth transistor T6 are turned off. When the light emission control signal EM is at a high level, the seventh transistor T7 is turned off, and the fifth transistor T5 and the sixth transistor T6 are turned on. Accordingly, the initialization operation by the seventh transistor T7 may not performed at the light emission time when the fifth transistor T5 and the sixth transistor T6 are turned on, and may be performed at the non-light emission time when the fifth transistor T5 and the sixth transistor T6 are turned off.

Although it is described in the present embodiment that the gate electrode of the seventh transistor T7 receives the light emission control signal EM, according to some example embodiments, the pixel circuit may be configured such that the gate electrode of the seventh transistor T7 receives the third scan signal GI.

The second electrode of the storage capacitor Cst is connected to the first power supply voltage ELVDD terminal. The first electrode of the storage capacitor Cst is connected together with the gate electrode of the first transistor T1, the second electrode of the third transistor T3, and the first electrode of the fourth transistor T4. The cathode electrode of the self-light emitting element ELD is connected to the second power supply voltage ELVSS terminal. The self-light emitting element ELD receives the driving current Id from the first transistor T1 and emits light to display an image.

The pixel circuit according to some example embodiments may further include parasitic capacitors Cp-gate and Cn-gate which influence a kickback voltage on the gate electrode of the first transistor T1. The parasitic capacitors may include a first parasitic capacitor Cp-gate located between the gate electrode of the first transistor T1 and the gate electrode of the second transistor T2, and a second parasitic capacitor Cn-gate located between the gate electrode of the first transistor T1 and the gate electrode of the third transistor T3. However, the present invention is not limited thereto, and the first parasitic capacitor Cp-gate and the second parasitic capacitor Cn-gate may be omitted.

In addition, the circuit structure of the pixel may be variously modified. Illustratively, the circuit structure of the pixel may be variously modified into a structure including three transistors and two capacitors (for example, a storage capacitor and a luminance compensation capacitor) except for the parasitic capacitor, a structure including three transistors and one capacitor (for example, a storage capacitor) except for the parasitic capacitor, a structure including eight transistors and one capacitor (for example, a storage capacitor) except for the parasitic capacitor, and the like.

FIG. 7 shows a partial cross-section of the display panel DP corresponding to the equivalent circuit shown in FIG. 6A, and also shows the sensor layer TSL.

Hereinafter, an example laminate structure of the display panel DP will be described.

A buffer layer BFL may be located on the base substrate 110.

A semiconductor pattern OSP1 (hereinafter referred to as a first semiconductor pattern) of the first transistor T1 and a semiconductor pattern OSP2 (hereinafter referred to as a second semiconductor pattern) of the second transistor T2 may be located on the buffer layer BFL. The first semiconductor pattern OSP1 and the second semiconductor pattern OSP2 may be selected from amorphous silicon, polysilicon, and a metal oxide semiconductor. In some embodiments, any one of the first semiconductor pattern OSP1 and the second semiconductor pattern OSP2 may be made of polysilicon, and the other of the first semiconductor pattern OSP1 and the second semiconductor pattern OSP2 may be made of a metal oxide semiconductor.

A first insulating layer 111 is located on the first semiconductor pattern OSP1 and the second semiconductor pattern OSP2.

A control electrode GE1 (hereinafter, referred to as a first control electrode) of the first transistor T1 and a control electrode GE2 (hereinafter, referred to as a second control electrode) of the second transistor T2 are located on the first insulating layer 111. When the first control electrode GE1 and the second control electrode GE2 are located on the same layer, the first control electrode GE1 and the second control electrode GE2 may be prepared according to the same photolithography process as the scan lines GL (refer to FIG. 5). However, the present invention is not limited thereto, and the first control electrode GE1 and the second control electrode GE2 may be located on different layers from each other. In this case, only one of the first control electrode GE1 and the second control electrode GE2 may be prepared according to the same photolithography process as the scan lines GL (refer to FIG. 5).

A second insulating layer 112 covering the first control electrode GE1 and the second control electrode GE2 is located on the first insulating layer 111. An input electrode SE1 (hereinafter, referred to as a first input electrode) and an output electrode DE1 (hereinafter, referred to as a first output electrode) of the first transistor T1, and an input electrode SE2 (hereinafter, referred to as a second input electrode) and an output electrode DE2 (hereinafter, referred to as a second output electrode) of the second transistor T2 are located on the second insulating layer 112.

In some embodiments, the first insulating layer 111 and the second insulating layer 112 may include an inorganic material or an organic material.

The first input electrode SE1 and the first output electrode DE1 are connected to the first semiconductor pattern OSP1 through a first through hole CHa and a second through hole CHb penetrating the first insulating layer 111 and the second insulating layer 112, respectively. The second input electrode SE2 and the second output electrode DE2 are connected to the second semiconductor pattern OSP2 through a third through hole CHc and a fourth through hole CHd penetrating the first insulating layer 111 and the second insulating layer 112, respectively. Meanwhile, according to some example embodiments of the present invention, at least on of the first transistor T1 and the second transistor T2 may be modified to have a bottom gate structure.

An organic layer 113 is located on the second insulating layer 112 to cover the first input electrode SE1, the second input electrode SE2, the first output electrode DE1, and the second output electrode DE2. The organic layer 113 may provide a flat surface.

A pixel defining layer PDL and a self-light emitting element ELD may be located on the organic layer 113. The pixel defining layer PDL may include an organic material.

An anode electrode AE is located on the organic layer 113. The anode electrode AE is connected to the second output electrode DE2 through a fifth through hole CHe penetrating the organic layer 113. An opening OPN exposing at least a portion of the anode electrode AE may be defined in the pixel defining layer PDL.

The pixel PX may be located in the display area DA. The display area DA may include a light emitting area PXA and a non-light emitting area NPXA adjacent to the light emitting area PXA. The non-light emitting area NPXA may surround the light emitting area PXA. According to some example embodiments, the light emitting area PXA is defined to correspond to a portion of the anode electrode AE exposed by the opening OPN.

According to some example embodiments, the light emitting area PXA may overlap at least one of the first or second transistors T1 or T2. Accordingly, the opening OPN may be enlarged, and the anode electrode AE and a light emitting layer EML to be described later may also be enlarged.

A hole control layer HCL may be located in common in the light emitting area PXA and the non-light emitting area NPXA. Although not separately shown, a common layer such as the hole control layer HCL may be commonly formed in the pixels PX (refer to FIG. 5).

A light emitting layer EML is located on the hole control layer HCL. The light emitting layer EML may generate light having a color (e.g., a set or predetermined color). The light emitting layer EML may be located in an area corresponding to the opening OPN. In some embodiments, the light emitting layer EML may be formed separately from each of the pixels PX, but is not limited thereto. In another example, at least a part of the In another example, at least a portion of the emission layer EML may be positioned over two or more pixels PX may be located over two or more pixels PX.

When the self-light emitting element ELD is an organic light emitting diode, the light emitting layer EML may include an organic material. That is, in some embodiments, the light emitting layer EML may be an organic light emitting layer.

When the self-light emitting element ELD is a quantum dot light emitting diode, the light emitting layer EML may include a quantum dot material. That is, in some embodiments, the light emitting layer EML may be a quantum dot light emitting layer.

Quantum dots may adjust the color of emitted light depending on a particle size, and thus the quantum dots may have various light emission colors such as blue, red, and green.

An electron control layer ECL is located on the light emitting layer EML. The cathode electrode CE is commonly located in the pixels PX.

The upper insulating layer TFL may be located on the cathode electrode CE, and the sensor layer TSL may be located on the upper insulating layer TFL or the thin film encapsulation layer TFE.

The anode electrode AE, the hole control layer HCL, the light emitting layer EML, the electron control layer ECL, and the cathode electrode CE, which are located in the light emitting area PXA, may form the self-light emitting element ELD.

That is, the self-light emitting element ELD may be defined as a portion where all of the anode electrode AE, the hole control layer HCL, the light emitting layer EML, the electron control layer ECL, and the cathode electrode CE are located in the light emitting area PXA.

Figure 8:
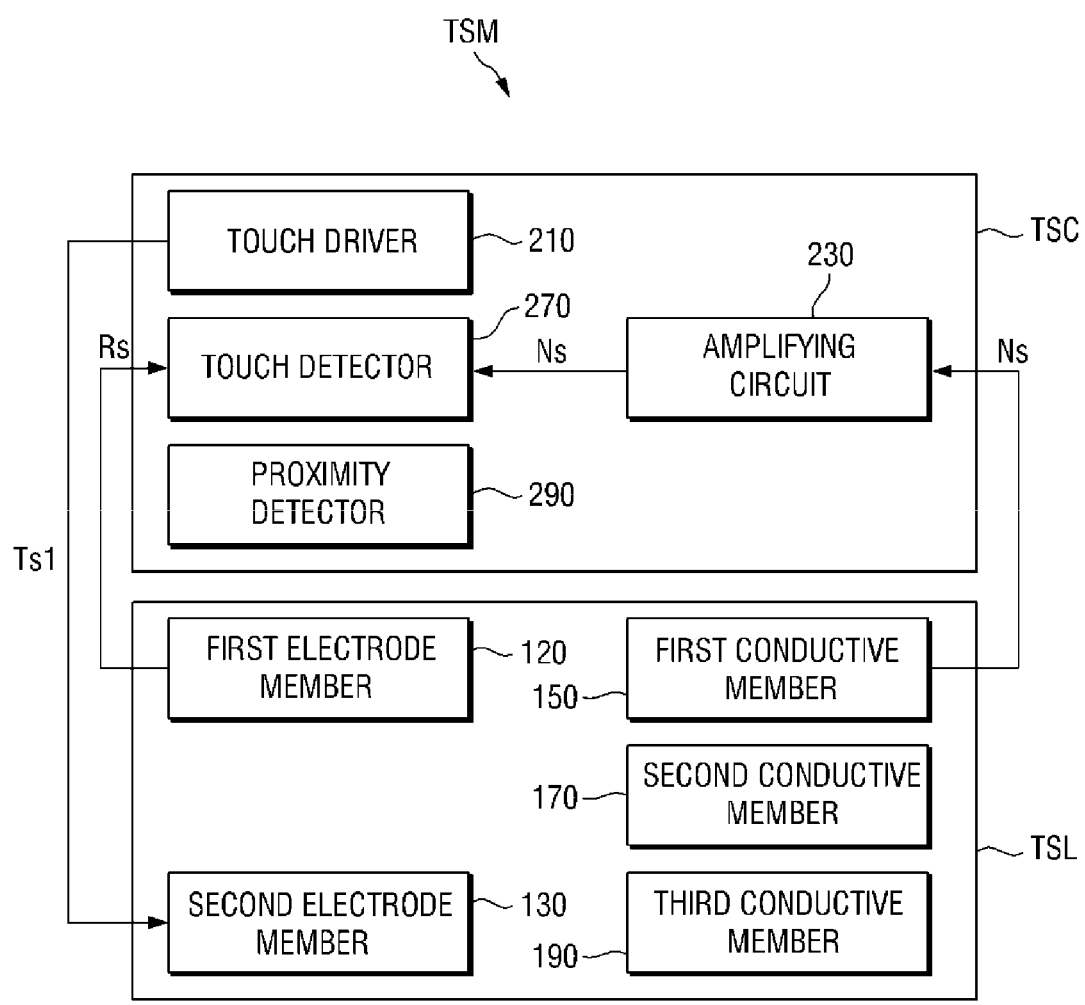
Figure 9:
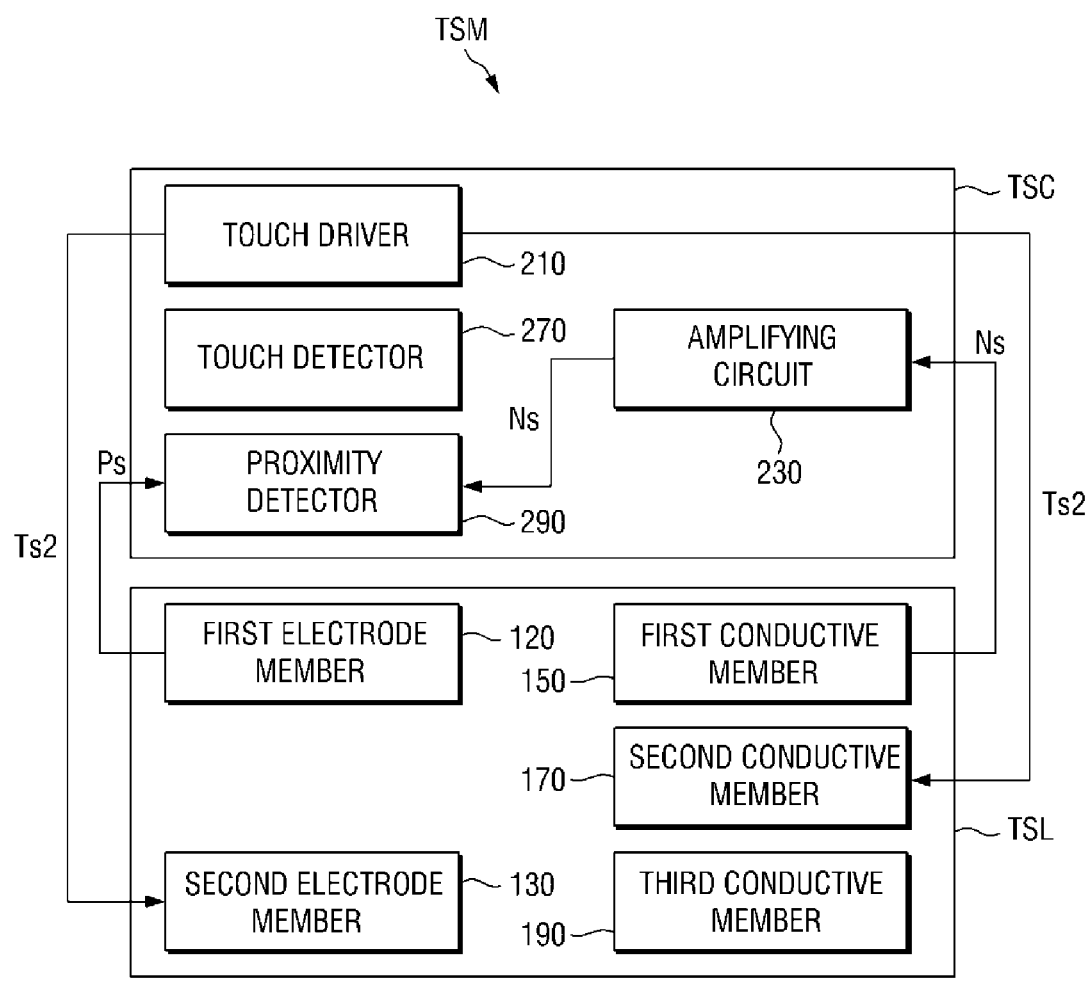

FIGS. 8 and 9 are example block diagrams of detection sensors included in the display device according to some example embodiments, in which FIG. 8 is a block diagram showing an operation of the detection sensor in a first mode and FIG. 9 is a block diagram showing an operation of the detection sensor in a second mode.

Referring to FIGS. 8 and 9, the detection sensor TSM may operate in a first mode and a second mode. In some embodiments, as shown in FIG. 8, the detection sensor TSM may perform a touch position detection operation in the first mode. Further, as shown in FIG. 9, the detection sensor TSM may perform a proximity detection operation in the second mode. That is, the first mode may be a touch mode (or touch detection mode), and the second mode may be a proximity mode (or proximity detection mode). Hereinafter, the first mode is also referred to as a touch mode, and the second mode is also referred to as a proximity mode. In some embodiments, the detection sensor TSM may operate separately in the first mode (or touch mode) and the second mode (or proximity mode), and may switch the two modes when user's manual input or a specific conditions occurs.

The detection sensor TSM includes a sensor layer TSL and a sensor controller TSC.

The sensor layer TSL may include a plurality of first electrode members 120 and a plurality of second electrode members 130.

In some embodiments, as shown in FIG. 8, in the first mode, the second electrode member 130 may be electrically connected to a touch driver 210 of the sensor controller TSC and receive a touch driving signal Ts1 for touch detection from the touch driver 210. In the first mode, the first electrode member 120 may be electrically connected to a touch detector 270 of the sensor controller TSC and output a touch detection signal Rs for touch detection to the touch detector 270. That is, in the first mode, the second electrode member 130 may function as a touch driving electrode member, and the first electrode member 120 may function as a touch detection electrode member. However, the present invention is not limited thereto, and according to some example embodiments, the first electrode member 120 may be a touch driving electrode member receiving the touch driving signal Ts1, and the second electrode member 130 may be a touch detection electrode member outputting the touch detection signal Rs. Hereinafter, it will be described that when the detection sensor TSM operates in the first mode, the first electrode member 120 functions as a touch detection electrode member, and the second electrode member 130 functions as a touch driving electrode member. However, the present invention is not limited thereto.

In some embodiments, as shown in FIG. 9, in the second mode, like the second conductive member 170 to be described later, the second electrode member 130 may receive a proximity driving signal Ts2 for detecting the proximity of an object. Further, in the second mode, the first electrode member 120 may output a proximity detection signal Ps for detecting the proximity of the object to the proximity detector 290 of the sensor controller TSC. That is, in the second mode, the second electrode member 130 may function as a proximity driving electrode member together with the second conductive member 170, and the first electrode member 120 may function as a proximity detection electrode member.

The first electrode member 120 and the second electrode member 130 may overlap at least one electrode provided in the display panel DP. For example, when the display panel DP includes a self-light emitting element, the first electrode member 120 and the second electrode member 130 may overlap the cathode electrode CE of the display panel DP shown in FIG. 7.

The sensor layer TSL may further include a first conductive member 150 and a second conductive member 170, and may further include a third conductive member 190.

As shown in FIGS. 8 and 9, the first conductive member 150 may be electrically connected to the sensor controller TSC in the first mode and the second mode. More specifically, as shown in FIG. 8, the first conductive member 150 may be electrically connected to the touch detector 270 in the first mode. The first conductive member 150 may detect noise generated in the sensor layer TSL and provide the noise to the touch detector 270 as a noise detection signal Ns. Further, as shown in FIG. 9, the first conductive member 150 may be electrically connected to the proximity detector 290 in the second mode, and may provide the noise detection signal Ns to the proximity detector 290.

As shown in FIG. 8, the second conductive member 170 may not be connected to the sensor controller TSC in the first mode. In some embodiments, in the first mode, the second conductive member 170 may be in a floating state or may receive a reference voltage such as a ground voltage. As shown in FIG. 9, the second conductive member 170 may be electrically connected to the touch driver 210 to receive a proximity driving signal Ts2 for detecting the proximity of an object.

As shown in FIGS. 8 and 9, the third conductive member 190 may not be connected to the sensor controller TSC in the first mode and the second mode. In some embodiments, the third conductive member 190 may be in a floating state in the first mode and the second mode.

The sensor controller TSC may be electrically connected to the sensor layer TSL. In the first mode (or touch mode), the sensor controller TSC may supply a touch driving signal Ts1 to the sensor layer TSL, and may receive a touch detection signal Rs corresponding to the touch driving signal Ts1 from the sensor layer TSL to detect a touch position. Further, in the second mode (or proximity mode), the sensor controller TSC may supply a proximity driving signal Ts2 to the sensor layer TSL, and may receive a proximity detection signal Ps corresponding to the proximity driving signal Ts2 from the sensor layer TSL to detect a touch position.

In some embodiments, the sensor controller TSC may include a touch driver 210, a touch detector 270, and a proximity detector 290. The sensor controller TCS may further include an amplifying circuit 230.

As shown in FIG. 8, the touch driver 210 may provide a touch driving signal Ts1 for detecting a touch input to the second electrode member 130 in the first mode. Further, as shown in FIG. 9, in the second mode, the touch driver 210 may provide a proximity driving signal Ts2 for proximity detection to the second conductive member 170. In some embodiments, the touch driver 210 may provide the proximity driving signal Ts2 to the second electrode member 130 as well as the second conductive member 170 in the second mode.

As shown in FIG. 8, the touch detector 270 may receive a touch detection signal Rs corresponding to the touch driving signal Ts1 from the first electrode member 120 in the first mode to detect the presence and/or position of a touch input. In some embodiments, the touch detection signal Rs may be an amount of change in mutual capacitance generated between the first electrode member 120 and the second electrode member 130. More specifically, when a touch input occurs, the mutual capacitance is changed at a point where the touch input is provided or a peripheral portion thereof. The touch detector 270 may receive the amount of change in mutual capacitance between the first electrode member 120 and the second electrode member 130 as a touch detection signal Rs, and may detect the presence and/or position of a touch input on the basis of the amount of change in mutual capacitance.

Further, the touch detector 270 may receive a noise detection signal Ns from the first conductive member 150, and may remove or reduce the noise included in the touch detection signal Rs by using the noise detection signal Ns.

In some embodiments, the touch detector 270 may include at least one amplifier for amplifying the received touch detection signal Rs, an analog-digital converter connected to the output end of the amplifier, and a processor. Details thereof will be described later.

As shown in FIG. 9, the proximity detector 290 may be electrically connected to the first electrode member 120 in the second mode, and receive the proximity detection signal Ps from the first electrode member 120 to detect the proximity of an object. In some embodiments, the proximity detection signal Ps may include information about the amount of change in mutual capacitance between the first electrode member 120 and other components generated according to the proximity of the object. Illustratively, when the proximity driving signal Ts2 is provided to the first conductive member 150 in the second mode, the proximity detection signal Ps may include information about the amount of change in mutual capacitance between the first conductive member 150 and the first electrode member 120 generated according to the proximity of the object. Further, when the proximity driving signal Ts2 is further provided not only to the first conductive member 150 but also to the second electrode member 130 in the second mode, the proximity detection signal Ps may include information about the amount of change in mutual capacitance between the first conductive member 150 and the first electrode member 120 and information about the amount of change in mutual capacitance between the second conductive member 130 and the first electrode member 120.

Further, the proximity detector 290 may be electrically connected to the first conductive member 150 to receive a noise detection signal Ns from the first conductive member 150, and may remove or reduce the noise included in the proximity detection signal Ps by using the noise detection signal Ns.

The amplifying circuit 230 may be electrically connected to the first conductive member 150 and the touch detector 270 in the first mode as shown in FIG. 8, and may be electrically connected to the first conductive member 150 and the proximity detector 290 in the second mode as shown in FIG. 9. The amplifying circuit 230 may amplify the noise detection signal Ns received from the first conductive member 150 or adjust the gain value thereof.

As described above, the sensor controller TSC may perform a switching operation between the first mode (touch mode) and the second mode (proximity mode), and the operation timings in the first mode and the second mode may be different from each other. In some embodiments, the switching operation of the sensor controller TCS may be achieved through software, firmware, hardware, or the like.

In some embodiments, the touch driver 210, the touch detector 270, the proximity detector 290, and the amplifying circuit 230 may be integrated into one driving chip (for example, an IC chip). However, the present invention is not limited thereto, and in some embodiments, some of the touch driver 210, the touch detector 270, the proximity detector 290, and the amplifying circuit 230 may be located at a portion other than the inside of the driving chip.

Hereinafter, the sensing sensor TSM will be described in more detail with reference to FIGS. 10 to 19.

Figure 10:
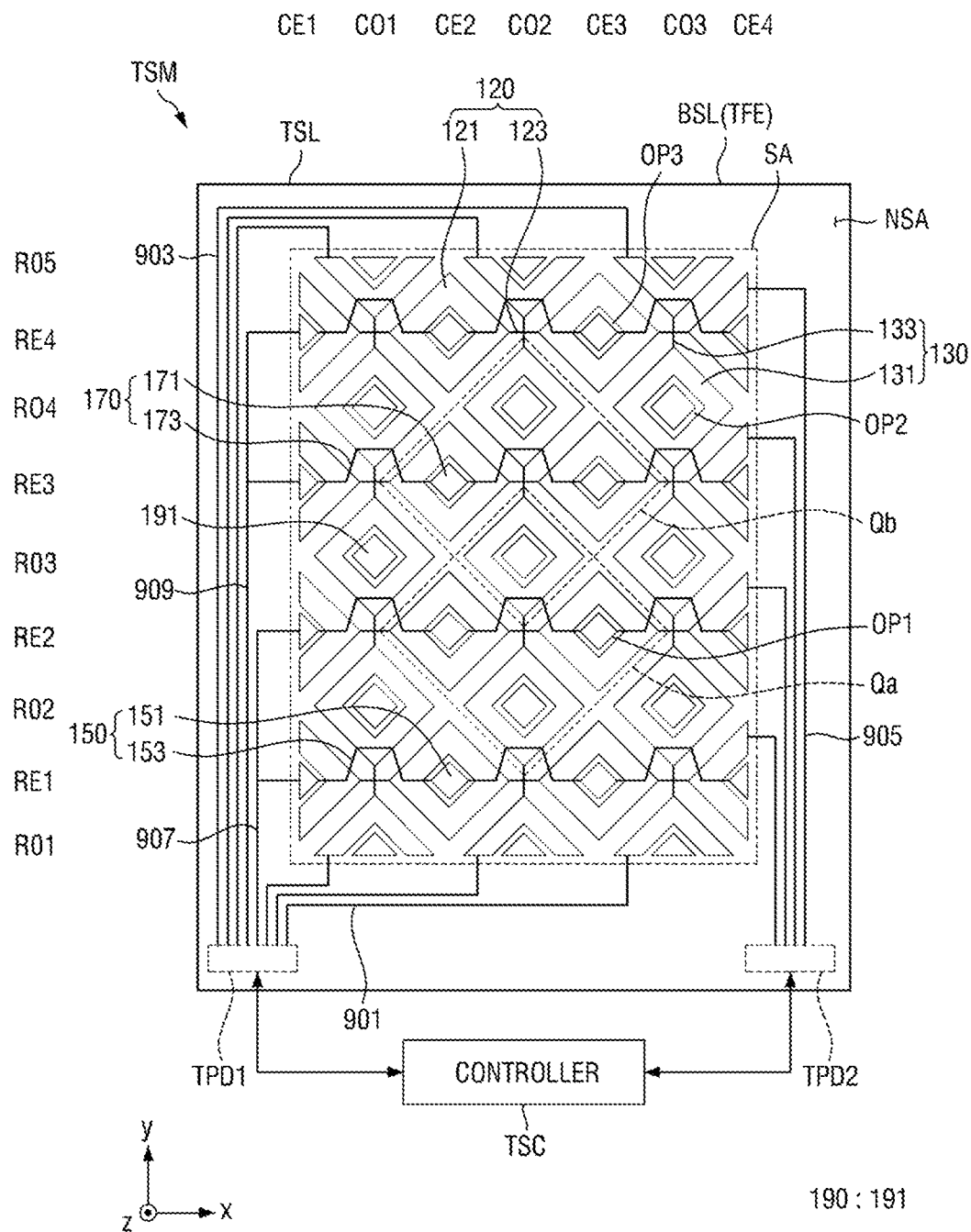
FIG. 10 is a view showing the detection sensors shown in FIGS. 8 and 9, which is a plan view of a sensor layer of each of the detection sensors and a connection relationship between the sensor layer and a controller.
Figure 11:
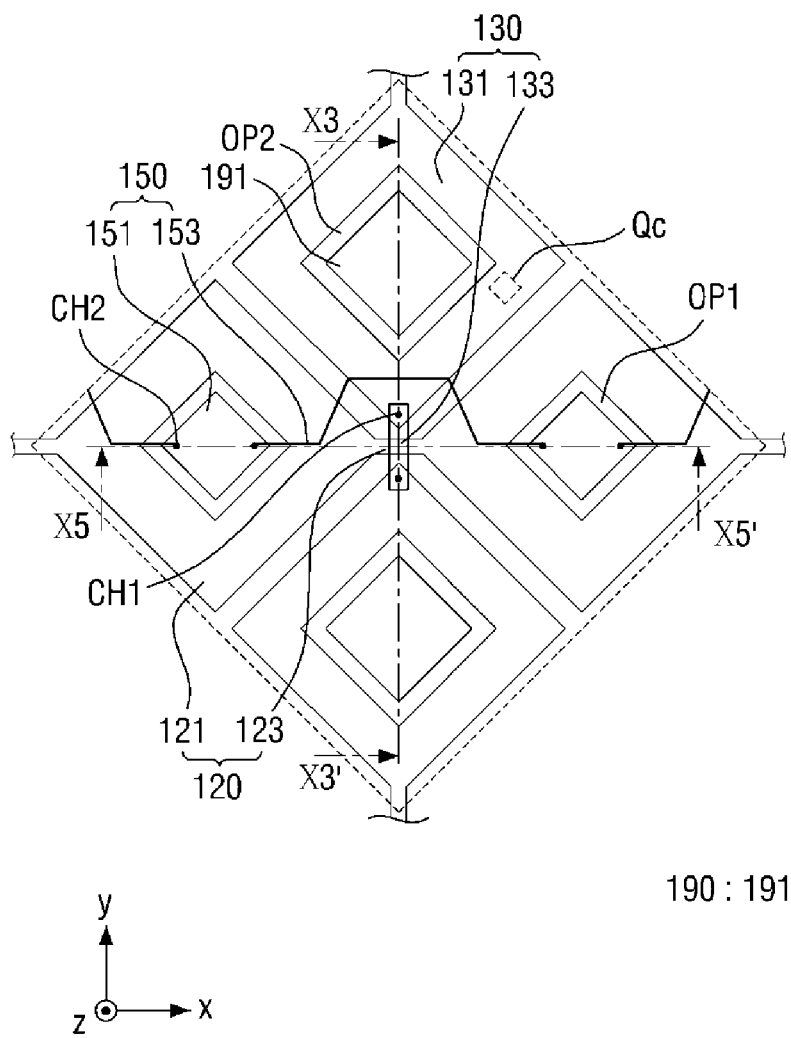
FIG. 11 is an enlarged plan view of the portion Qa of FIG. 10.
Figure 12:
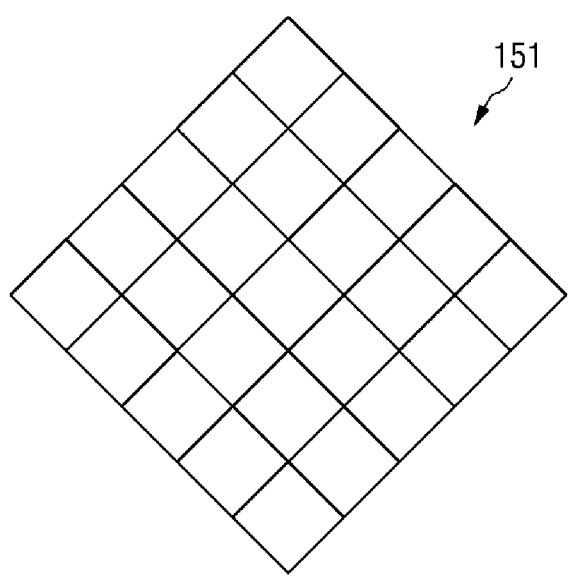
FIG. 12 is an enlarged plan view of the first conductive pattern shown in FIG. 11.
Figure 13:
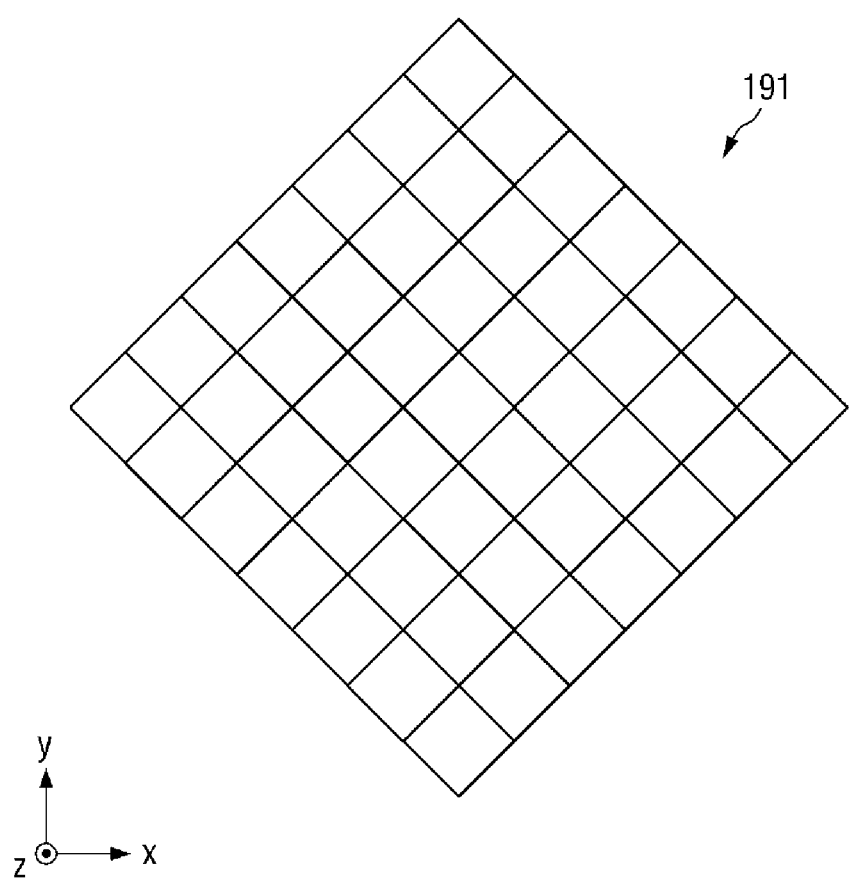
FIG. 13 is an enlarged plan view of the third conductive pattern shown in FIG. 11.
Figure 14:
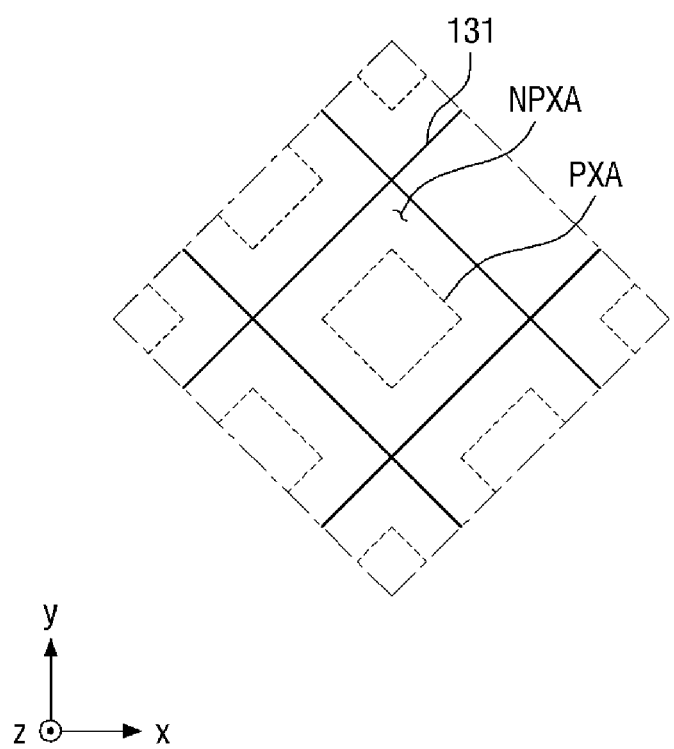
FIG. 14 is an enlarged plan view of the portion Qc of FIG. 11.
Figure 15:
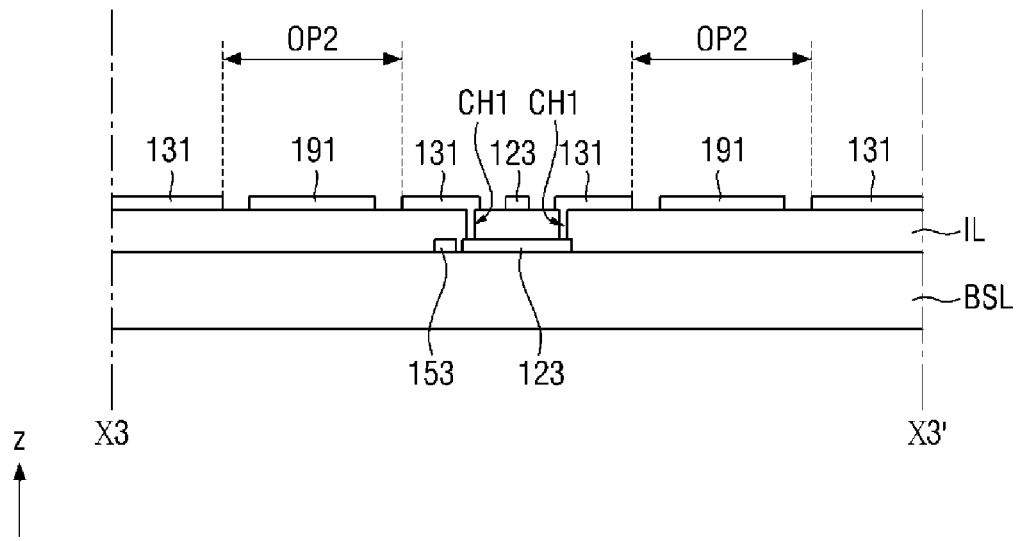
FIG. 15 is a cross-sectional view of the sensor layer taken along the line X3-X3' of FIG. 11.
Figure 16:
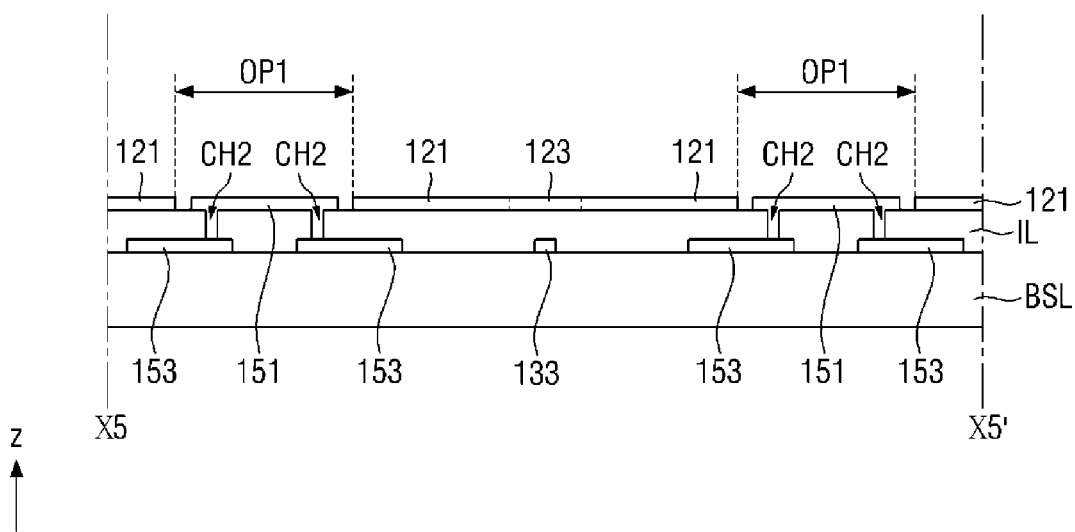
FIG. 16 is a cross-sectional view of the sensor layer taken along the line X5-X5' of FIG. 11.
Figure 17:
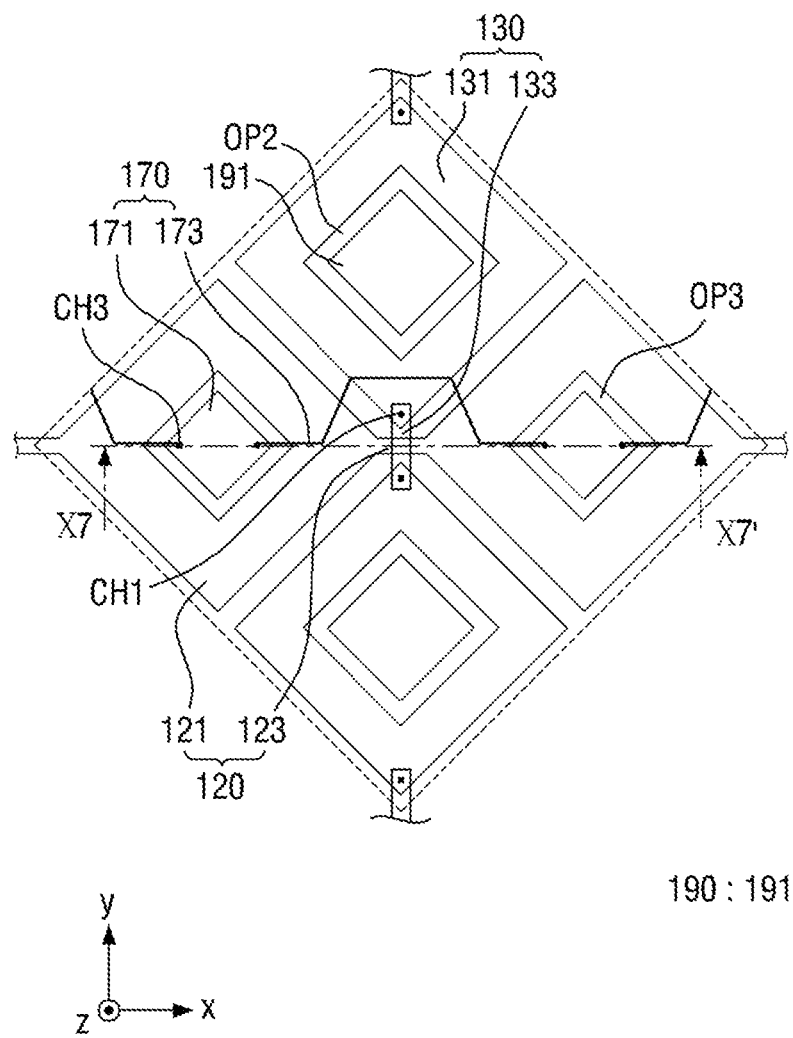
FIG. 17 is an enlarged plan view of the portion Qb of FIG. 10.
Figure 18:
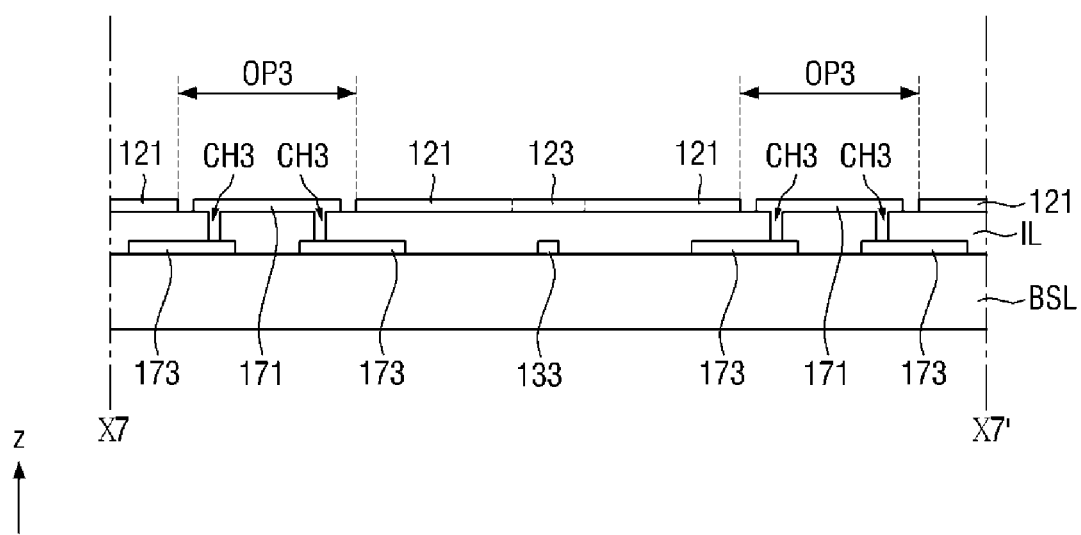
FIG. 18 is a cross-sectional view of the sensor layer taken along the line X7-X7' of FIG. 17.

FIG. 10 is a view showing the detection sensors shown in FIGS. 8 and 9, which is a plan view of a sensor layer of each of the detection sensors and a connection relationship between the sensor layer and a controller, FIG. 11 is an enlarged plan view of the portion Qa of FIG. 10, FIG. 12 is an enlarged plan view of the first conductive pattern shown in FIG. 11, FIG. 13 is an enlarged plan view of the third conductive pattern shown in FIG. 11, FIG. 14 is an enlarged plan view of the portion Qc of FIG. 11, FIG. 15 is a cross-sectional view of the sensor layer taken along the line X3-X3' of FIG. 11, FIG. 16 is a cross-sectional view of the sensor layer taken along the line X5-X5' of FIG. 11, FIG. 17 is an enlarged plan view of the portion Qb of FIG. 10, and FIG. 18 is a cross-sectional view of the sensor layer taken along the line X7-X7' of FIG. 17.

Referring to FIGS. 10 to 18, as shown in FIG. 10, a sensing area SA and a non-sensing area NSA are defined in the sensor layer TSL. The sensing area SA of the sensor layer TSL may be an area for sensing a touch input and the proximity of an object, and the non-sensing area NSA may be an area for not sensing the touch input and the proximity of the object.

The sensing area SA may correspond to the display area IDA of the display device 1 shown in FIG. 1 or the display area DA of the display panel DP shown in FIG. 5. The non-sensing area NSA may correspond to the peripheral area INDA of the display device 1 shown in FIG. 1 or the non-display area NDA of the display panel DP shown in FIG. 5. In some embodiments, the sensing area SA may be substantially the same as the display area DA of the display panel DP shown in FIG. 5, and the non-sensing area NSA may be substantially the same as the non-display area NDA of the display panel DP shown in FIG. 5.

A part of the display panel DP may be a base layer BSL of the sensor layer TSL. Illustratively, the thin film encapsulation layer TFE may be a base layer BSL of the sensor layer TSL. Hereinafter, the term "base layer BSL" and the term "thin film encapsulation layer TFE" are used interchangeably.

The sensor layer TSL may be located in the sensing area SA, and may include a first electrode member 120, a second electrode member 130, a first conductive member 150, and a second conductive member 170 which are located on the base layer BSL. The sensor layer TSL may further include a third conductive member 190.

The first electrode members 120 may extend in the first direction x, and may be spaced apart from each other along the second direction y. The first electrode members 120 spaced apart from each other along the second direction y may constitute electrode rows. It is shown in FIG. 10 that four first electrode members 120 are sequentially arranged from a lower side to an upper side along the second direction y to constitute a first electrode row RE1, a second electrode row RE2, a third electrode row RE3, and a fourth electrode row RE4. However, the present invention is not limited thereto, and the number of the first electrode members 120 may be variously changed.

The first electrode member 120 may include a plurality of first sensing electrodes 121 arranged along the first direction x, and a first connection portion 123 for electrically connecting the first sensing electrodes 121 neighboring along the first direction x to each other. In the description of the following embodiments, the "connection" may comprehensively mean "connection" in the physical and/or electrical aspects. Further, hereinafter, the "contact" may mean a state in which two or more components are in physical contact with each other.

In some embodiments, the first sensing electrode 121 may have a rhombus shape or a square shape, but the shape thereof is not limited thereto, and the first sensing electrode 121 may have various shapes such as a triangle, a rectangle other than a rhombus, a rectangle other than a square, a pentagon, a circle, and a bar shape.

In some embodiments, as shown in FIG. 14, the first sensing electrode 121 may have a mesh structure to prevent a user from being visually recognized. When the first sensing electrode 121 has a mesh structure, the first sensing electrode 121 may be arranged not to overlap the light emitting area PXA of the display panel. In other words, the first sensing electrode 121 having a mesh structure may be arranged to overlap the non-light emitting area NPXA of the display panel.

The first sensing electrode 121 may include a conductive material. The first sensing electrode 121 may be formed of the second conductive layer ML2 having been described above with reference to FIG. 3. Specific examples of the conductive material are the same as those described above in the description of the second conductive layer ML2, and will thus be omitted.

Because the first sensing electrode 121 is formed of the second conductive layer ML2, the first sensing electrode 121 may be located on the insulating layer IL as shown in FIG. 16.

In some embodiments, the first sensing electrodes 121 spaced along the second direction y may form electrode columns.

It is illustratively shown in FIG. 10 that the first sensing electrodes 121 sequentially constitute a first electrode column CE1, a second electrode column CE2, a third electrode column CE3, and a fourth electrode column CE4 along the first direction x. However, the present invention is not limited thereto, and the number of the electrode columns constituted by the first sensing electrodes 121 may be variously changed.

The first sensing electrode 121 may include an opening. Illustratively, each of the first sensing electrodes 121 located in the first electrode row RE1 and the second electrode row RE2 may include a first opening OP1, and each of the first sensing electrodes 121 located in the third electrode row RE3 and the fourth electrode row RE4 may include a third opening OP3. The first opening OP1 and the third opening OP3 may expose a layer located under the first sensing electrode 121. Illustratively, the first opening OP1 and the third opening OP3 may expose the insulating layer IL located under the first sensing electrode 121 as shown in FIGS. 16 and 18.

The first connection portion 123 may electrically connect the first sensing electrodes 121 neighboring along the first direction x, and may be in contact with the first sensing electrodes 121.

In some embodiments, the first connection portion 123 may be located on the same layer as the first sensing electrode 121. In some embodiments, the first connection portion 123 may be formed of the second conductive layer ML2 described above with reference to FIG. 3, and may be made of the same material as the first sensing electrode 121.

Because the first connection portion 123 is formed of the second conductive layer ML2, the first connection portion 123 may be located on the insulating layer IL as shown in FIGS. 15, 16, and 18.

Although it is shown in FIGS. 10 and 17 that one first connection portion 123 is located between the first sensing electrodes 121 neighboring along the first direction x, the number of the first connection portions 123 may be variously changed. For example, two or more first connection portions 123 may also be located between the two first sensing electrodes 121 neighboring along the first direction x.

As shown in FIG. 10, the second electrode members 130 may extend in the second direction y, and may be spaced apart from each other in the first direction x. The second electrode members 130 spaced apart from each other along the first direction x may constitute columns. It is illustratively shown in FIG. 10 that three second electrode members 130 are sequentially arranged along the first direction x to constitute a first column CO1, a second column CO2, and a third column CO3. However, the present invention is not limited thereto, and the number of the second electrode members 130 may be variously changed.

The second electrode member 130 may include a plurality of second sensing electrodes 131 arranged along the second direction y, and a second connection portion 133 for electrically connecting the second sensing electrodes 131 neighboring along the first direction x to each other.

The plurality of second sensing electrodes 131 may be electrically connected to each other along the second direction y. The second sensing electrodes 131 located in different columns may be spaced apart from each other.

In some embodiments, the second sensing electrodes 131 spaced along the first direction x may constitute rows. It is illustratively shown in FIG. 10 that the second sensing electrodes 131 sequentially constitute a first row RO1, a second row RO2, a third row RO3, a fourth row RO4, and a fifth row RO5 from a lower side to an upper side along the second direction y.

In some embodiments, some of the rows constituted by the second sensing electrodes 131 may be located between the two electrode rows constituted by the first electrode members 120. Illustratively, the second row RO2 may be located between the first electrode row RE1 and the second electrode row RE2, the third row RO3 may be located between the second electrode row RE2 and the third electrode row RE3, and the fourth row RO4 may be located between the third electrode row RE3 and the fourth electrode row RE4. The first row RO1 may be located opposite to the second row RO2 with the first electrode row RE1 interposed therebetween, and the fifth row RO5 may be located opposite to the fourth row RO4 with the fourth electrode row RE4 interposed therebetween. That is, the rows constituted by the second sensing electrodes 131 and the electrode rows constituted by the first electrode members 120 may be repeatedly arranged along the second direction y.

The second sensing electrode 131 may include a second opening OP2. For example, at least a center of each of the second sensing electrodes 131 may be opened to expose a layer located under the second sensing electrode 131. Illustratively, the second opening OP2 may expose the insulating layer IL located under the second sensing electrode 131 as shown in FIG. 15.

In some embodiments, the area of the second opening OP2 may be different from the area of the first opening OP1 and the area of the third opening OP3. Illustratively, the area of the second opening OP2 may be larger than the area of the first opening OP1 and the area of the third opening OP3.

In some embodiments, the second sensing electrode 131 may have a rhombus shape in a plan view, but the shape thereof is not limited thereto, and the second sensing electrode 131 may have various shapes such as a triangle, a rectangle other than a rhombus, a pentagon, a circle, and a bar shape.

The second sensing electrode 131 may include a conductive material. The second sensing electrode 131 may be formed of the second conductive layer ML2 described above with reference to FIG. 3, and may be made of the same material as the first sensing electrode 121. In some embodiments, the second sensing electrode 131 may have a mesh structure, like the first sensing electrode 121.

The second connection portion 133 may electrically connect the second sensing electrodes 131 neighboring along the second direction y to each other, and may be in contact with the second sensing electrodes 131. In some embodiments, the second connection portion 133 may be formed as a bridge-shaped connection pattern. In some embodiments, the second connection portion 133 may be formed of a different layer from the first sensing electrode 121 and the second sensing electrode 131. Illustratively, the second connection portion 133 may be formed of the first conductive layer ML1 described above with reference to FIG. 3, and may include the conductive material described above in the description of the first conductive layer ML1. Because the second connection portion 133 is formed of the first conductive layer ML1, an insulating layer IL may be located between the second connection portion 133 and the second sensing electrode 131. In some embodiments, as shown in FIGS. 11 and 15, the second sensing electrode 131 may be connected to the second connection portion 133 through a first contact hole CH1 formed in the insulating layer IL.

In some embodiments, the second sensing electrode 131 may be a touch driving electrode that receives a touch driving signal Ts1 (refer to FIG. 8) for detecting a touch position, and the first sensing electrode 121 may be a touch sensing electrode that outputs a touch detection signal Rs (refer to FIG. 8) for detecting a touch position.

The first conductive member 150 may be located in the electrode row formed by the first electrode member 120. In some embodiments, the first conductive member 150 may be located in the electrode row relatively adjacent to the sensor pad portions TPD1 and TPD2 among the electrode rows formed by the first electrode members 120. Illustratively, as shown in FIG. 10, the first conductive members 150 may be located in the first electrode row RE1 and the second electrode row RE2 among the first electrode row RE1, the second electrode row RE2, the third electrode row RE3, and the fourth electrode row RE4. As described above, the first conductive member 150 may output a noise detection signal according to the operation of the detection sensor TSM.

The first conductive member 150 may include a first conductive pattern 151 and a first connection line 153. The first conductive pattern 151 may be located in the first opening OP1 of the first sensing electrode 121, and may be spaced apart from the first sensing electrode 121.

In some embodiments, the first conductive pattern 151 may have the same shape as the first opening OP1. Illustratively, when the first opening OP1 has a rhombus shape, the first conductive pattern 151 may also have a rhombus shape.

The first conductive pattern 151 may include a conductive material. In some embodiments, the first conductive pattern 151 may be formed of the second conductive layer ML2 described above with reference to FIG. 3, and may be made of the same material as the first sensing electrode 121. In some embodiments, as shown in FIG. 12, the first conductive pattern 151 may have a mesh structure, like the first sensing electrode 121.

The first connection line 153 may be located in the same electrode row, and may electrically connect the first conductive patterns 151 neighboring along the first direction x to each other. In some embodiments, the first connection line 153 may be formed of the first conductive layer ML1 described above with reference to FIG. 3. The first connection line 153 may be located under the insulating layer IL, and as shown in FIGS. 11 and 15, the first conductive pattern 151 and the first connection line 153 may be connected to each other and be in contact with each other through a second contact hole CH2 formed in the insulating layer IL.

The second conductive member 170 may be located in the electrode row formed by the first electrode member 120, but may be located in an electrode row different from the first conductive member 150. In some embodiments, the second conductive member 170 may be located farther from the sensor pad portions TPD1 and TPD2 than the first conductive member 150 along the second direction y. Illustratively, as shown in FIG. 10, the second conductive members 170 may be located in the third electrode row RE3 and the fourth electrode row RE4 among the first electrode row RE1, the second electrode row RE2, the third electrode row RE3, and the fourth electrode row RE4. As described above, the second conductive member 170 may receive a proximity driving signal Ts2 when the detection sensor TSM operates in the second mode (proximity mode).

The second conductive member 170 may include a second conductive pattern 171 and a second connection line 173.

The second conductive pattern 171 may be located in the third opening OP3 of the first sensing electrode 121, and may be spaced apart from the first sensing electrode 121.

The second conductive pattern 171 may include a conductive material. In some embodiments, the second conductive pattern 171 may be formed of the second conductive layer ML2 described above with reference to FIG. 3, and may be made of the same material as the first sensing electrode 121. In some embodiments, the second conductive pattern 171 may have the same structure as the first conductive pattern 151, for example, a mesh structure.

The second connection line 173 may be located in the same electrode row, and may electrically connect the second conductive patterns 171 neighboring along the first direction x to each other. In some embodiments, the second connection line 173 may be formed of the first conductive layer ML1 described above with reference to FIG. 3. The second connection line 173 may be located under the insulating layer IL. As shown in FIGS. 17 and 18, the second conductive pattern 171 and the second connection line 173 may be connected to and be in contact with each other through the third contact hole CH3 formed in the insulating layer IL.

The third conductive member 190 may be located in the row formed by the second sensing electrode 131. Illustratively, the third conductive members 190 may be located in the first row RO1, the second row RO2, the third row RO3, the fourth row RO4, and the fifth row RO5, respectively, which are formed by the second sensing electrodes 131.

The third conductive member 190 may include a third conductive pattern 191. The third conductive pattern 191 may be located in the second opening OP2 of the second sensing electrode 131. As the second opening OP2 is formed in the second sensing electrode 131, a difference in external light reflectance may occur, and thus pattern spots may be recognized from the outside. The third conductive pattern 191 may reduce the difference in the external light reflectance to reduce the possibility of the pattern spots being visually recognized from the outside.

The third conductive pattern 191 may be located in the second opening OP2, but may be spaced apart from the second sensing electrode 131.

The third conductive pattern 191 may include a conductive material. In some embodiments, the third conductive pattern 191 may be formed of the second conductive layer ML2 described above with reference to FIG. 3, and may be made of the same material as the second sensing electrode 131. In some embodiments, the third conductive pattern 191 may have a mesh structure as shown in FIG. 13.

In some embodiments, two third conductive patterns 191 neighboring along the first direction x may not be connected to each other, and each of the third conductive patterns may be in a floating state.

In some embodiments, the third conductive pattern 191 may have the same shape as the second opening OP2. Illustratively, when the second opening OP2 has a rhombus shape, the third conductive pattern 191 may also have a rhombus shape.

The size of the second opening OP2 may be larger than the size of the first opening OP1 or the size of the third opening OP3. Accordingly, in some embodiments, the size of the third conductive pattern 191 may be larger than the size of the first conductive pattern 151 or the size of the second conductive pattern 171.

Hereinafter, the non-sensing area NSA will be described.

In some embodiments, as shown in FIG. 10, in the non-sensing area NSA, wirings 901, 903, 905, 907, and 909 may be arranged on the base layer BSL.

Illustratively, the wirings 901, 903, 905, 907, and 909 may include a first wiring 901 connected to one end of each of the second electrode members 130, a second wiring 903 connected to the other end of each of the second electrode members 130, a third wiring 905 connected to each of the first electrode members 120, a fourth wiring 907 connected to all of the first conductive members 150, and a fifth wiring 909 connected to all of the second conductive members 170. Here, the other end of the second electrode member 130 refers to a side opposite to one end of the second electrode member 130 to which the first wiring 901 is connected. That is, the wiring connected to the second electrode member 130 may have a double routing structure, thereby improving RC delay caused by resistance of the second electrode member 30. However, the present invention is not limited thereto, and any one of the first wiring 901 and the second wiring 903 may be omitted as shown in FIG. 10. That is, according to some example embodiments, the wiring connected to the second electrode member 130 may have a single routing structure.

The plurality of first wirings 901 and the plurality of second wirings 903 may be provided, and each of the first wirings 901 and each of the second wirings 903 may be connected to each of the second electrode members 130. Further, the plurality of third wiring 905 may be connected to the first electrode members 120, respectively.

In some embodiments, unlike the first wiring 901, the second wiring 903, and the third wiring 905, only one fourth wiring may be provided. The fourth wiring 907 may be connected to all of the plurality of first conductive members 150. Accordingly, the number of channels or pads allocated to the first conductive member 150 may be reduced, and the area occupied by the fourth wiring 907 in the non-sensing area NSA can be reduced. However, the present invention is not limited thereto, and two or more fourth wirings 907 may be provided.

Similarly to the fourth wiring 907, only one fifth wiring 909 may be provided. The fifth wiring 909 may be connected to all of the plurality of second conductive members 170. Accordingly, the number of channels or pads allocated to the second conductive member 170 may be reduced. However, the present invention is not limited thereto, and two or more fifth wirings 909 may be provided.

The first wiring 901, the second wiring 903, the third wiring 905, the fourth wiring 907, and the fifth wiring 909 may be electrically connected to the sensor pad portions TPD1 and TPD2. The sensor pad portions TPD1 and TPD2 may be electrically connected to the sensor controller TSC.

In some embodiments, the sensor pad portions TPD1 and TPD2 may include a first sensor pad portion TPD1 and a second sensor pad portion TPD2 which are spaced apart from each other along the first direction x. Illustratively, the first sensor pad portion TPD1 may be connected to the first wiring 901, the second wiring 903, the fourth wiring 907, and the fifth wiring 909, and the second sensor pad portion TPD2 may be connected to the third wiring 905. However, the present invention is not limited thereto. For example, the first sensor pad portion TPD1 and the second sensor pad portion TPD2 may form one pad portion without being spaced apart from each other. The wirings respectively connected to the first sensor pad portion TPD1 and the second sensor pad portion TPD2 may be changed in various ways.

In the detection sensor TSM according to some example embodiments, because the first sensing electrode 121, the second sensing electrode 131, the first conductive pattern 151, the second conductive pattern 171, and the third conductive pattern 191 are formed on the same layer, there is a characteristic of these components being simultaneously formed during the same process, and thus there is a characteristic of a manufacturing process being simplified. Further, because the first sensing electrode 121, the second sensing electrode 131, and the second conductive pattern 171 are located on the same layer, there is a characteristic that the detection sensor TSM can be realized in a thin form while having a touch sensing function and a proximity sensing function. Moreover, because the detection sensor TSM itself has a function of a proximity sensor, there is a characteristic that it may not be necessary to form a hole for a separate proximity sensor in the display device 1.

Further, when the detection sensor TSM performs a touch sensing operation and a proximity sensing operation, the first conductive member 150 may output a noise detection signal, thereby improving the sensitivity of the detection sensor TSM.

Hereinafter, the operation of the detection sensor TSM will be described in more detail with reference to FIGS. 19, 20, and 21.

Figure 19:
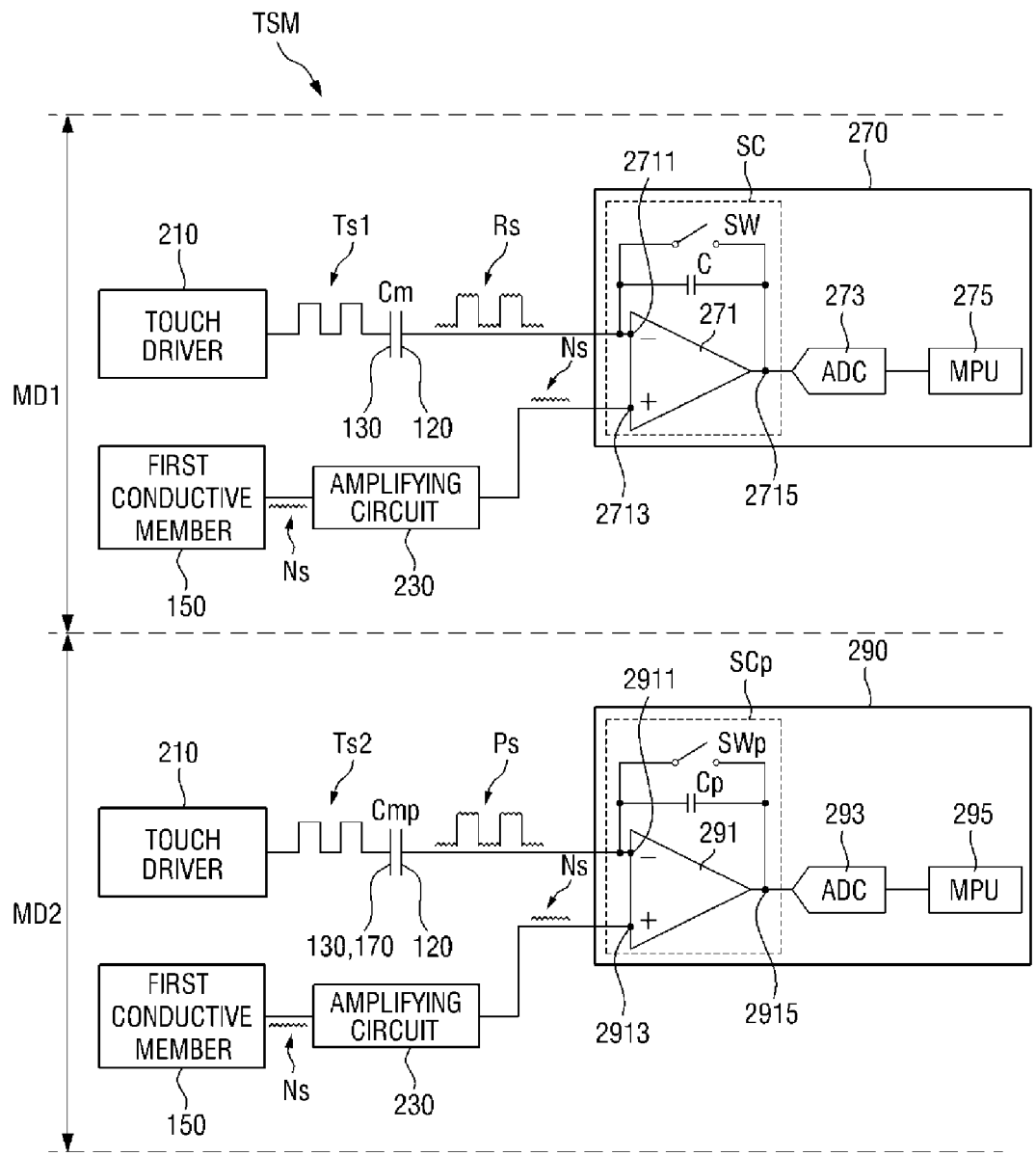
FIG. 19 is a block diagram showing an operation of a detection sensor according to some example embodiments in a first mode and an operation of the detection sensor in a second mode.
Figure 20:
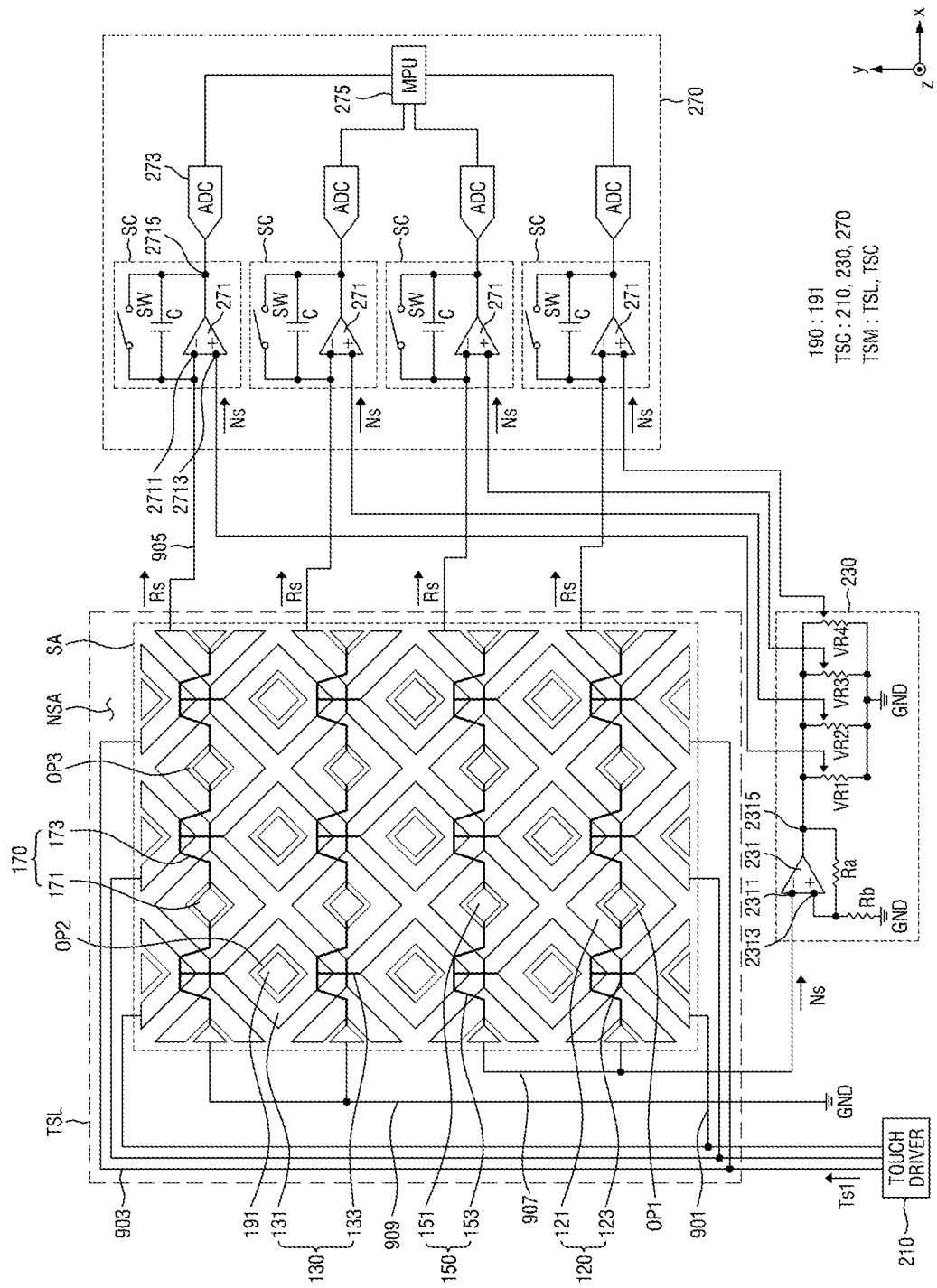
FIG. 20 is a view specifically showing a connection relationship between a sensor layer and a sensor controller when the detection sensor according to some example embodiments operates in the first mode.
Figure 21:
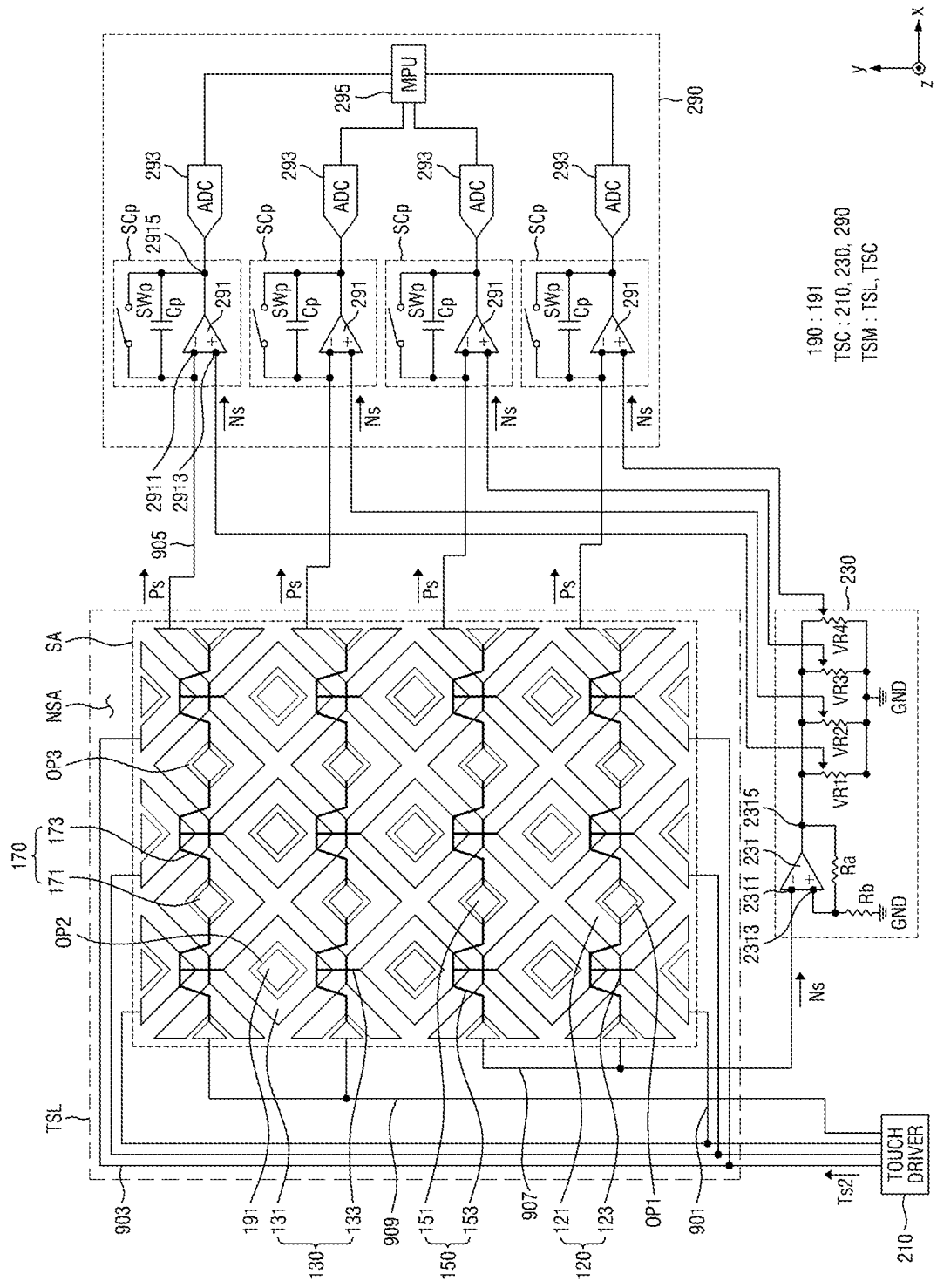
FIG. 21 is a view specifically showing a connection relationship between a sensor layer and a sensor controller when the detection sensor according to some example embodiments operates in the second mode.

FIG. 19 is a block diagram showing an operation of a detection sensor according to some example embodiments in a first mode and an operation of the detection sensor in a second mode, FIG. 20 is a view specifically showing a connection relationship between a sensor layer and a sensor controller when the detection sensor according to some example embodiments operates in the first mode, and FIG. 21 is a view specifically showing a connection relationship between a sensor layer and a sensor controller when the detection sensor according to some example embodiments operates in the second mode.

Referring to FIGS. 19, 20 and 21 in addition to FIG. 10, in some embodiments, the sensor controller TSC may perform different operations in the first mode MD1 and the second mode MD2. Illustratively, the touch controller 200 may perform a touch sensing operation based on the amount of change in mutual capacitance between the first electrode member 120 and the second electrode member 130 during the operation in the first mode MD1, and may perform a proximity sensing operation based on the amount of change in mutual capacitance between the first electrode member 120 and the second conductive member 170 and the amount of change in mutual capacitance between the first electrode member 120 and the second electrode member 130 during the operation in the second mode MD2.

The switching operation of the sensor controller TSC between the first mode MD1 and the second mode MD2 may be performed in response to the control signal (e.g., a set or predetermined control signal).

Illustratively, while the sensor controller TSC operates in the first mode MD1, the sensor controller TSC may be switched from the first mode MD1 to the second mode MD2 when a specific function or application is executed in the display device 1, a call reception event occurs in the display device 1, a call transmitting event occurs in the display device 1, the time for which a touch is not detected exceeds a preset value in the first mode MD1, or a user's mode switching input is provided. Further, illustratively, while the sensor controller TSC operates in the second mode MD2, the sensor controller TSC may be switched from the second mode MD2 to the first mode MD1 when a call termination event occurs in the display device 1, a specific function or application is executed in the display device 1, a user's mode switching input is provided, or the time for which a proximity is not detected exceeds a preset value in the second mode MD2.

However, the aforementioned content is one example, and in addition, the sensor controller TSC may switch between the first mode MD1 and the second mode MD2 in response to various situations.

Hereinafter, the operation of each component of the sensor controller TSC will be described in more detail.

In the first mode MD1, the touch driver 210 may provide a touch driving signal Ts1 to the second electrode member 130 through the first wiring 901 and the second wiring 903. In some embodiments, the touch driving signal Ts1 may be sequentially provided to each of the second electrode members 130.

In the second mode MD2, the touch driver 210 may provide a proximity driving signal Ts2 to the second conductive member 170 through the fifth wiring 909. In some embodiments, in the second mode MD2, the touch driver 210 may provide the proximity driving signal Ts2 to the second electrode member 130 through the first wiring 901 and the second wiring 903. When the proximity driving signal Ts2 is provided to the second electrode member 130, the proximity driving signal Ts2 may be sequentially provided to each of the second electrode members 130, or the proximity driving signal Ts2 may be provided to each of the second electrode members 130 at the same timing.

When the proximity driving signal Ts2 is provided to both the second electrode member 130 and the second conductive member 170, the mutual capacitance for detecting the proximity of an object may be increased. Accordingly, there is a characteristic that the detection sensor TSM can be driven with relatively low power consumption, a characteristic that the time taken to form mutual capacitance can be reduced to reduce the time taken to drive the detection sensor TSM, and a characteristic that a signal-to-noise ratio can be improved. When the proximity driving signal Ts2 is simultaneously provided to each of the second electrode members 130, there is a characteristic that the time taken to drive the detection sensor TSM can be further reduced.

In the first mode MD1, the touch detector 270 may receive a touch detection signal Rs from the first electrode member 120 through the first wiring 901. In some embodiments, as described above, the touch detection signal Rs may include information about the mutual capacitance generated between the first electrode member 120 and the second electrode member 130. When the touch driving signal Ts1 is provided to the second electrode member 130, a mutual capacitance Cm is formed between the second electrode member 130 and the first electrode member 120. Further, when a touch event such as a touch input occurs, the mutual capacitance Cm may be changed. The first electrode member 120 may output a touch detection signal Rs corresponding to the touch driving signal Ts1, and the touch detection signal Rs output by the first electrode member 120 may be input to the touch detector 270. The touch detector 270 may detect the change amount of the mutual capacitance Cm based on each touch detection signal Rs, and may detect a touch event based on the detected change amount of the mutual capacitance Cm. Illustratively, the touch detector 270 may determine that a touch event occurs when the change amount of the mutual capacitance Cm detected based on the touch detection signal Rs exceeds a preset reference value.

In some embodiments, the touch detector 270 may include a plurality of sensing channels SC electrically connected to the respective first electrode members 120 in the first mode MD1. The touch detector 270 may include at least one analog-digital converter (ADC) 273 and a processor 275 connected to the sensing channel SC. Hereinafter, although the sensing channel SC and the analog-digital converter 273 are described as separate components, according to some example embodiments, the analog-digital converter 273 may be provided in each sensing channel SC.

The sensing channel SC may receive a touch detection signal Rs from each of the first electrode members 120 and amplify and output the received touch detection signal Rs. In some embodiments, the sensing channel SC may include an analog front end including at least one amplifier 271 such as an operational amplifier.

The amplifier 271 may include a first input terminal 2711, a second input terminal 2713, and an output terminal 2715. According to some example embodiments, the first input terminal 2711 of the amplifier 271, for example, an inverting input terminal of the OP amplifier, may be electrically connected to the first electrode member 120 through the third wiring 905 or the like, and the touch detection signal Rs may be input to the first input terminal 2711.

In some embodiments, the second input terminal 2713 of the amplifier 271, for example, a non-inverting input terminal of the OP amplifier may be electrically connected to the first conductive member 150 or the amplifying circuit 230 through the fourth wiring 907 or the like, and the noise detection signal Ns may be provided to the second input terminal 2713 of the amplifier 271. Accordingly, the reference voltage of the amplifier 271 may change together with the voltage variation of each of the first conductive members 150. That is, the reference potential of the amplifier 271 may be changed according to the potential (voltage level) of the first conductive member 150.

In the first mode MD1 in which a touch is detected based on the change amount of mutual capacitance, the potential of the first conductive member 150 may be changed according to a noise signal flowing into the sensor layer TSL from the display panel 300 or the like. For example, while operating in the first mode MD1, the potential of the first conductive member 150 may be changed in response to a common mode noise flowing into the sensor layer TSL from the display panel 300 or the like.

Accordingly, when the first conductive member 150 is further located in the sensing area SA and the reference potential of the amplifier 271 is changed using the noise detection signal Ns detected by the first conductive member 150 while operating in the first mode MD1, the common mode noise flowing into the sensor layer TSL may be canceled (or removed). For example, the first electrode member 120 and the first conductive member 150 have ripples corresponding to each other in response to the common mode noise. For example, because the first electrode member 120 and the first conductive member 150 extend in the same direction in the sensing area SA and are arranged at positions corresponding to each other, the first electrode member 120 and the first conductive member 150 receive noise signals of the same or similar shape and/or size. The first electrode member 120 is electrically connected to the first input terminal 2711 of the amplifier 271 via the third wiring 905, and the first conductive member 150 is electrically connected to the second input terminal 2713 of the amplifier 271 via the fourth wiring 907 which is different from the third wiring 905. Therefore, the noise components (ripples) included in the touch detection signal Rs received from the first electrode member 120 may be effectively canceled. Accordingly, the signal output from the output terminal 2715 of the amplifier 271 may be a touch detection signal from which noise is removed.

In some embodiments, the sensing channel SC may further include a capacitor C and a reset switch SW connected in parallel with each other between the first input terminal 2711 and output terminal 2715 of the amplifier 271.

Meanwhile, according to some example embodiments, the amplifier 271 may be implemented in the form of a non-inverting amplifier, but embodiments are not limited thereto. According to some example embodiments, the amplifier 271 may be implemented in the form of an inverting amplifier.

The output terminal 2715 of the amplifier 271 may be electrically connected to the analog-digital converter 233.

The analog to digital converter 273 may convert the input analog signal into a digital signal. According to some example embodiments, the analog-to-digital converter 273 may be provided as many as the number of the first electrode members 120 so as to correspond to each of the first electrode members 120 at a 1:1 ratio. Alternatively, according to some example embodiments, each of the first electrode members 120 may be configured to share one analog-to-digital converter 273, and in this case, a separate switch circuit for selecting a sensing channel may be further provided.

The processor 275 processes the converted signal (digital signal) from the analog-to-digital converter 273 and detects a touch input in accordance with the signal processing result. For example, the processor 275 may comprehensively analyze the first detection signal amplified by the amplifier 271 and converted by the analog-to-digital converter 273 to detect the occurrence of a touch input and the position thereof. According to some example embodiments, the processor 275 may be implemented as a microprocessor (MPU). In this case, a memory required for driving the processor 275 may be additionally provided inside the touch detector 270. Meanwhile, the configuration of the processor 275 is not limited thereto. As another example, the processor 275 may be implemented as a microcontroller (MCU) or the like.

The sensor controller TCS may further include an amplifying circuit 230 connected to the first conductive member 150. The amplifying circuit 230 may be connected to the sensing channels SC of the touch detector 270 in the first mode MD1, and may be connected to the sensing channels SCp of the proximity detector 290 in the second mode MD2.

According to some example embodiments, the amplifying circuit 230 may include at least one amplifier 231. According to some example embodiments, the amplifier 231 may include a first input terminal 2311 commonly connected to the first conductive member 150 through the fourth wiring 907, and a second input terminal 2313 connected to an output terminal 2315 via at least one resistor Ra. According to some example embodiments, the first input terminal 2311 and the second input terminal 2313 may be an inverting input terminal and a non-inverting input terminal, respectively, but is not limited thereto. For reference, Ra and Rb of FIGS. 20 and 21 example show input and output impedances of the amplifier 231.

This amplifying circuit 230 may receive a noise detection signal Ns from the first conductive member 150 via the fourth wiring 907, and may amplify the noise detection signal Ns to a degree corresponding to the gain value of the amplifier 231 and output the amplified noise detection signal Ns. At this time, the size of the noise detection signal Ns provided to the sensing channel SC of the touch detector 270 and the sensing channel SCp of the proximity detector 290 can be easily adjusted by adjusting the gain value of the amplifying circuit 230. In some embodiments, the gain value of the amplifying circuit 230 may be adjusted such that noise components included in the touch detection signal Rs and proximity detection signal Ps output from the first electrode member 120 may be effectively canceled in the sensing channel SC.

According to some example embodiments, the amplifying circuit 230 may include a plurality of variable resistors VR1, VR2, VR3, and VR4 connected in parallel to each other between the output terminal 2315 of the amplifier 231 and a reference power supply (e.g., a predetermined reference power supply), for example, a ground power supply GND. For example, the amplifying circuit 230 may include variable resistors VR1, VR2, VR3, and VR4 corresponding to the number of the sensing channels SC of the touch detector 270 or the sensing channels SCp of the proximity detector 290.

According to some example embodiments, in the first mode MD1, each of the sensing channels SC of the touch detector 270 may be connected to different variable resistors among the variable resistors VR1, VR2, VR3, and VR4 provided to the amplifying circuit 230. Illustratively, the second input terminal 2713 of the first sensing channel SC located at the uppermost side of FIG. 20 is connected to the first variable resistor VR1, and the second input terminal of the second sensing channel SC 2713 may be connected to the second variable resistor VR2. Further, the second input terminal 2713 of the third sensing channel SC may be connected to the third variable resistor VR3, and the second input terminal 2713 of the fourth sensing channel SC may be connected to the fourth variable resistor VR4. Similarly to the first mode MD1, in the second mode MD2, each of the sensing channels SCp of the proximity detector 290 may be connected to different variable resistors among the variable resistors VR1, VR2, VR3, and VR4 provided to the amplifying circuit 230.

According to some example embodiments, the gain value of the noise detection signal Ns may be independently adjusted according to the magnitude of the noise components flowing into each of the sensing channels SC of the touch detector 270 and each of the sensing channels SCp of the proximity detector 290. Explaining the first mode MD1 as an example, for each position of the first electrode member 120, the gain values of the noise detection signal Ns input to the sensing channels SC connected to the first electrode member 120 may be differentially applied. For example, among the electrode rows constituted by the first electrode member 120, when the electrode row located at the lowermost side of FIG. 20 is referred to as a first electrode row and the electrode row located at the uppermost side of FIG. 20 is referred to as a last electrode row, the magnitude of the noise detection signal Ns flowing into the sensor layer TSL may change from the first electrode row to the last electrode row in the sensing area SA. Illustratively, the magnitude of the noise detection signal Ns flowing into the sensor layer TSL may gradually increase from the first electrode row to the last electrode row in the sensing area SA. In this case, the gain value of the noise detection signal Ns may gradually increase from the first sensing channel SC connected to the first electrode member 120 of the first electrode row to the last sensing channel SC connected to the last sensing channel SC connected to the first electrode member 120 of the last electrode row. Accordingly, the gain values of the noise detection signal Ns may be independently adjusted such that the noise components included in the touch detection signal Rs or the proximity detection signal Ps are more effectively cancelled for each vertical position (for example, Y coordinate) of the first electrode member 120 in the sensor layer TSL.

Further, according to some example embodiments, during the period in which the second electrode member 130 is sequentially driven, the resistance values of the variable resistors VR1, VR2, VR3, and VR4 may be adjusted in a unit of a sub-period in which each of the second electrode members 130 is driven, thereby independently adjusting the gain values of the noise detection signal Ns in a unit of the sub-period. Accordingly, the magnitude deviation of noise, which may also occur for each of the left and right positions (for example, X coordinate) of the sensor layer TSL, may be compensated.

In the second mode MD2, the proximity detector 290 may be electrically connected to the first conductive member 150. The proximity detector 290 may receive a proximity detection signal Ps from the first conductive member 150 while the detection sensor TSM operates in the second mode MD2, and may detect the proximity of an object based on the proximity detection signal Ps.

As described above, the proximity detection signal Ps may include information about the mutual capacitance generated between the first electrode member 120 and the second conductive member 170, and may further include information about the mutual capacitance generated between the first electrode member 120 and the second electrode member 130. When the proximity driving signal Ts2 is provided to the second conductive member 170 and the second electrode member 130, a mutual capacitance Cmp is formed between the second electrode member 130 and the first electrode member 120 and between the second conductive member 170 and the first electrode member 120. Further, when a proximity event such as proximity of an object occurs, a change in mutual capacitance Cmp may occur. The first electrode member 120 may output a proximity detection signal Ps corresponding to the proximity driving signal Ts2, and the proximity detection signal Ps output by the first electrode member 120 may be input to the proximity detector 290. Further, the proximity detector 290 may detect a change amount of the mutual capacitance Cmp based on the received proximity detection signal Ps, and may detect the proximity of an object based on the detected change amount of the mutual capacitance Cmp. Illustratively, the proximity detector 290 may determine that a proximity event occurs when the change amount of the mutual capacitance Cmp detected based on the received proximity detection signal Ps exceeds the prestored reference value.

In some embodiments, the proximity detector 290 may have a structure substantially the same as or similar to that of the touch detector 270. Illustratively, the proximity detector 290 may include a plurality of sensing channels SCp electrically connected to each of the first electrode members 120 in the second mode MD2, and may further include at least one analog-digital converter 293 connected to each of the sensing channels SCp, and a processor 295.

The sensing channel SCp may include an amplifier that receives the proximity detection signal Ps from each of the first electrode members 120 and amplifies and outputs the received proximity detection signal Ps.

The sensing channel SCp of the proximity detector 290 may have substantially the same structure as the sensing channel SC of the touch detector 270. Illustratively, the sensing channel SCp of the proximity detector 290 may include an amplifier 291 that receives the proximity detection signal Ps and amplifies and outputs the received proximity detection signal Ps, and the amplifier 291 may include a first input terminal 2911, a second input terminal 2913, and an output terminal 2915. The first input terminal 2911 may be electrically connected to the first electrode member 120 through the third wiring 905 to receive the proximity detection signal Ps. The second input terminal 2913 may be electrically connected to the first conductive member 150 or the amplifying circuit 230 through the fourth wiring 907 to receive the noise detection signal Ns. The output terminal 2915 may be electrically connected to the analog-to-digital converter 293 to output the proximity detection signal Ps, from which noise is removed or reduced, to the analog-to-digital converter 293.

In some embodiments, the sensing channel SCp may further include a capacitor Cp and a reset switch SWp connected in parallel with each other between the first input terminal 2911 and the output terminal 2915.

The analog to digital converter 293 may convert the input analog signal into a digital signal. According to some example embodiments, the analog-to-digital converter 293 may be provided as many as the number of the first electrode members 120 to correspond to the first electrode members 120 at a 1:1 ratio.

The processor 295 processes a signal received from the analog-to-digital converter 293 and detects the proximity of an object based on the signal processing result. According to some example embodiments, the processor 295 may be implemented as a microprocessor (MPU), but the present invention is not limited thereto. However, the structure of the above-described proximity detector 290 is one example, but is not limited thereto. In addition, the configuration of the proximity detector 290 may be variously changed. Alternatively, in some other embodiments, the proximity detector 290 is not separately provided, and the touch detector 270 may perform a proximity detection operation in the second mode MD2.

The sensing sensor TSM according to the above-described embodiment may effectively cancel a noise signal flowing from the display panel 300 and the like, and may improve a signal-to-noise ratio SNR. Thus, the touch sensing sensitivity and proximity sensing sensitivity of the detection sensor TSM according to the noise signal may be improved.

Because the sensing sensor TSM according to the above-described embodiment may detect the proximity of an object, there is a characteristic that the structure of the display device 1 is simplified, and a characteristic that a separate optical proximity may be omitted, and thus an additional hole is not required to be formed. In some embodiments, pre-programmed operations of the display device 1 may be output according to the proximity of an object. For example, pre-programmed functions such as a screen lock operation, a screen off operation, stop touch detection of a touch sensor, application invocation, and call receiving.

Figure 22:
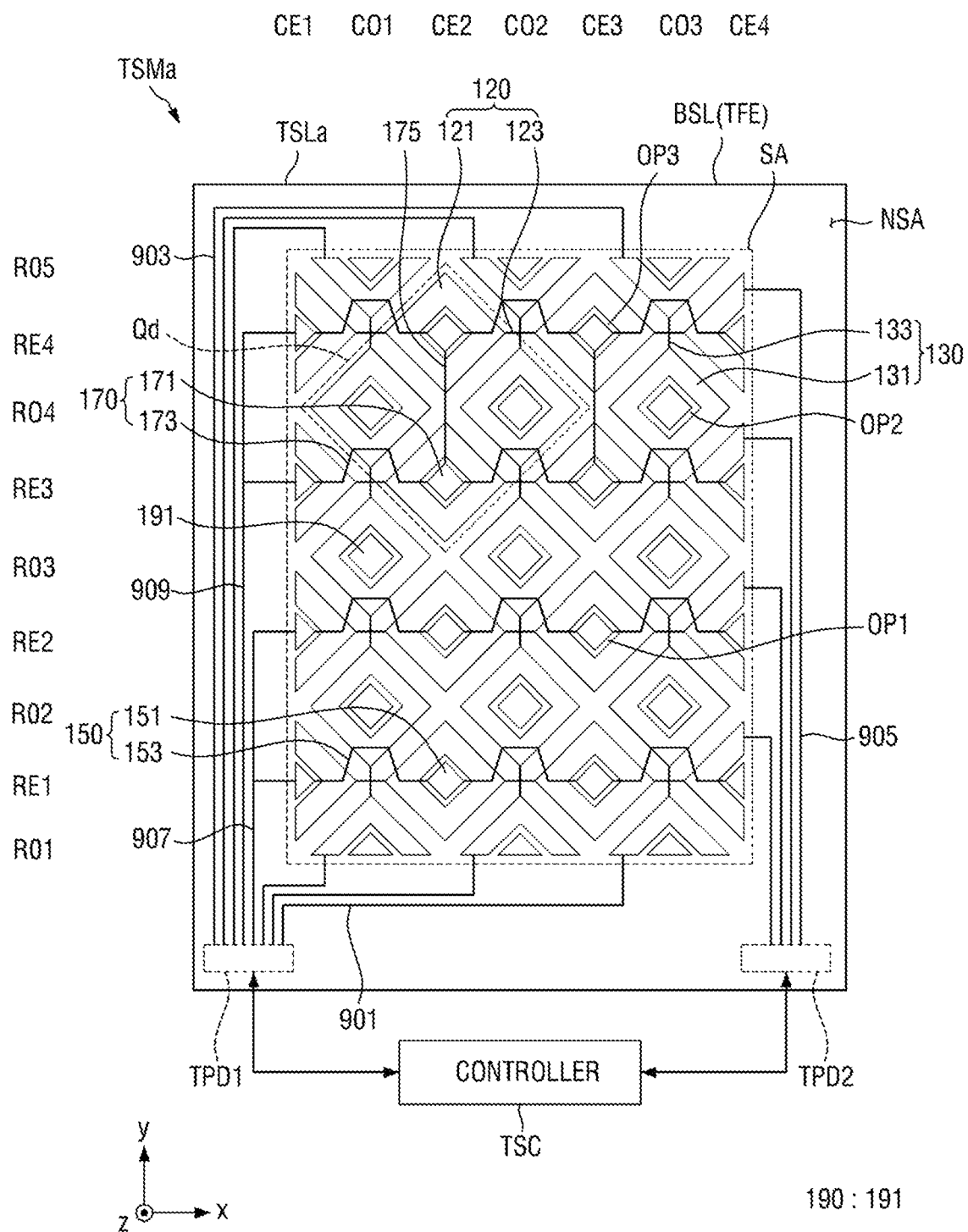
FIG. 22 is a view showing a modified example of the detection sensor shown in FIG. 10.
Figure 23:
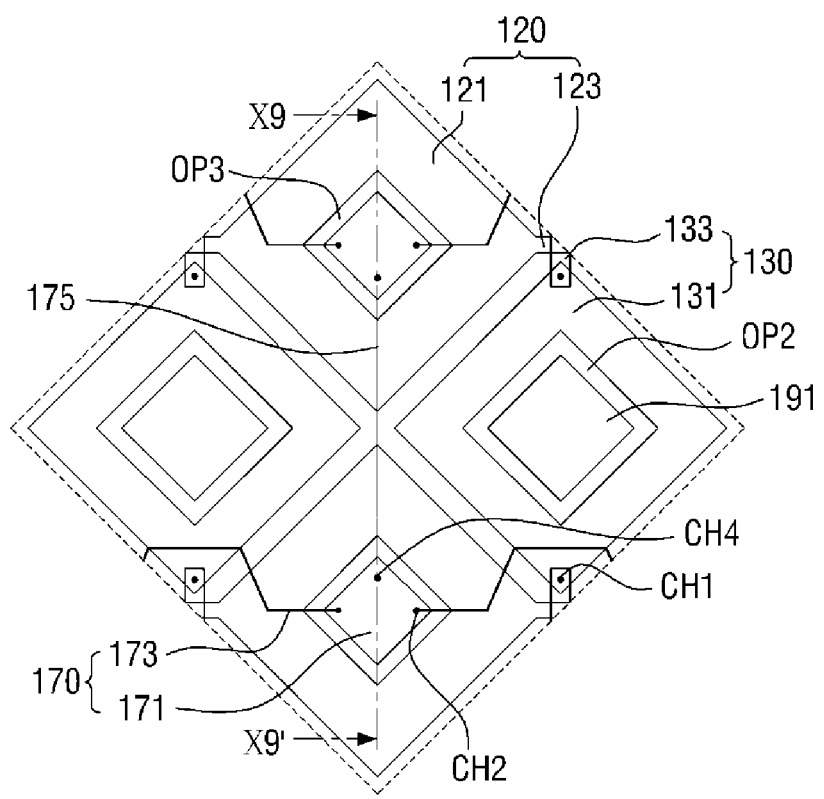
FIG. 23 is an enlarged plan view of the portion Qd of FIG. 22.
Figure 24:
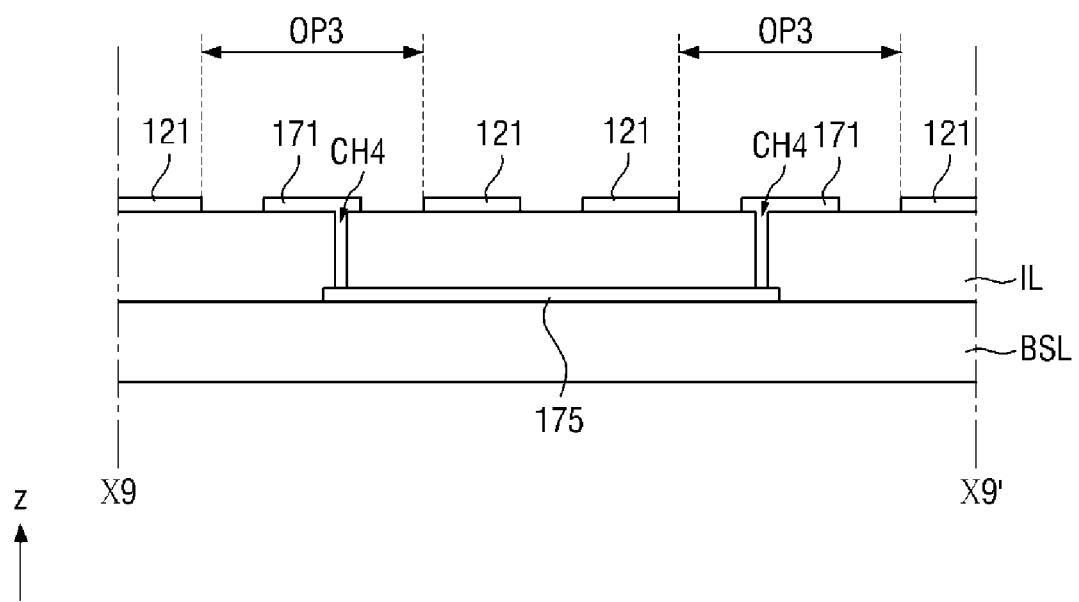
FIG. 24 is a cross-sectional view of the sensor layer taken along the line X9-X9' of FIG. 23.

FIG. 22 is a view showing a modified example of the detection sensor shown in FIG. 10, FIG. 23 is an enlarged plan view of the portion Qd of FIG. 22, and FIG. 24 is a cross-sectional view of the sensor layer taken along the line X9-X9' of FIG. 23.

Referring to FIGS. 22 to 24, a detection sensor TSMa according to some example embodiments is different from that of the embodiment of FIGS. 10 to 18 in that a sensor layer TSLa further includes a first connection pattern 175. Other configurations thereof are substantially the same as or similar to those of the embodiment of FIGS. 10 to 18. Therefore, hereinafter, differences will be mainly described.

The first connection pattern 175 may electrically connect neighboring second conductive patterns 171 to each other in the second direction y.

In some embodiments, the first connection pattern 175 may be formed of a different layer from the second conductive pattern 171. Illustratively, the first connection pattern 175 may be formed of the first conductive layer ML1 described above with reference to FIG. 3, and may include the conductive material described above in the description of the first conductive layer ML1. Because the first connection pattern 175 is formed of the first conductive layer ML1, an insulating layer IL may be located between the first connection pattern 175 and the second conductive pattern 171. In some embodiments, as shown in FIG. 24, the first connection pattern 175 and the second conductive pattern 171 may be connected to and be in direct contact with each other through a fourth contact hole CH4 formed in the insulating layer IL.

In the detection sensor TSMa, the second conductive members 170 adjacent to each other along the second direction y are electrically connected to each other through the first connection pattern 175, and thus it is possible to prevent or reduce the occurrence of signal delay (or RC delay) between the second conductive members 170 located in different electrode rows.

Figure 25:
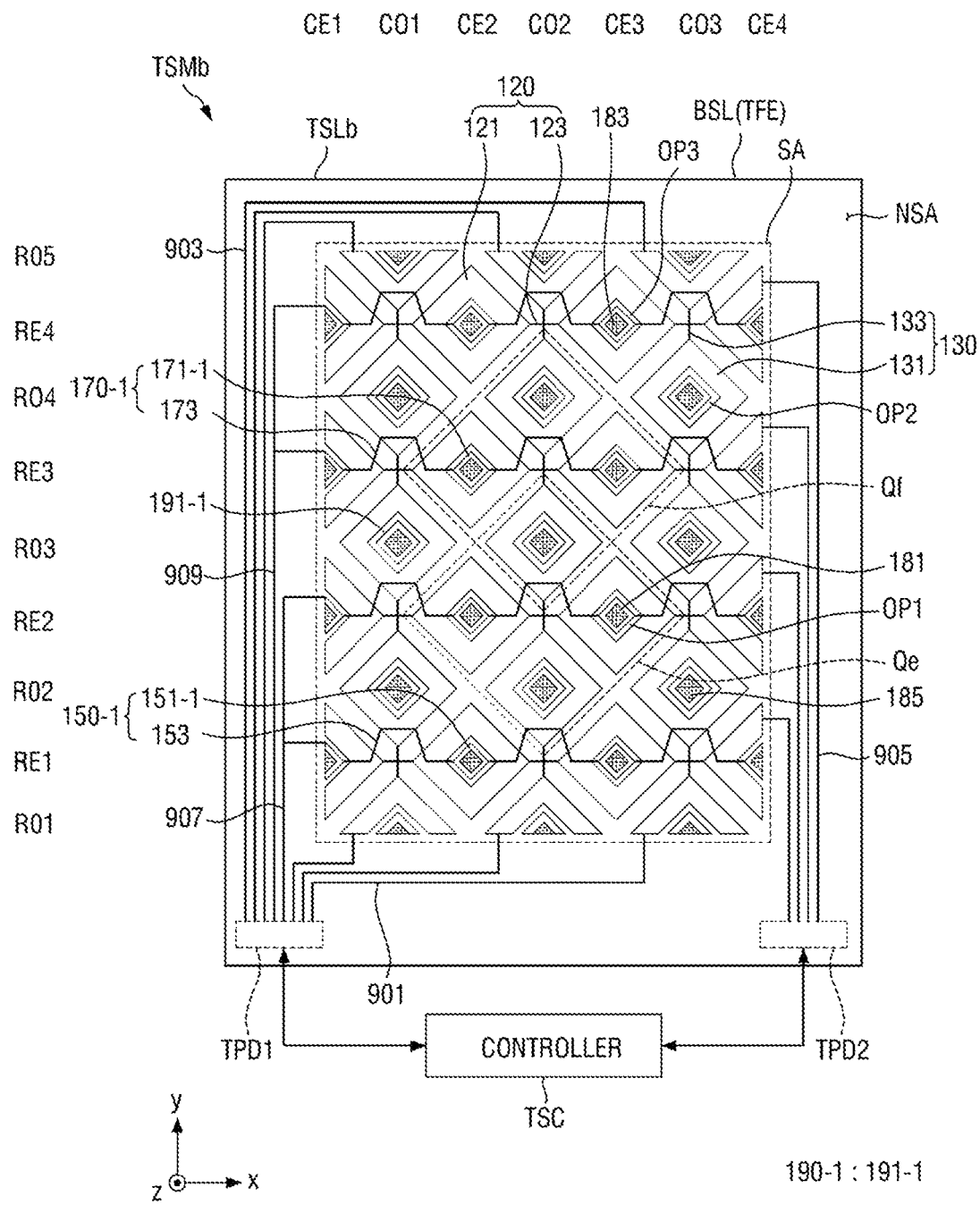
FIG. 25 is a view showing another modified example of the detection sensor shown in FIG. 10.
Figure 26:
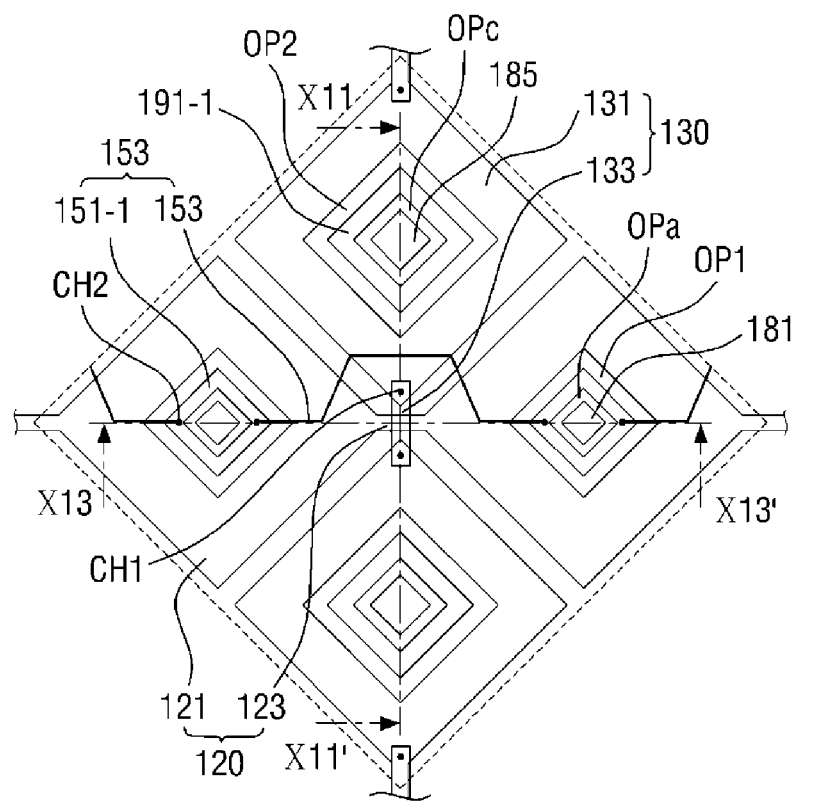
FIG. 26 is an enlarged plan view of the portion Qe of FIG. 25.
Figure 27:
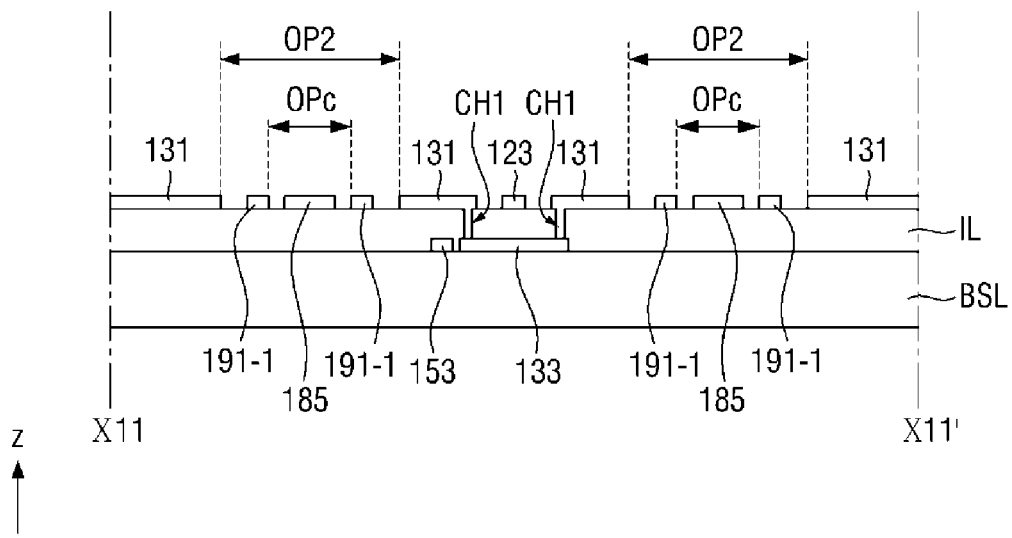
FIG. 27 is a cross-sectional view of the sensor layer taken along the line X11-X11' of FIG. 26.
Figure 28:
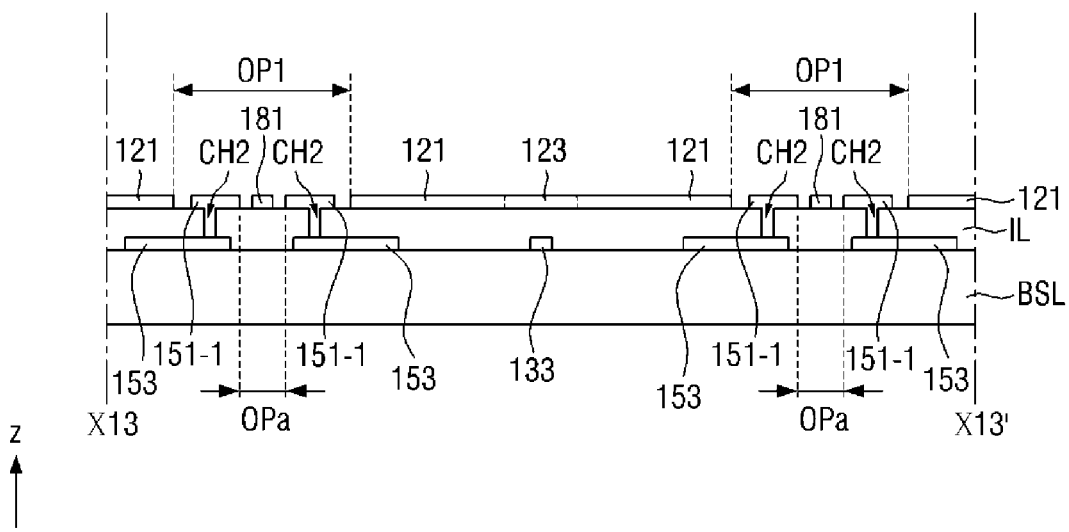
FIG. 28 is a cross-sectional view of the sensor layer taken along the line X13-X13' of FIG. 26.
Figure 29:
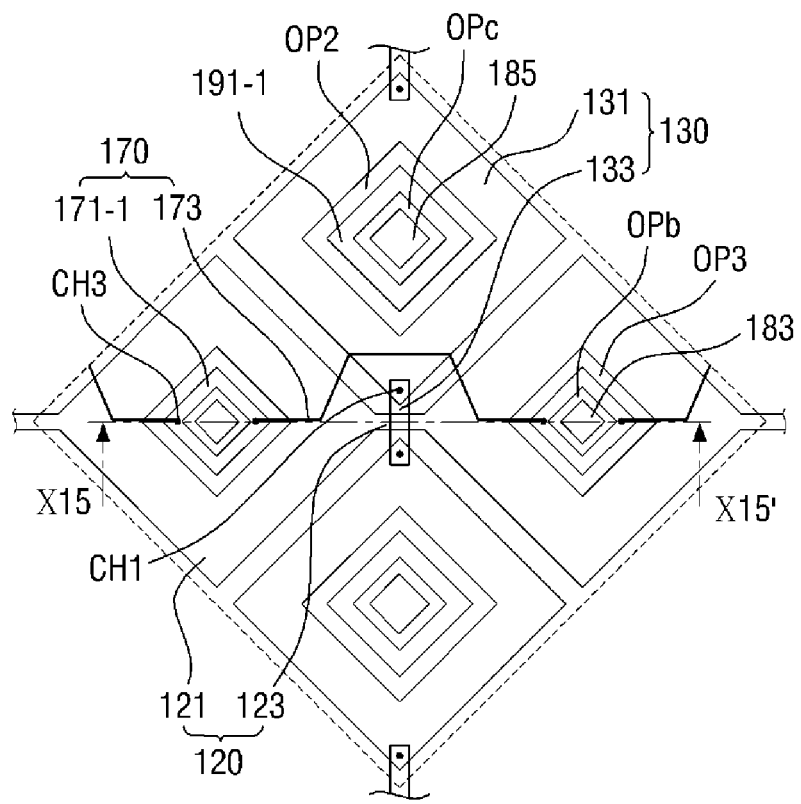
FIG. 29 is an enlarged plan view of the portion Qf of FIG. 25.
Figure 30:
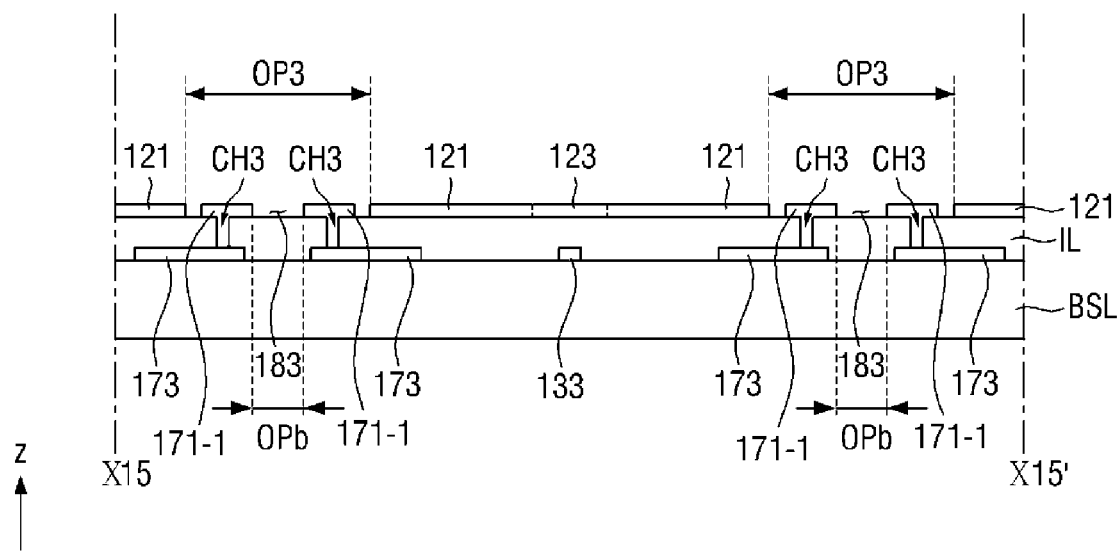
FIG. 30 is a cross-sectional view of the sensor layer taken along the line X15-X15' of FIG. 29.

FIG. 25 is a view showing another modified example of the detection sensor shown in FIG. 10, FIG. 26 is an enlarged plan view of the portion Qe of FIG. 25, FIG. 27 is a cross-sectional view of the sensor layer taken along the line X11-X11' of FIG. 26, FIG. 28 is a cross-sectional view of the sensor layer taken along the line X13-X13' of FIG. 26, FIG. 29 is an enlarged plan view of the portion Qf of FIG. 25, and FIG. 30 is a cross-sectional view of the sensor layer taken along the line X15-X15' of FIG. 29.

Referring to FIGS. 25 to 29, a detection sensor TSMb according to the present embodiment is different from that of the embodiment of FIGS. 10 to 18 in that a sensor layer TSLb includes a first conductive member 150-1, a second conductive member 170-1, a third conductive member 190-1, a first auxiliary pattern 181, a second auxiliary pattern 183, and a third auxiliary pattern 185. Other configurations thereof are substantially the same as or similar to those of the embodiment of FIGS. 10 to 18. Therefore, hereinafter, differences will be mainly described.

The first conductive pattern 151-1 of the first conductive member 150-1 may include a first auxiliary opening OPa, and an insulating layer IL may be exposed through the first auxiliary opening OPa.

The first auxiliary pattern 181 may be located in the first auxiliary opening OPa. In some embodiments, the first auxiliary pattern 181 may be spaced apart from the first conductive pattern 151-1, and may be completely surrounded by the first conductive pattern 151-1.

The second conductive pattern 171-1 of the second conductive member 170-1 may include a second auxiliary opening OPb, and the insulating layer IL may be exposed through the second auxiliary opening OPb.

The second auxiliary pattern 183 spaced apart from the second conductive pattern 171-1 may be located in the second auxiliary opening OPb. In some embodiments, the second auxiliary pattern 183 may be completely surrounded by the second conductive pattern 171-1.

The third conductive pattern 191-1 of the third conductive member 190-1 may include a third auxiliary opening OPc, and the insulating layer IL may be exposed through the third auxiliary opening OPc.

The third auxiliary pattern 185 spaced apart from the third conductive pattern 191-1 may be located in the third auxiliary opening OPc. The third auxiliary pattern 185 may be completely surrounded by the third conductive pattern 191-1.

In some embodiments, the first auxiliary pattern 181, the second auxiliary pattern 183, and the third auxiliary pattern 185 may be formed of the second conductive layer ML2 described above with reference to FIG. 3, and each of the first auxiliary pattern 181, the second auxiliary pattern 183, and the third auxiliary pattern 185 may be a floating pattern.

According to some example embodiments, because the first conductive pattern 151-1 of the first conductive member 150-1, the second conductive pattern 171-1 of the second conductive member 170-1, and the third conductive patterns 191-1 of the third conductive member 190-1 may be provided with auxiliary openings, respectively, the default value of the mutual capacitance formed in a touch detection operation or a proximity detection operation, and thus driving frequency may be increased.

Because the first auxiliary pattern 181, the second auxiliary pattern 183 and the third auxiliary pattern 185 are located in the respective auxiliary openings, due to the difference in reflectance between the auxiliary opening and the peripheral conductive pattern, it is possible to prevent the auxiliary openings from being visually recognized.

Figure 31:
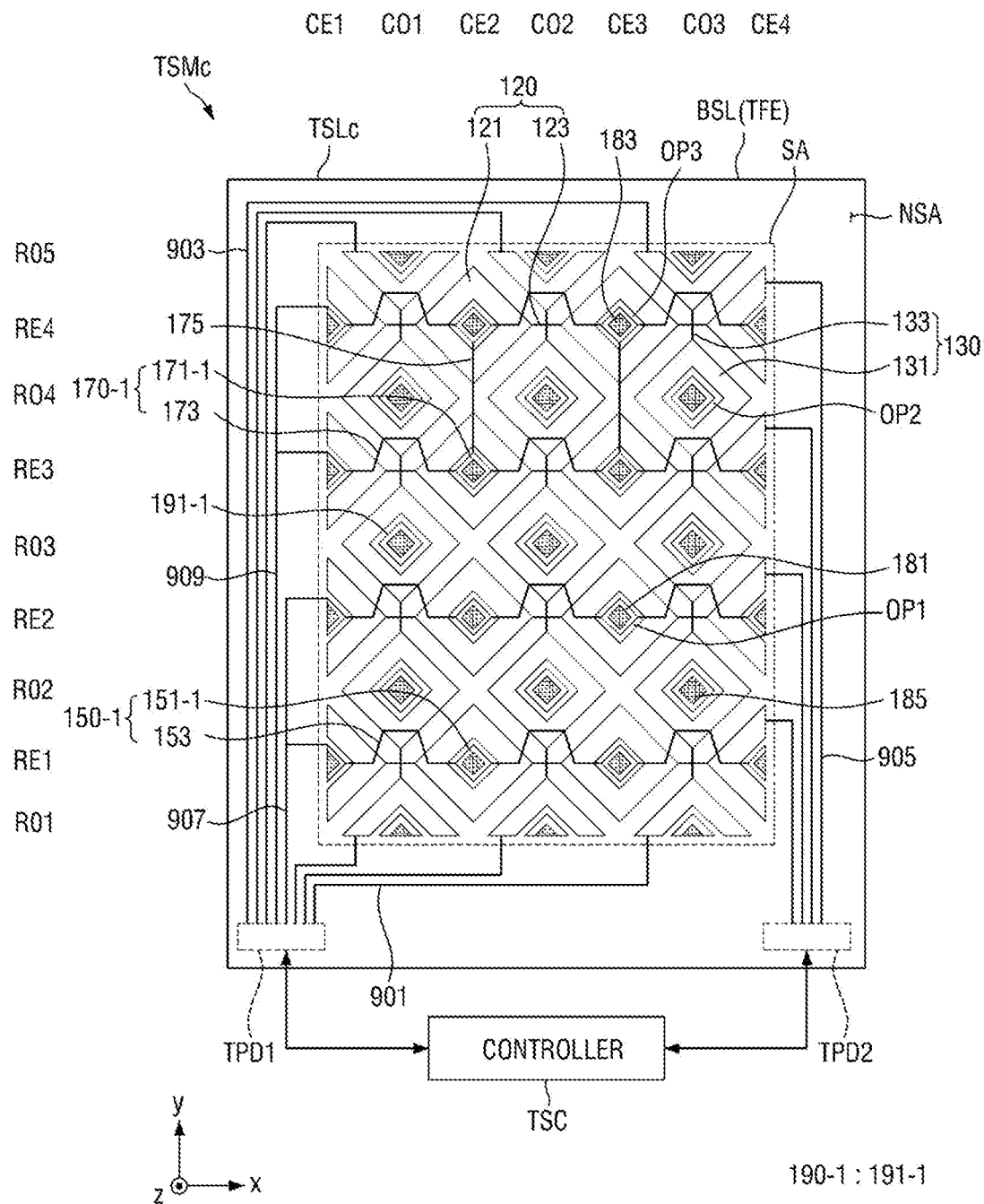
FIG. 31 is a view showing a modified example of the detection sensor shown in FIG. 25.

FIG. 31 is a view showing a modified example of the detection sensor shown in FIG. 25.

Referring to FIG. 31, a detection sensor TSMc according to the present embodiment is different from that of the embodiment of FIGS. 25 to 30 in that a sensor layer TSLc further includes a first connection pattern. Other configurations thereof are substantially the same as or similar to those of the embodiment of FIGS. 25 to 30. In addition, a detailed description of the first connection pattern 175 is the same as that described above in the embodiment of FIGS. 22 to 24, and thus will be omitted.

Figure 32:
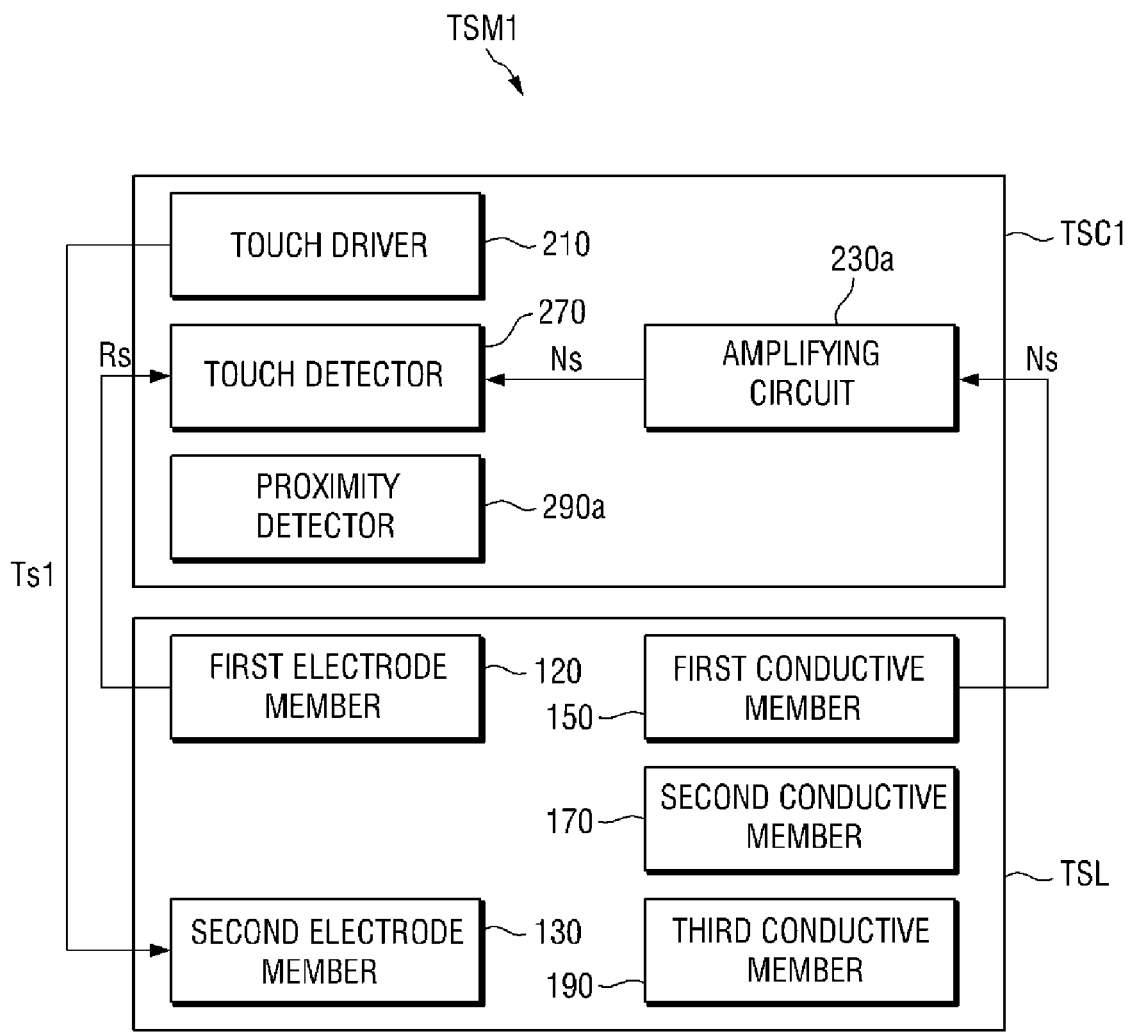
Figure 33:
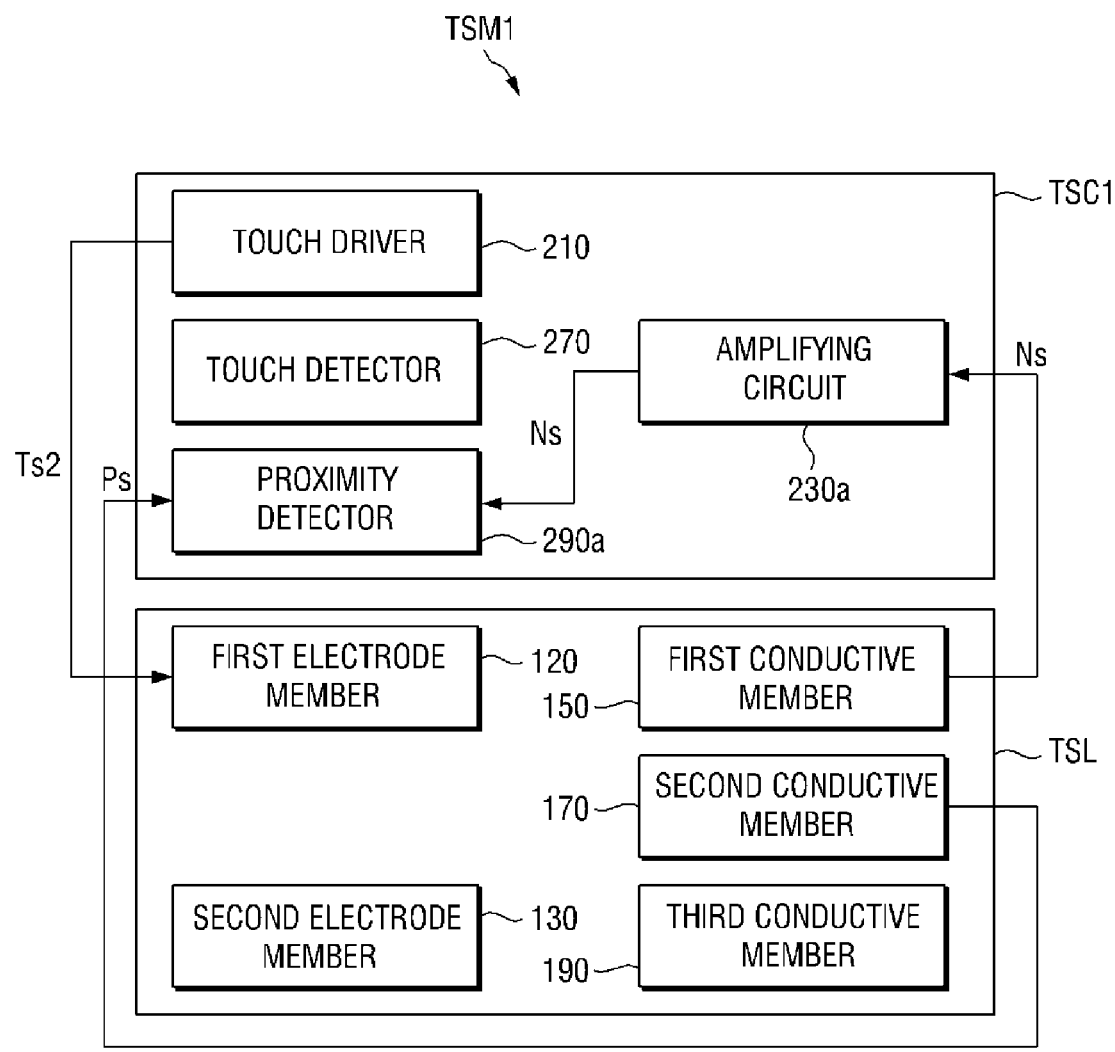
Figure 34:
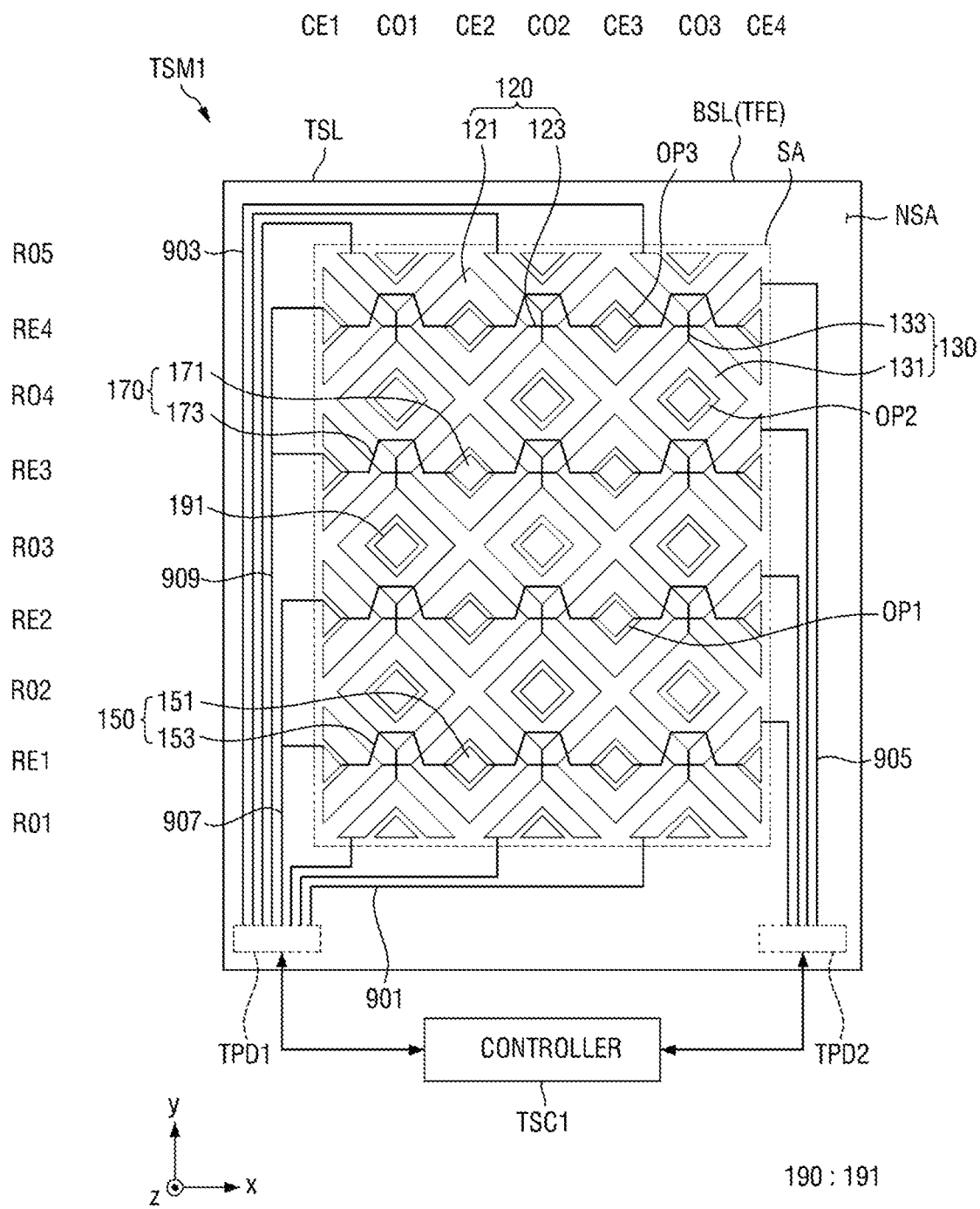
FIG. 34 is a view showing a detection sensor, which is a plan view of a sensor layer of the detection sensor and a connection relationship between the sensor layer and a controller according to some example embodiments.
Figure 35:
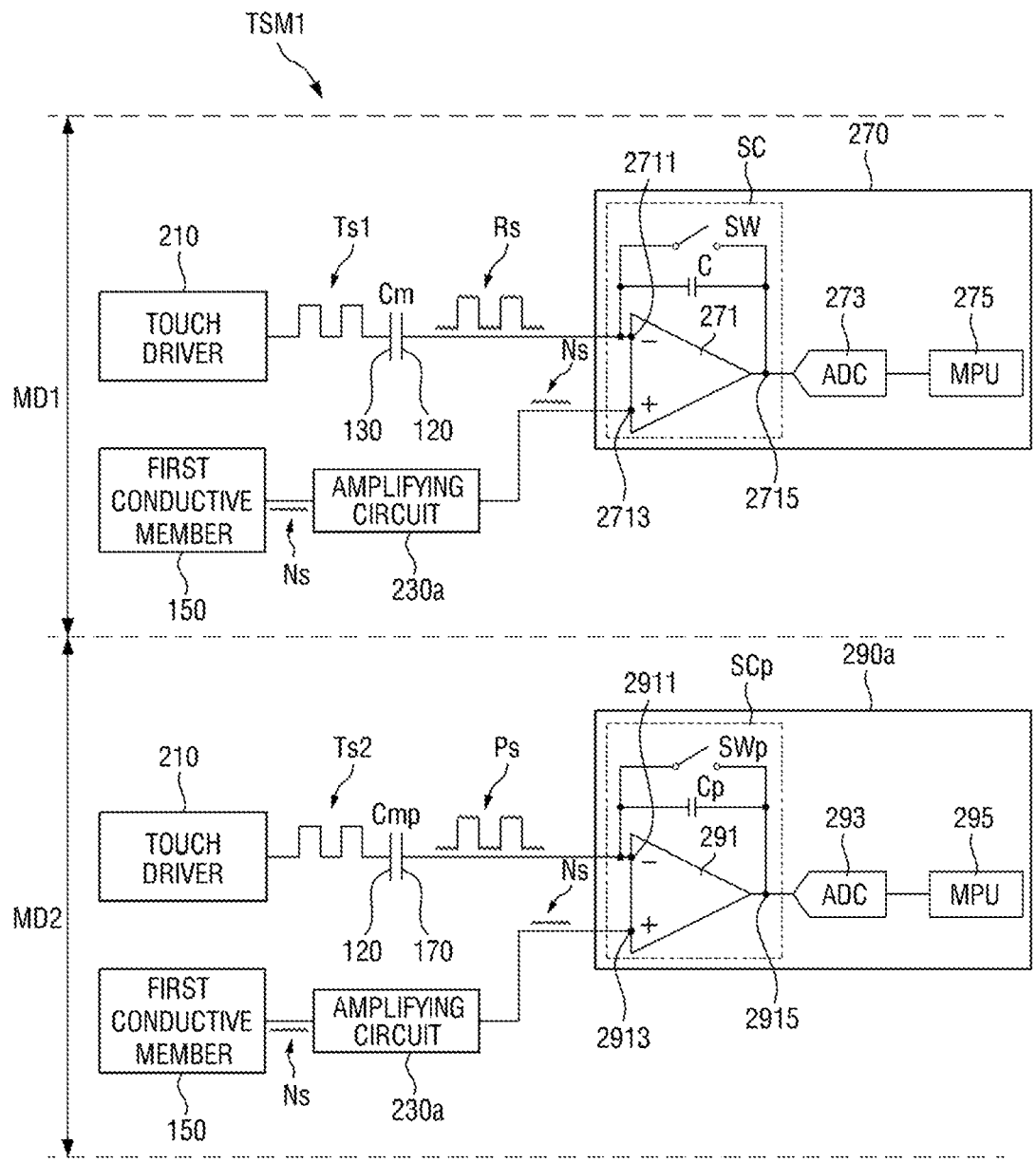
FIG. 35 is a block diagram showing an operation of a detection sensor in a first mode and an operation of the detection sensor in a second mode according to some example embodiments.
Figure 36:
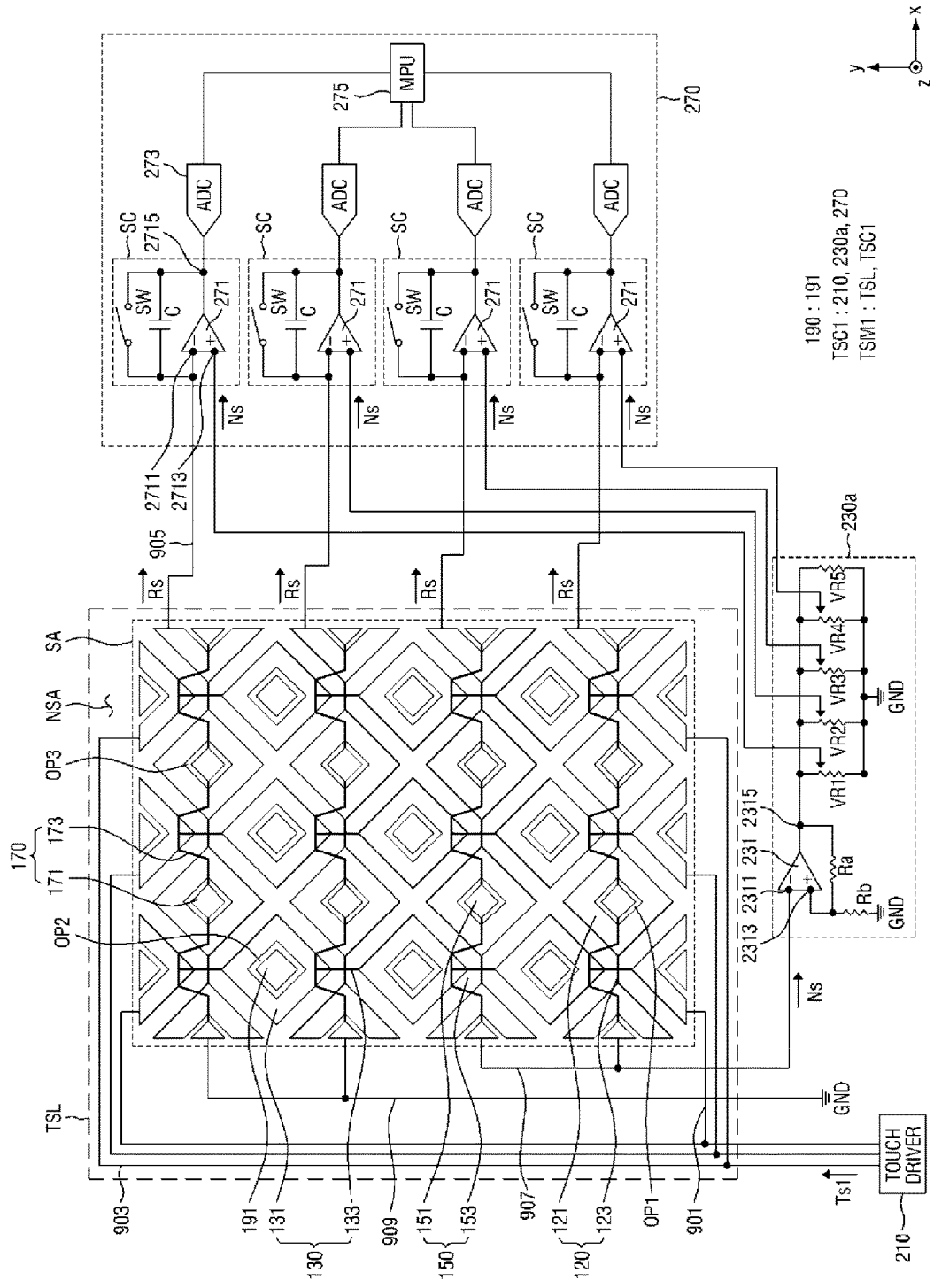
FIG. 36 is a view specifically showing a connection relationship between a sensor layer and a sensor controller when the detection sensor operates in the first mode according to some example embodiments.
Figure 37:
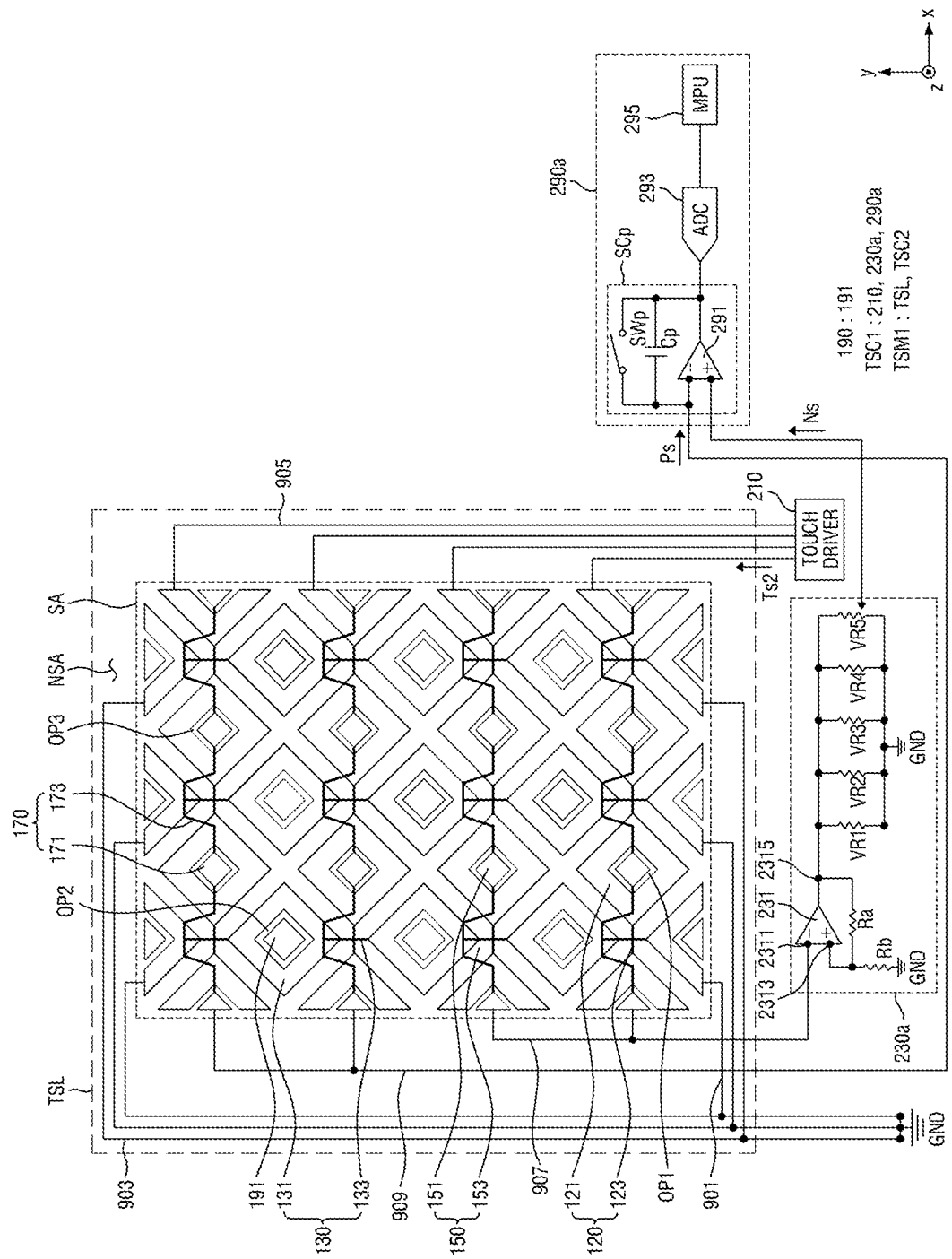
FIG. 37 is a view specifically showing a connection relationship between a sensor layer and a sensor controller when the detection sensor operates in the second mode according to some example embodiments.

FIGS. 32 and 33 are example block diagrams of detection sensors included in the display device according to some example embodiments, in which FIG. 32 is a block diagram showing an operation of the detection sensor in a first mode and FIG. 33 is a block diagram showing an operation of the detection sensor in a second mode. FIG. 34 is a view showing a detection sensor, which is a plan view of a sensor layer of the detection sensor and a connection relationship between the sensor layer and a controller according to some example embodiments. FIG. 35 is a block diagram showing an operation of a detection sensor in a first mode and an operation of the detection sensor in a second mode according to some example embodiments. FIG. 36 is a view specifically showing a connection relationship between a sensor layer and a sensor controller when the detection sensor operates in the first mode according to some example embodiments. FIG. 37 is a view specifically showing a connection relationship between a sensor layer and a sensor controller when the detection sensor operates in the second mode according to some example embodiments.

Referring to FIGS. 32 to 37, a detection sensor TSM1 according to the present invention is different from that described above in the embodiment of FIGS. 8 to 22 in that the configuration and operation of a sensor controller TSC1 are different from those of the sensor controller TSC described above in the embodiment of FIGS. 8 to 22. Other configurations thereof are substantially the same as or similar to those of the embodiment of FIGS. 25 to 30. Therefore, hereinafter, differences will be mainly described.

The sensor controller TSC1 of the detection sensor TSM1 may include a proximity detector 290a and an amplifying circuit 230a, which are different from those described in the embodiment of FIGS. 8 to 22.

The proximity detector 290a may include a sensing channel SCp corresponding to the second conductive member 170. The sense channel SCp may include an amplifier 291, a capacitor Cp, and a reset switch SWp. Description of each configuration of the sensing channel SCp is the same as that described above in the embodiment of FIGS. 8 to 22.

In some embodiments, the number of the sensing channels SCp included in the proximity detector 290a may be different from that in the embodiment of FIGS. 8 to 22. Illustratively, as shown in FIG. 37, the proximity detector 290a may include one sensing channel SCp, and the one sensing channel SCp may be electrically connected to all of the plurality of second conductive members 170. However, the present invention is not limited thereto, and according to some example embodiments, the sensing channel SCp of the proximity detector 290a may be provided to correspond to the second conductive member 170.

As shown in FIGS. 36 and 37, the amplifying circuit 230a may be different from the amplifying circuit 230 shown in FIGS. 20 and 21. More specifically, the amplifying circuit 230a may further include a fifth variable resistor VR5. The fifth variable resistor VR5 may be connected in parallel between the output terminal 2315 of the amplifier 231 and the ground power source GND. The first variable resistor VR1, the second variable resistor VR2, the third variable resistor VR3, and the fourth variable resistor VR4 of the amplifying circuit 230a may be connected to each sensing channel SC of the touch detector 270 in the first mode, and the fifth variable resistor VR5 may be connected to the sensing channel SCp of the proximity detector 290a in the second mode.

The operation of the detection sensor TSM1 in the first mode may be the same as that described above in the embodiments of FIGS. 8 to 22. For example, as shown in FIGS. 32, 35 and 36, in the first mode MD1, the touch driver 210 of the sensor controller TSC1 may provide a touch driving signal Ts1 to the second electrode member 130 through the first wiring 901 and the second wiring 903. The touch detector 270 may receive a touch detection signal Rs corresponding to the touch driving signal Ts1 from the first electrode member 120 through the third wiring 905 to detect the presence and/or position of the touch input. The touch detection signal Rs may include information about mutual capacitance Cm between the first electrode member 120 and the second electrode member 130.

The operation of the sensing sensor TSM1 in the second mode may be partially different from that described above in the embodiments of FIGS. 8 to 22. More specifically, as shown in FIGS. 33, 35 and 37, in the second mode MD2, the touch driver 210 may provide a proximity driving signal Ts2 to the first electrode member 120 through the third wiring 905. The proximity driving signal Ts2 may be sequentially provided to each of the first electrode members 120, or may be simultaneously provided to all of the first electrode members 120. In the second mode MD2, the proximity detector 290a may be electrically connected to the second conductive member 170 through the fifth wiring 909, and may receive a proximity detection signal Ps corresponding to the proximity driving signal Ts2 from the second conductive member 170 to detect the proximity of an object. The proximity detection signal Ps output by the second conductive member 170 may include information about mutual capacitance Cmp between the first electrode member 120 and the second conductive member 170.

The amplifying circuit 230a may be electrically connected to the first conductive member 150 and the touch detector 270 in the first mode MD1 as shown in FIGS. 32, 35, and 36, and may be electrically connected to the first conductive member 150 and the proximity detector 290a in the second mode as shown in FIGS. 32, 35, and 37. As described above, the first conductive member 150 and the amplifying circuit 230a may be electrically connected to each other through the fourth wiring 907.

In addition, the sensor layer TSL shown in FIGS. 32 to 34 may be substantially the same as that described above with reference to FIGS. 8 to 22. Therefore, a detailed description thereof will be omitted.

FIGS. 38, 39, 40, 41, 42, 43, and 44 are views showing modified examples of the detection sensor shown in FIG. 34, respectively.

Figure 38:
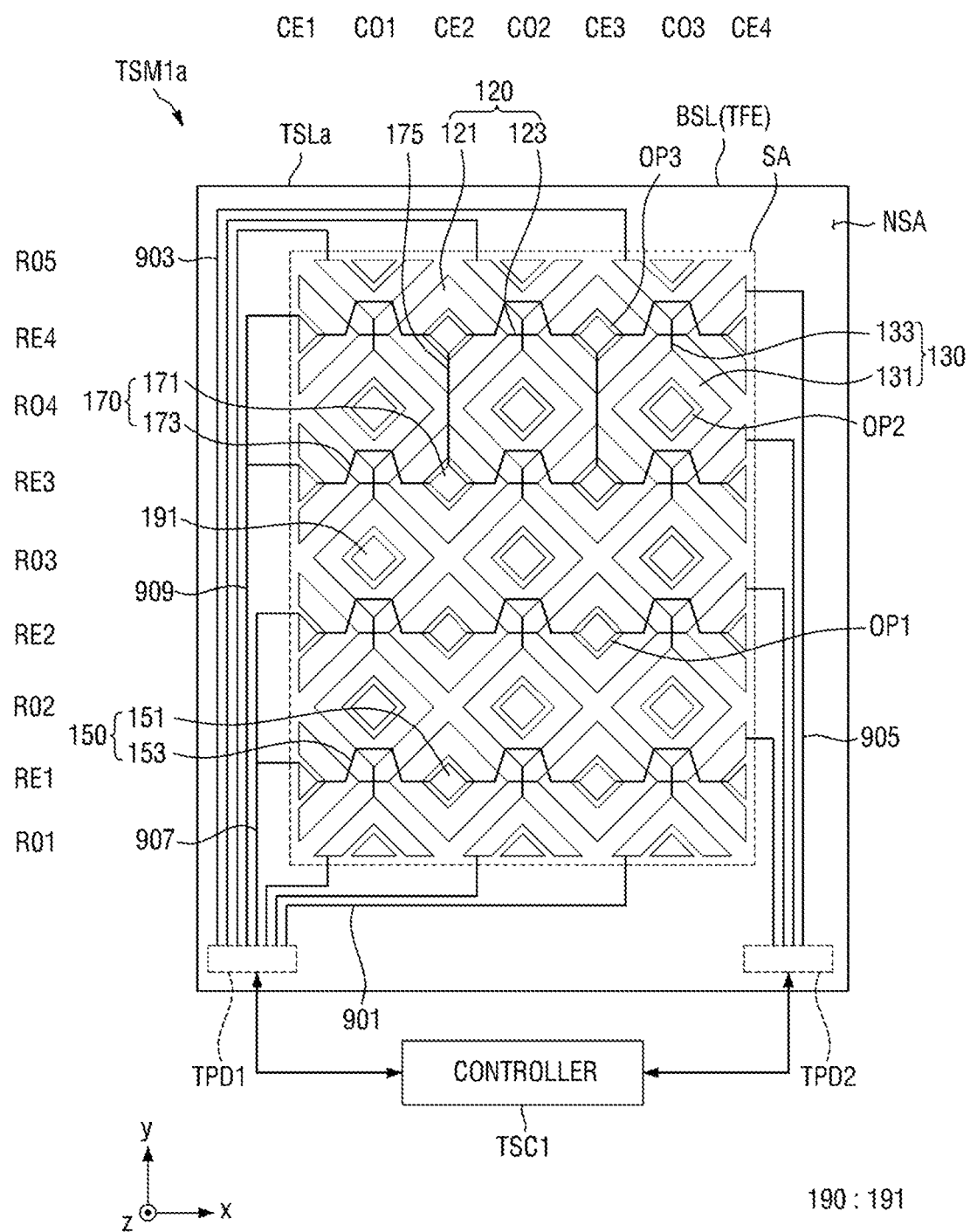
FIGS. 38, 39, 40, 41, 42, 43, and 44 showing modified examples of the detection sensor shown in FIG. 34.

Referring to FIG. 38, a detection sensor TSM1a according to the present modified example is different from that in the embodiment described with reference to FIG. 34 in that a sensor layer TSLa includes a first connection pattern 175, and the first connection pattern 175 electrically connect second conductive patterns 171 neighboring along the second direction y to each other. A description of the sensor layer TSLa is the same as that described above in the description of FIGS. 22 to 24, and thus will be omitted.

Figure 39:
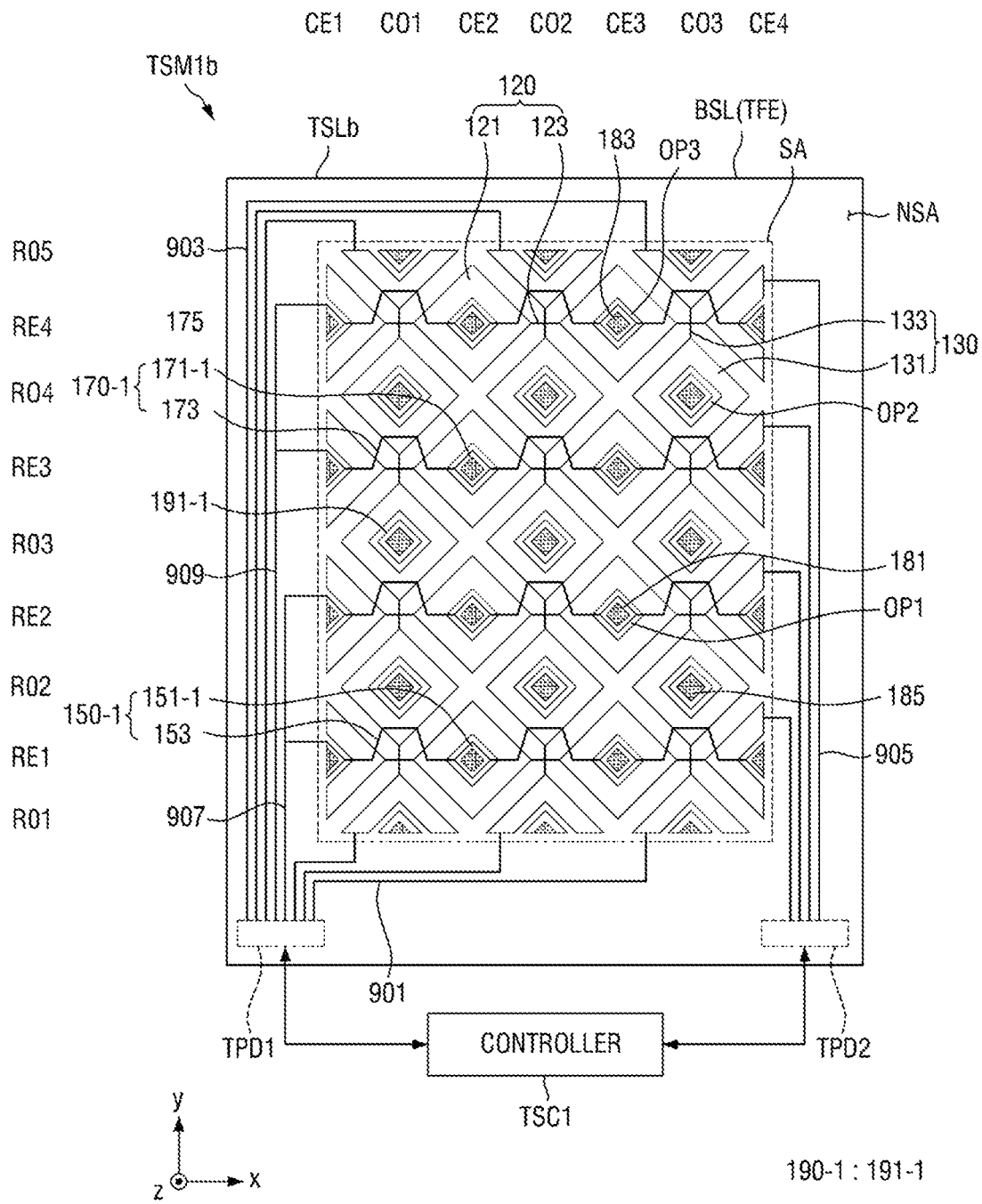

Referring to FIG. 39, a detection sensor TSM1b according to the present modified example is different from that in the embodiment described with reference to FIG. 34 in that a sensor layer TSLb includes a first conductive member 150-1, a second conductive member 170-1, a third conductive member 190-1, a first auxiliary pattern 181, a second auxiliary pattern 183, and a third auxiliary pattern 185. Other configurations thereof are substantially the same as or similar to those in the embodiment described with reference to FIG. 34. A more detailed description of the sensor layer TSLb is the same as that described above in the description of FIGS. 25 to 29, and thus will be omitted.

Figure 40:
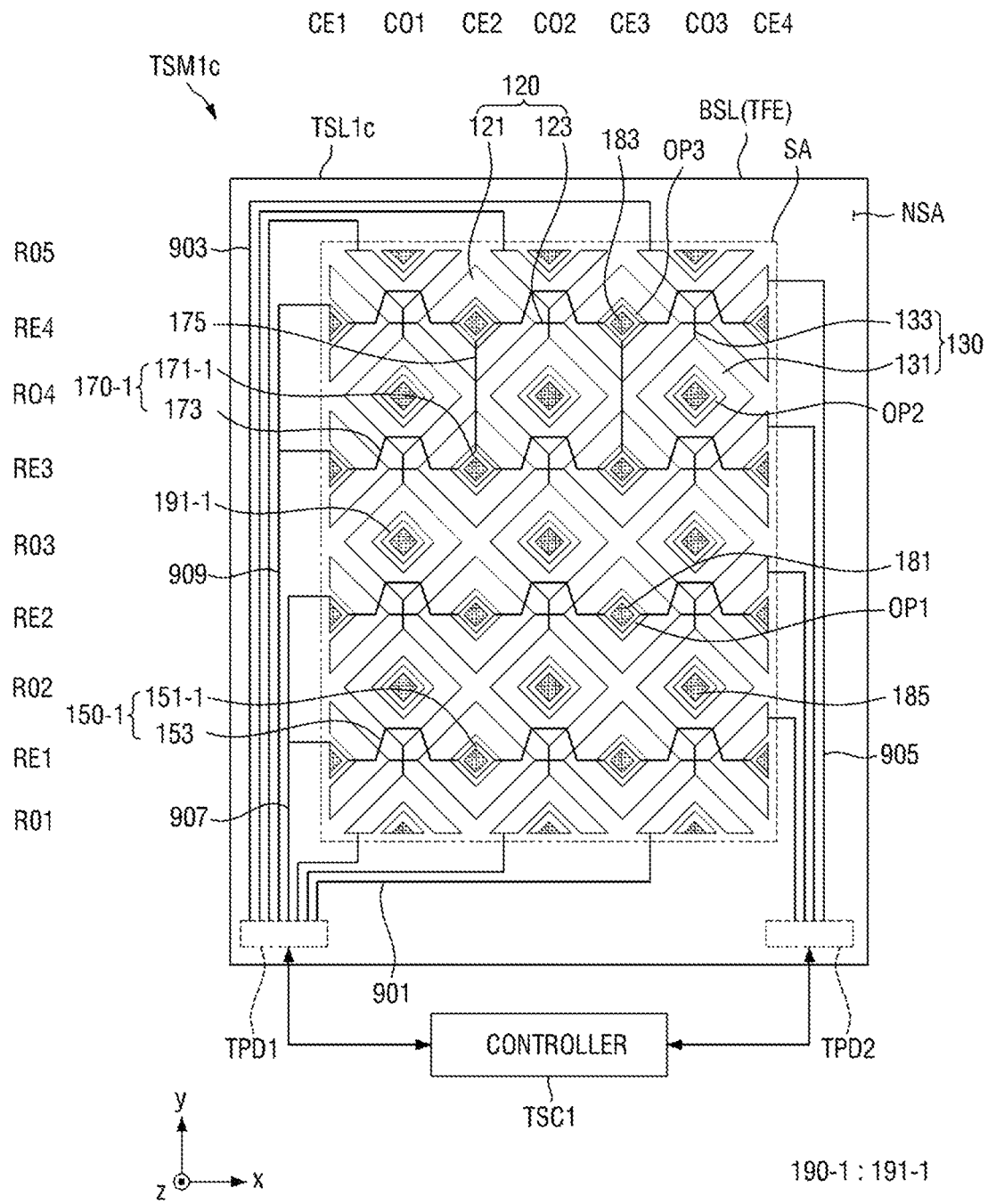

Referring to FIG. 40, a detection sensor TSM1c according to the present modified example is different from that in the embodiment described with reference to FIG. 39 in that a sensor layer TSLc further includes a first connection pattern 175, and the first connection pattern 175 electrically connect second conductive patterns 171-1 neighboring along the second direction y to each other. Other configurations thereof are substantially the same as or similar to those in the embodiment described with reference to FIG. 39.

Figure 41:
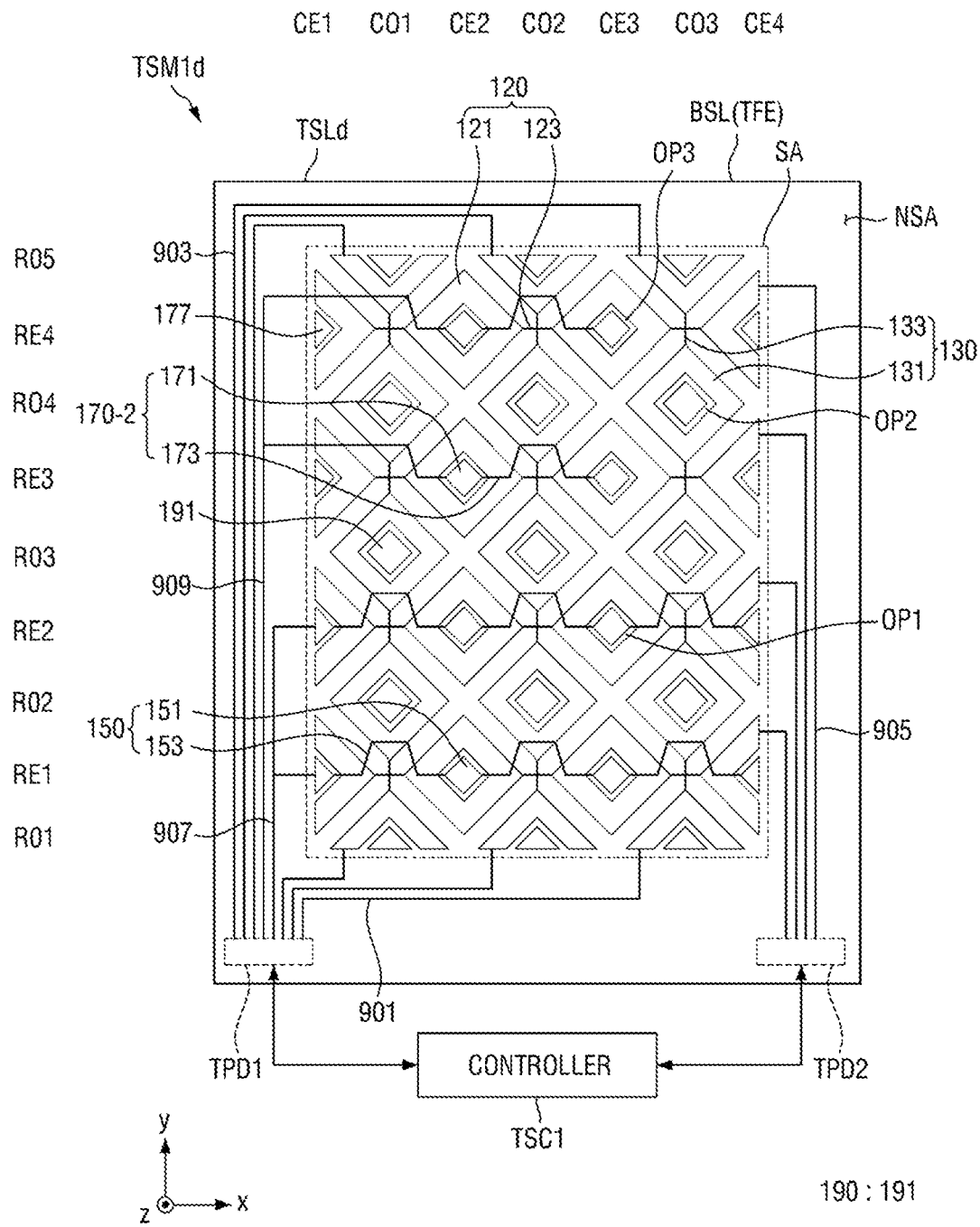

Referring to FIG. 41, a detection sensor TSM1d according to the present modified example is different from that in the embodiment described with reference to FIG. 34 in that a sensor layer TSLd further includes a second conductive member 170-2 and an edge conductive pattern 177. Other configurations thereof are substantially the same as those in the embodiment described with reference to FIG. 34.

The second conductive member 170-2 includes a second conductive pattern 171 and a second connection line 173. In some embodiments, the second conductive pattern 171 may be located in the third opening OP3, but may not be located in the electrode rows at both ends, for example, a first electrode column CE1 and a fourth electrode column CE4.

In some embodiments, the edge conductive pattern 177 spaced apart from the first sensing electrode 121 may be located in the third opening OP3 positioned in the first electrode column CE1 and the fourth electrode column CE4, and the edge conduction pattern 177 may not be connected to the second conductive member 170-2.

When a user grips the display device, the electrode rows at both ends of the sensor layer TSLd are likely to be pressed by the user's finger or placed adjacent to the user's finger. According to the present modified example, the second conductive member 170-2 outputting a proximity detection signal Ps is not located in the electrode rows at both ends of the sensor layer TSLd. Therefore, in the second mode in which a proximity sensing operation is performed, the proximity detection signal Ps may be prevented or minimized from being influenced by the user's grip.

Figure 42:
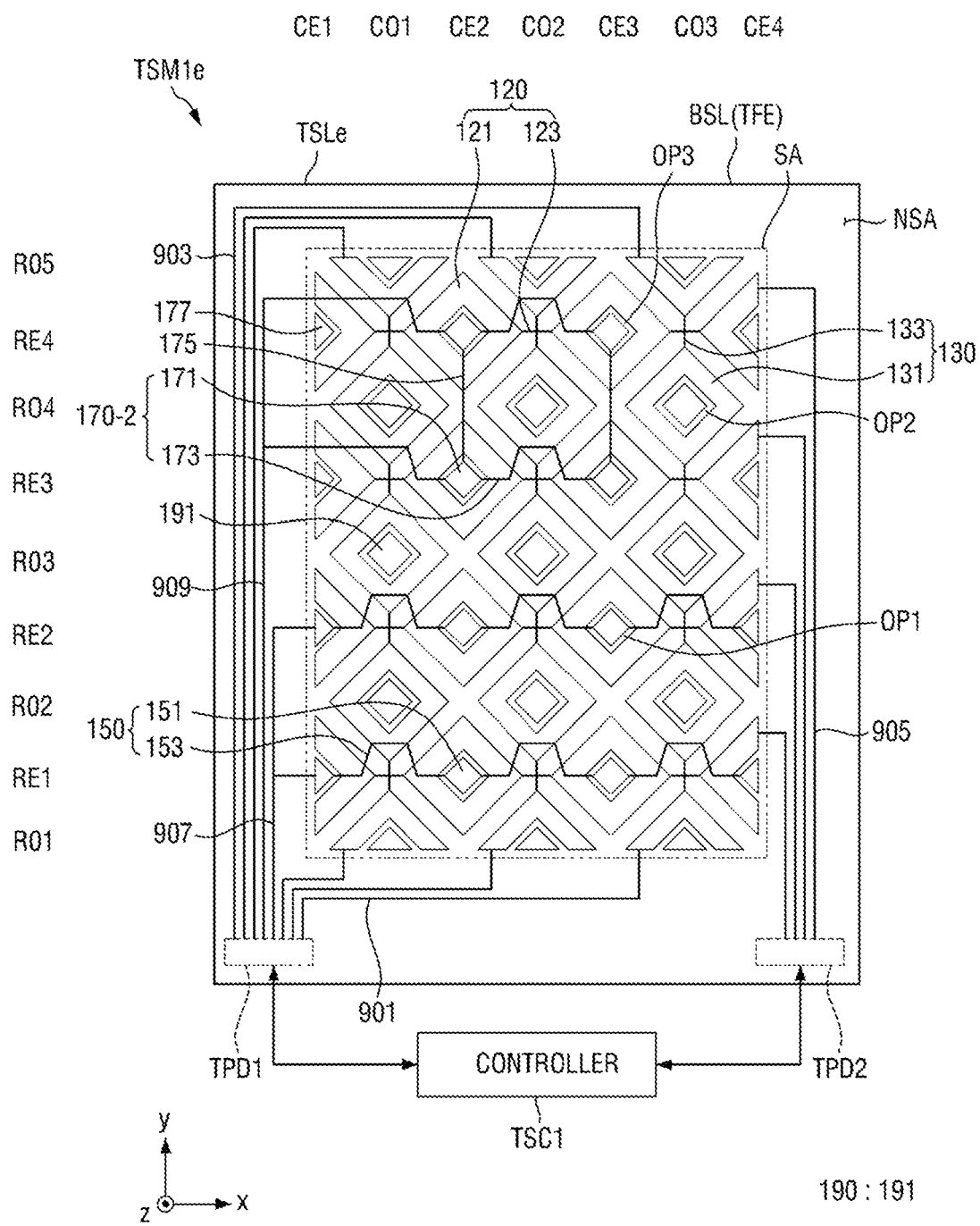

Referring to FIG. 42, a detection sensor TSM1e according to the present modified example is different from that in the embodiment described with reference to FIG. 41 in that a sensor layer TSLe includes a first connection pattern 175, and the first connection pattern 175 electrically connects second conductive patterns 171 of second conductive members 170-2 neighboring along the second direction y to each other. Because other configurations thereof are substantially the same as those in the embodiment described with reference to FIG. 41, a detailed description thereof will be omitted.

Figure 43:
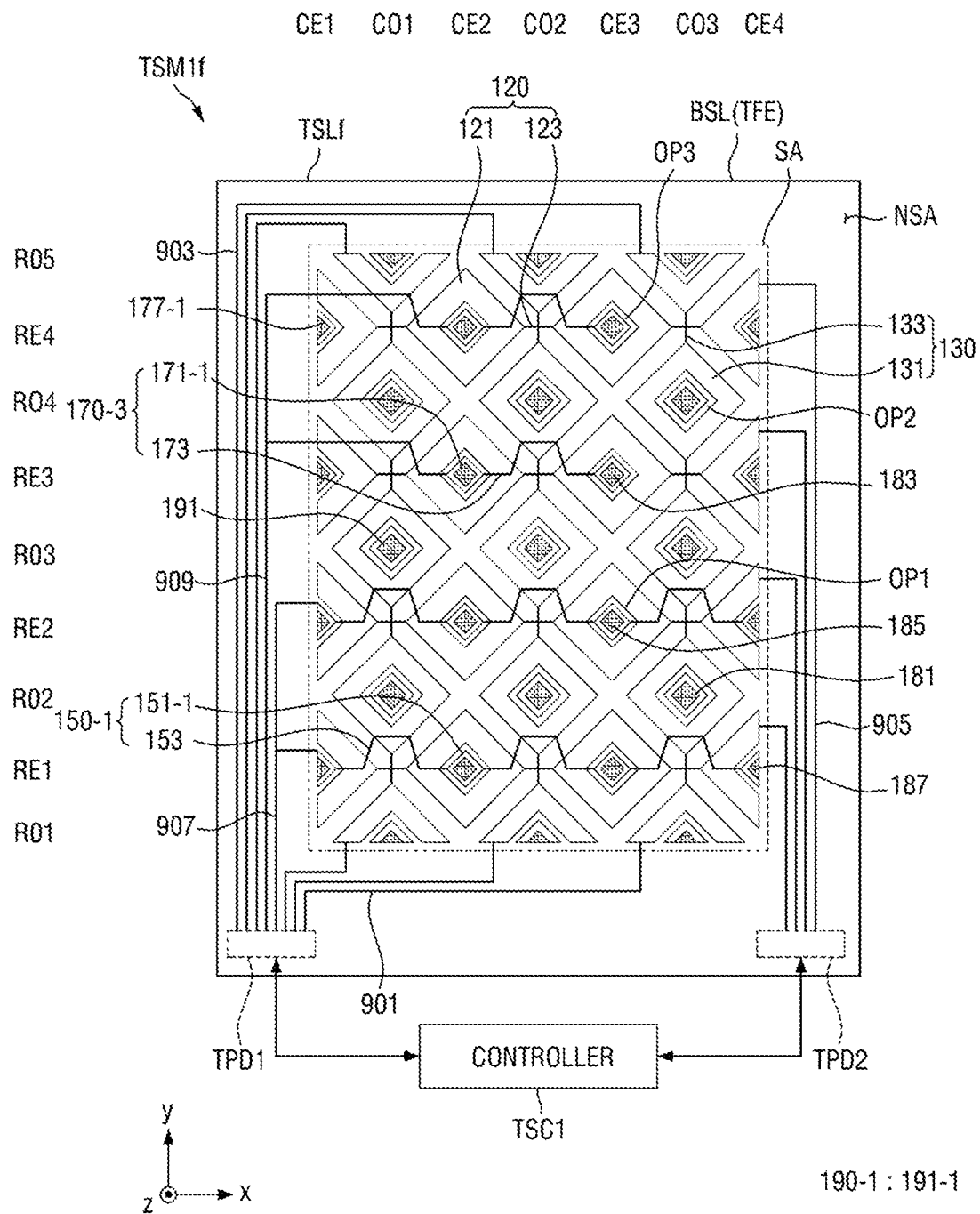

Referring to FIG. 43, a detection sensor TSM1f according to the present modified example is different from that in the embodiment described with reference to FIG. 42 in that a sensor layer TSLf includes a first conductive member 150-1, a second conductive member 170-3, a third conductive member 190-1, an edge conductive pattern 177-1, a first auxiliary pattern. 181, a second auxiliary pattern 183, and a third auxiliary pattern 185. Other configurations thereof are substantially the same as those in the embodiment described with reference to FIG. 42. Further, descriptions of the first conductive member 150-1, the second conductive member 170-3, the third conductive member 190-1, the edge conductive pattern 177-1, the first auxiliary pattern. 181, the second auxiliary pattern 183, and the third auxiliary pattern 185 may be substantially the same as or similar to those described above with reference to the embodiments of FIGS. 25 to 29.

The first conductive pattern 151-1 of the first conductive member 150-1 may include a first auxiliary opening, as described above with reference to FIGS. 25 to 29, and the first auxiliary pattern 181 may be located in the first auxiliary opening.

The second conductive pattern 171-1 and edge conductive pattern 177-1 of the second conductive member 170-3 may include a second auxiliary opening, as described above with reference to FIGS. 25 to 29, and the second auxiliary pattern 183 may be located in the second auxiliary opening.

The third conductive pattern 191-1 of the third conductive member 190-1 may include a third auxiliary opening, as described above with reference to FIGS. 25 to 29, and the third auxiliary pattern 185 spaced apart from the third conductive pattern 191-1 may be located in the third auxiliary opening.

Figure 44:
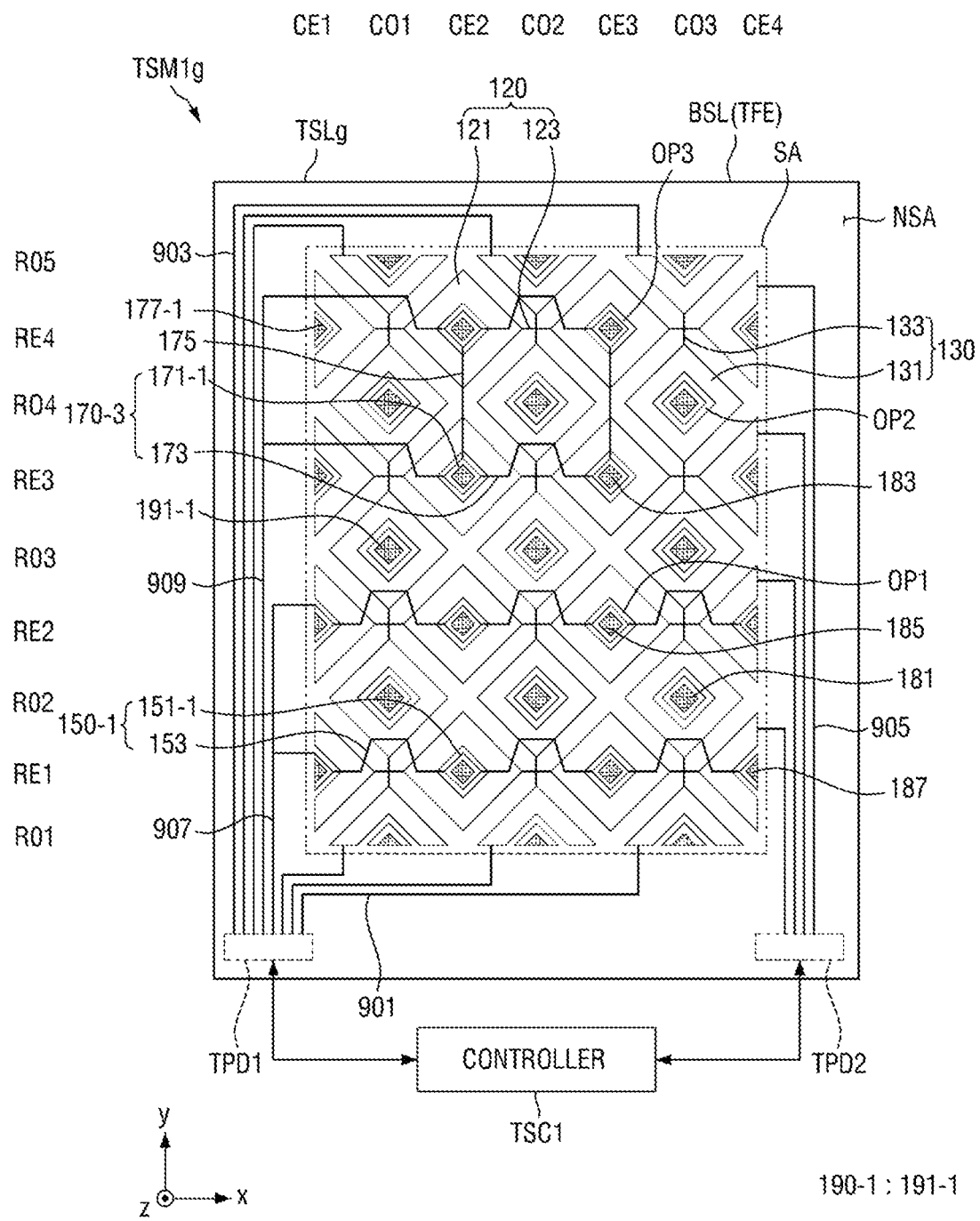

Referring to FIG. 44, a detection sensor TSM1g according to the present modified example is different from that in the embodiment described with reference to FIG. 43 in that a sensor layer TSLg includes a first connection pattern 175, and the first connection pattern 175 electrically connects second conductive patterns 171-1 of second conductive members 170-3 neighboring along the second direction y to each other. Because other configurations thereof are substantially the same as those in the embodiment described with reference to FIG. 43, a detailed description thereof will be omitted.

Figure 45:
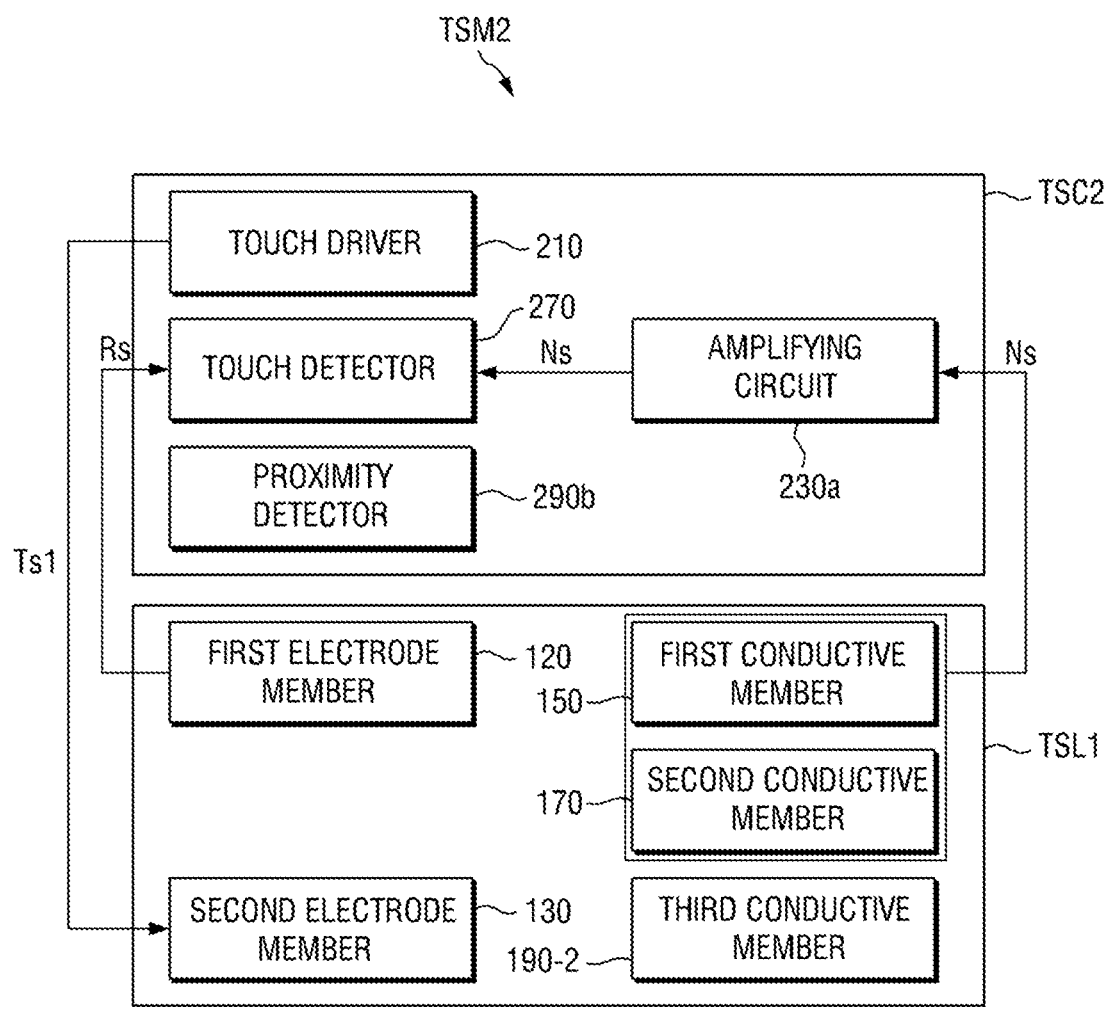
Figure 46:
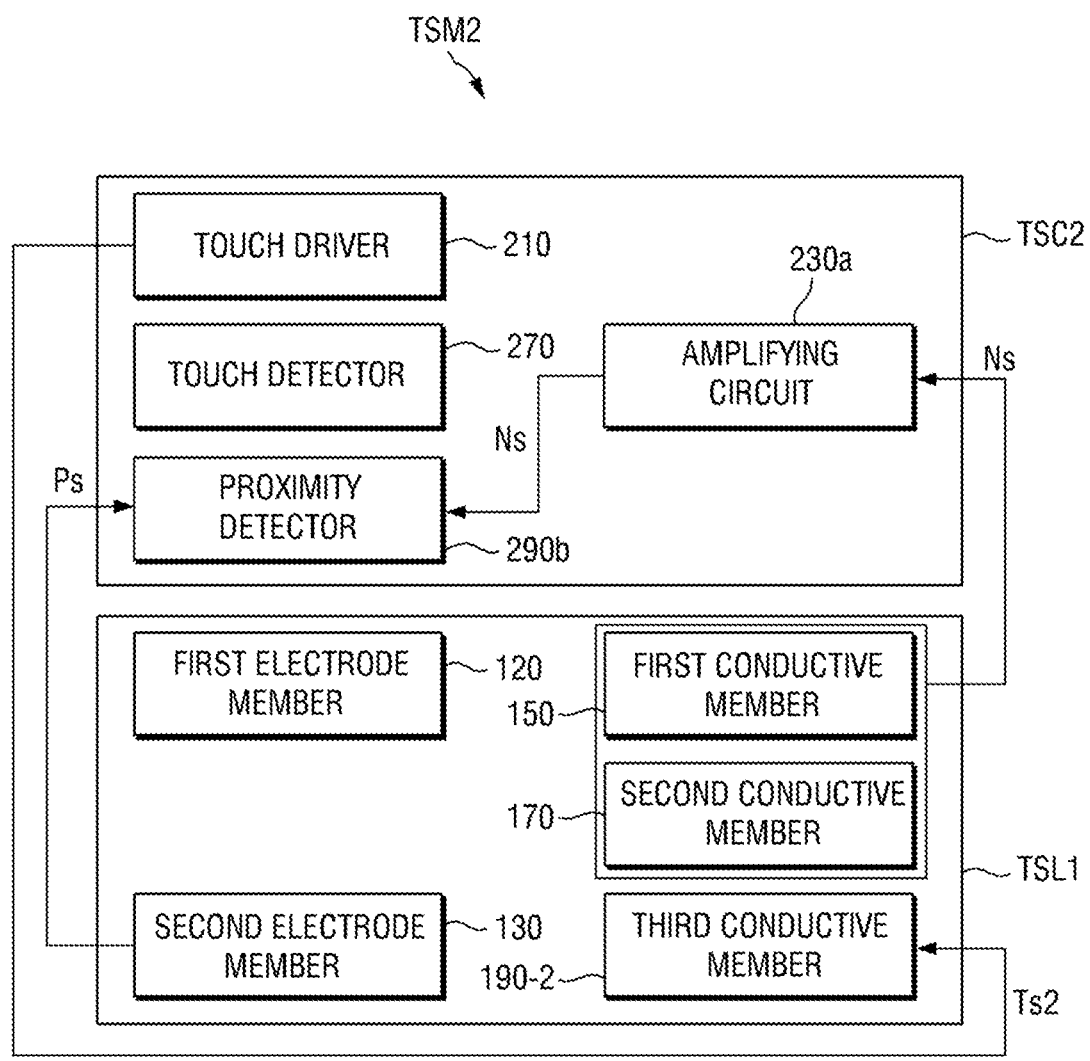

FIGS. 45 and 46 are example block diagrams of detection sensors included in the display device according to some example embodiments, in which FIG. 45 is a block diagram showing an operation of the detection sensor in a first mode and FIG. 46 is a block diagram showing an operation of the detection sensor in a second mode.

Referring to FIGS. 45 and 46, a detection sensor TSM2 may include a sensor controller TSC1 and a sensor layer TSL1. The sensor controller TSC2 may include a touch driver 210, an amplifying circuit 230a, a touch detector 270, and a proximity detector 290b.

The sensor layer TSL1 may include a first electrode member 120 and a second electrode member 130, and may further include a first conductive member 150, a second conductive member 170, and a third conductive member 190-2.

As shown in FIG. 45, in the first mode in which a touch sensing operation is performed, the touch driver 210 may provide a touch driving signal Ts1 to the second electrode member 130. The first conductive member 150 may provide a touch detection signal Rs generated in response to the touch driving signal Ts1 to the touch detector 270.

As shown in FIG. 45, in the first mode, the first conductive member 150 and the second conductive member 170 may provide a noise detection signal Ns to the amplifying circuit 230a. The amplifying circuit 230a may amplify the noise detection signal Ns and provide the amplified noise detection signal Ns to the touch detector 270.

As shown in FIG. 46, in the first mode in which a proximity sensing operation is performed, the touch driver 210 may provide a proximity driving signal Ts2 to the third conductive member 190-2. The second conductive member 170 may provide a proximity detection signal Ps generated in response to the proximity driving signal Ts2 to the proximity detector 290. In the second mode, the first conductive member 150 and the second conductive member 170 may provide a noise detection signal Ns to the amplifying circuit 230a. The amplifying circuit 230a may amplify the noise detection signal Ns and provide the amplified noise detection signal Ns to the proximity detector 290.

Figure 47:
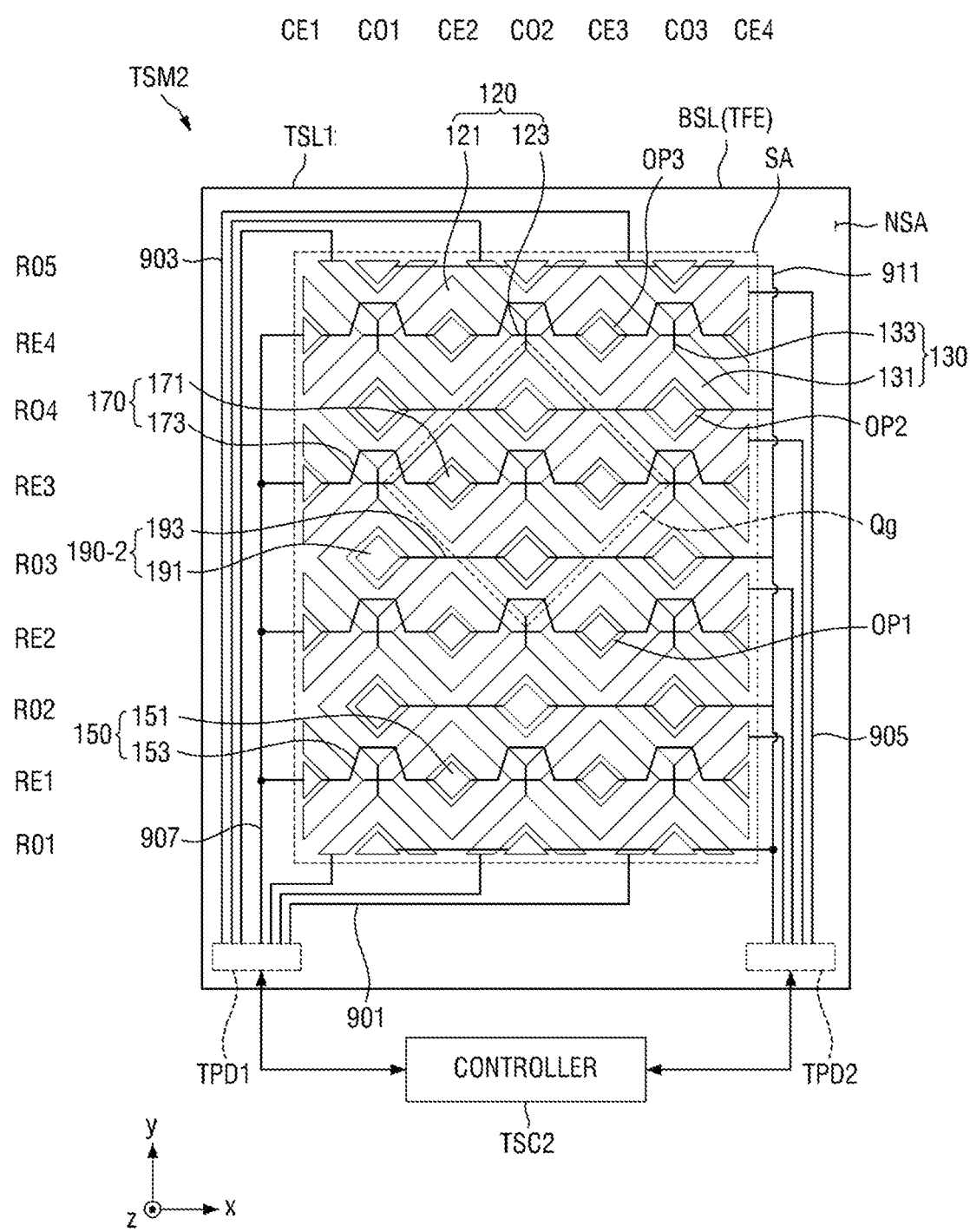
FIG. 47 is a view showing a detection sensor, which is a plan view of a sensor layer of the detection sensor and a connection relationship between the sensor layer and a controller according to some example embodiments.
Figure 48:
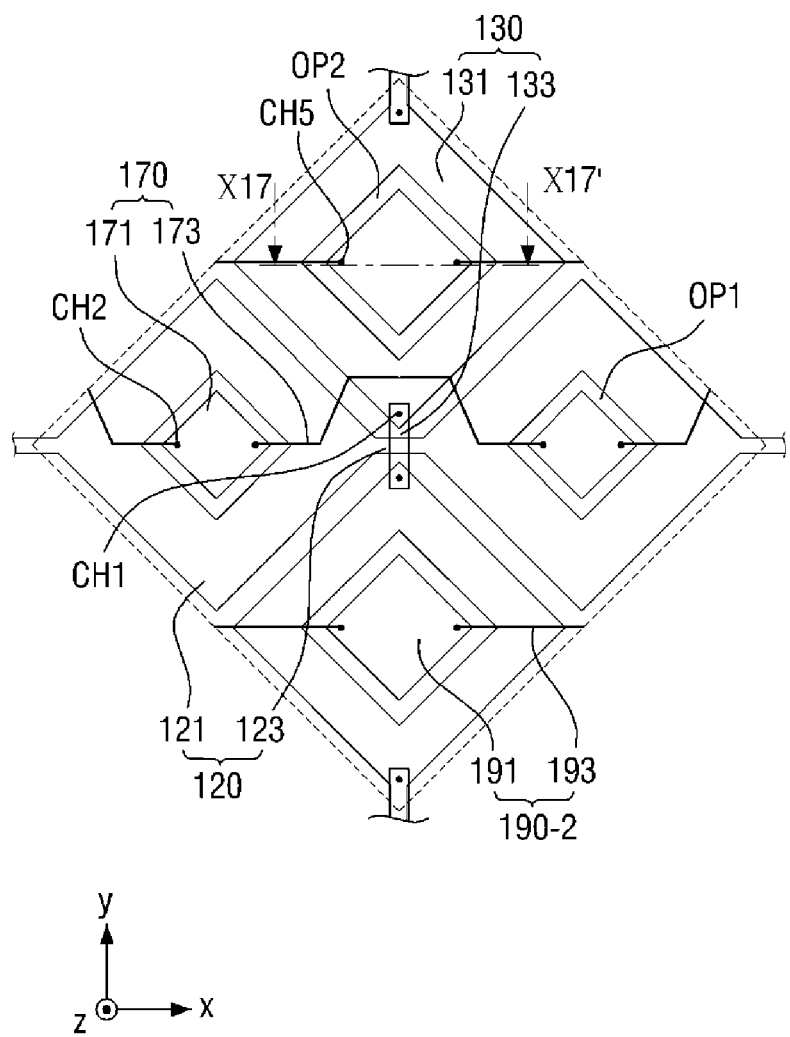
FIG. 48 is an enlarged plan view of the portion Qg of FIG. 47.
Figure 49:
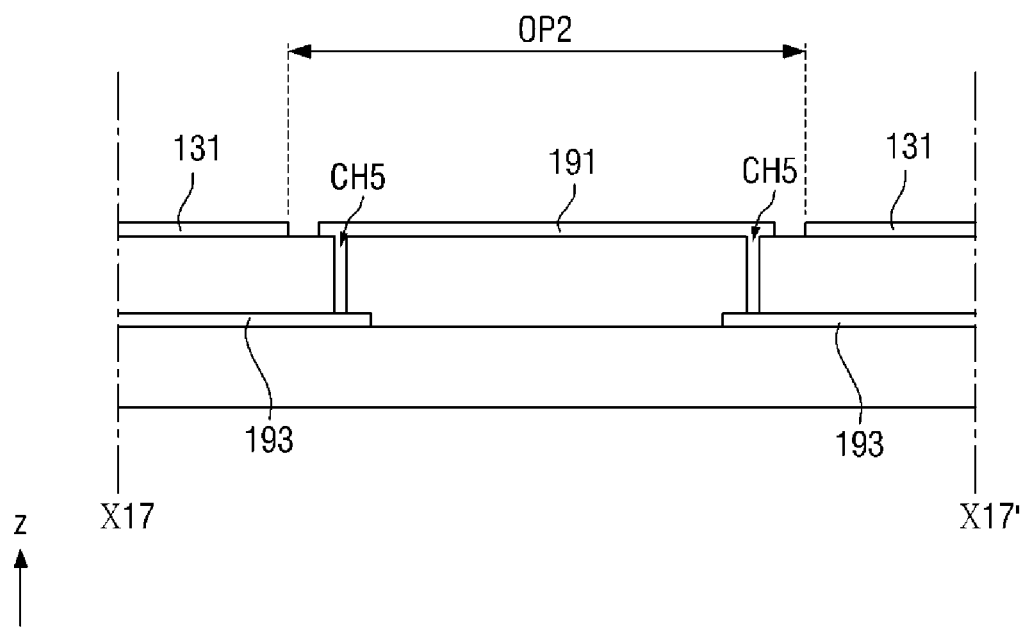
FIG. 49 is a cross-sectional view of the sensor layer taken along the line X17-X17' of FIG. 48.

FIG. 47 is a view showing a detection sensor according to some example embodiments, which is a plan view of a sensor layer of the detection sensor and a connection relationship between the sensor layer and a controller, FIG. 48 is an enlarged plan view of the portion Qg of FIG. 47, and FIG. 49 is a cross-sectional view of the sensor layer taken along the line X17-X17' of FIG. 48.

Referring to FIGS. 47 to 49, a detection sensor TSM2 according to the present embodiment is different from that described above with reference to FIGS. 10 to 18 in that a third conductive member 190-2 of a sensor layer TSL1 of the detection sensor TSM2 further includes a third connection line 193 as well as a third conductive pattern 191, in that the fifth wiring 909 (see FIG. 10) is omitted, in that both the first conductive member 150 and the second conductive member 170 are connected to the fourth wiring 907, and in that a sixth wiring 911 connected to the third conductive member 190-2 is further provided. Other configurations thereof are substantially the same as or similar to those described above with reference to FIGS. 10 to 18. Therefore, hereinafter, differences will be mainly described.

The third conductive member 190-2 may include a third conductive pattern 191 and a third connection line 193. The third connection line 193 may be located in the same row, and may electrically connect the third conductive patterns 191 neighboring along the first direction x to each other. In some embodiments, the third connection line 193 may be formed of the first conductive layer ML1 described above with reference to FIG. 3. The third connection line 193 may be located under the insulating layer IL. As shown in FIG. 49, the third conductive pattern 191 and the third connection line 193 may be connected to each other and be in contact with each other through the fifth contact hole CH5 formed in the insulating layer IL.

In the sensing area SA, the structure of the sensor layer TSL1 may be substantially the same as that of the embodiment of FIGS. 10 to 18.

In the non-sensing area NSA, the first wiring 901, the second wiring 903, the third wiring 905, the fourth wiring 907, and the sixth wiring 911 may be located on the base layer BSL.

The fourth wiring 907 may be connected to the second conductive member 170 as well as the first conductive member 150. The noise detection signal output from the first conductive member 150 and the second conductive member 170 may be transmitted to the sensor controller TSC2 through the fourth wiring 907 and the first sensor pad portion TPD1.

The sixth wiring 911 may be connected to the third conductive member 190-2. In some embodiments, the plurality of third conductive members 190-2 may be connected to one sixth wiring 911. In some embodiments, only one sixth wiring 911 may be provided, and may be connected to all of the third conductive members 190-2.

In some embodiments, an end of the sixth wiring 911 may be connected to the second sensor pad member TPD2.

Figure 50:
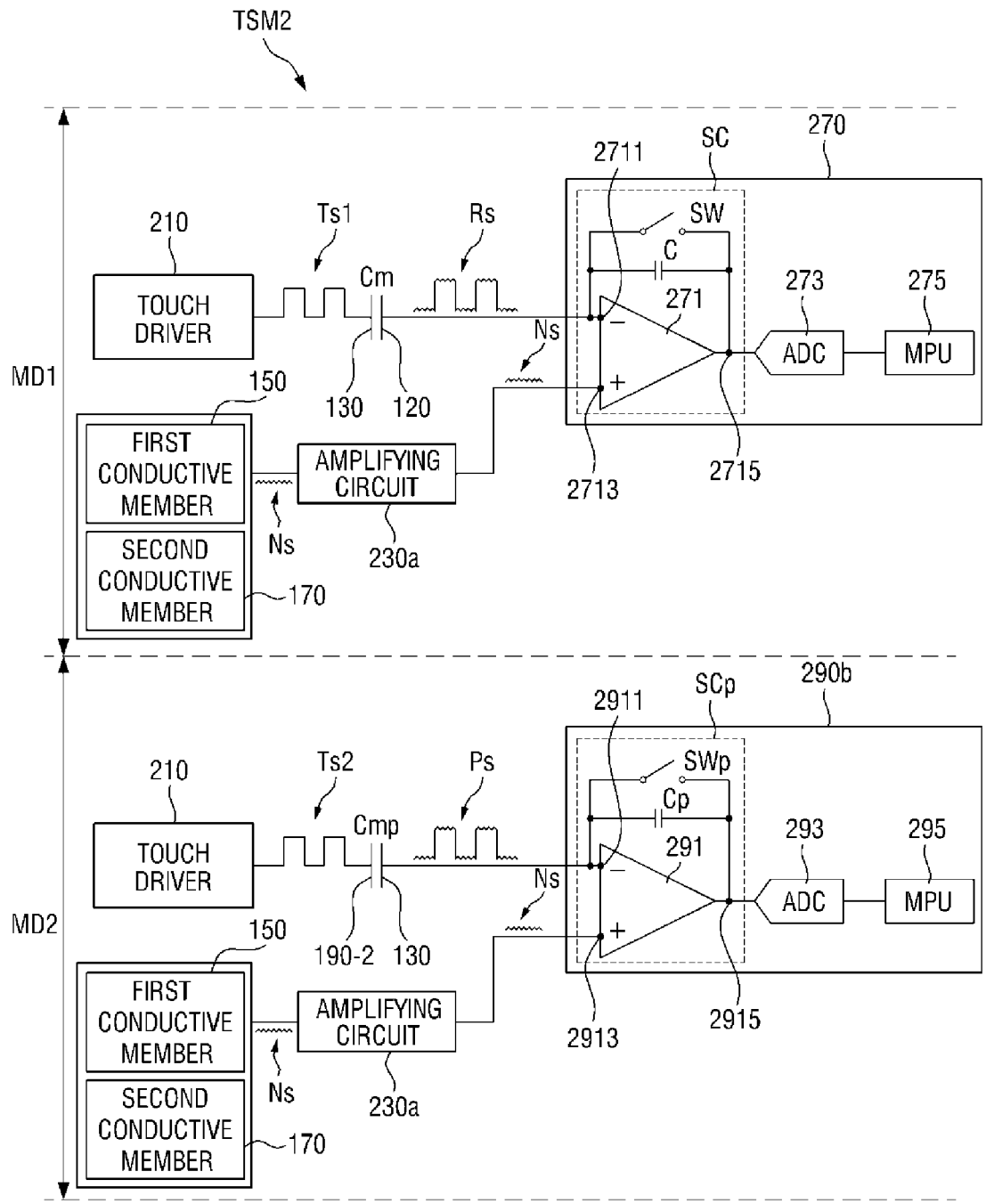
FIG. 50 is a block diagram showing an operation of a detection sensor in a first mode and an operation of the detection sensor in a second mode according to some example embodiments.
Figure 51:
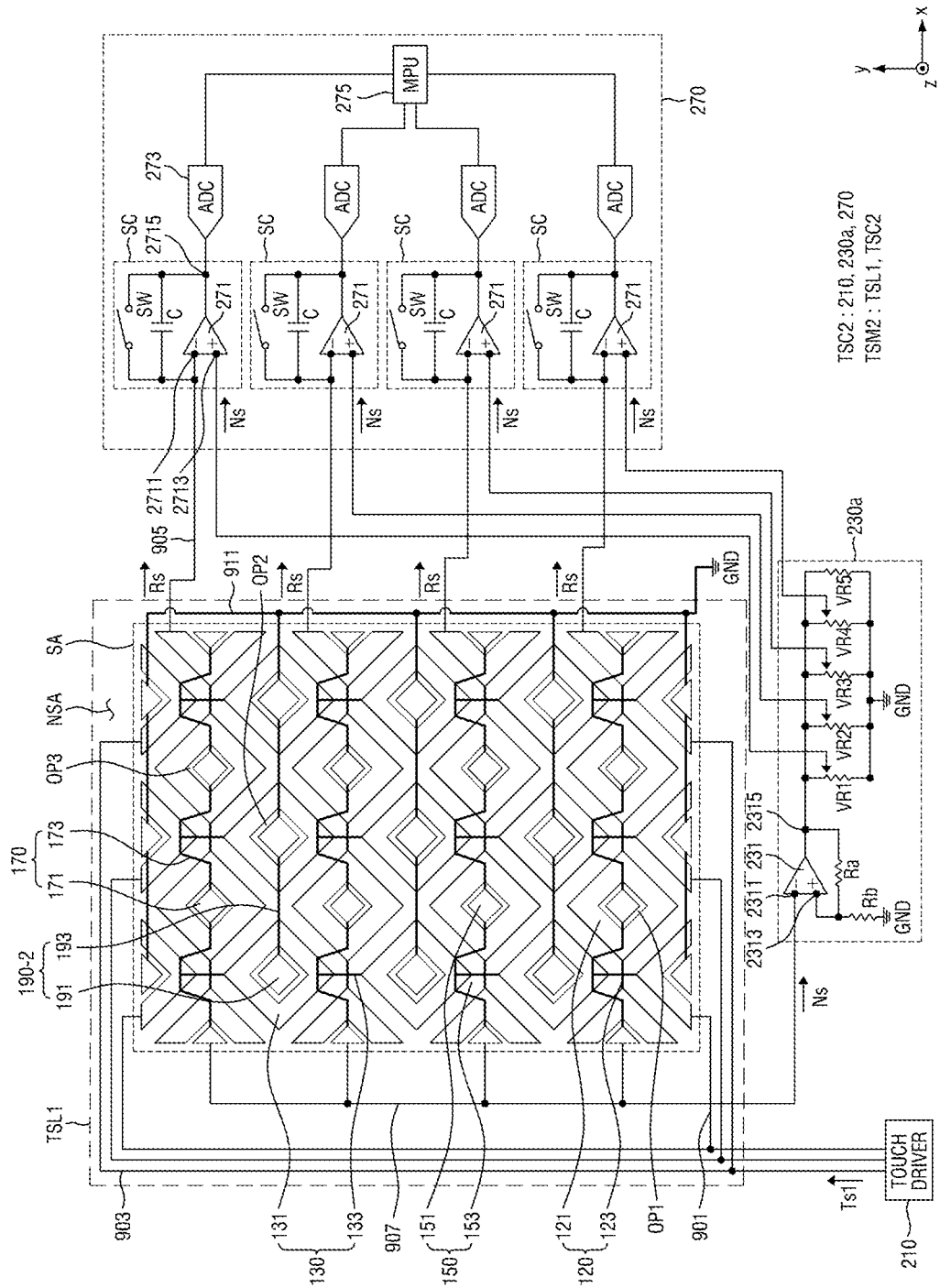
FIG. 51 is a view specifically showing a connection relationship between a sensor layer and a sensor controller when the detection sensor operates in the first mode according to some example embodiments.
Figure 52:
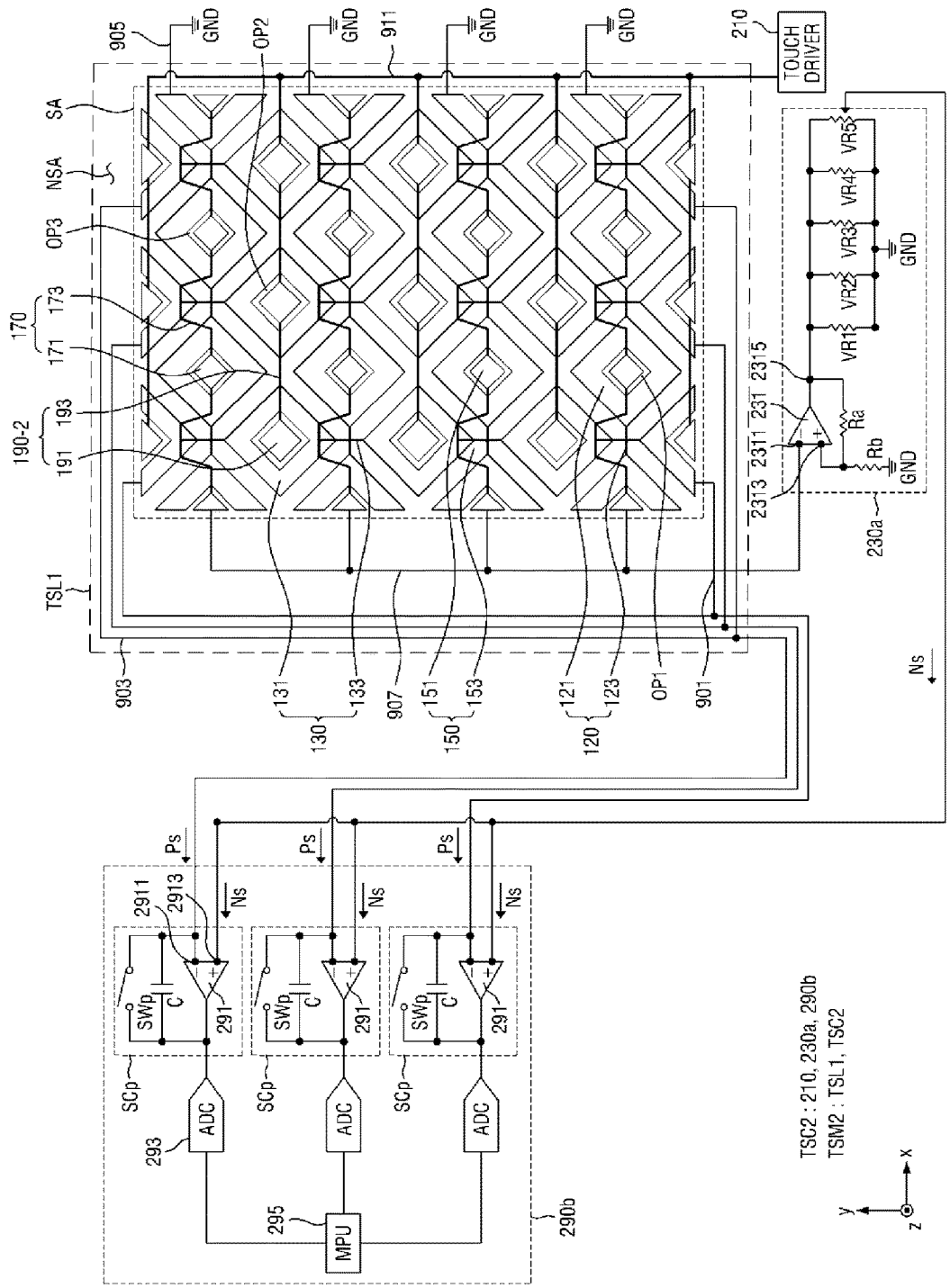
FIG. 52 is a view specifically showing a connection relationship between a sensor layer and a sensor controller when the detection sensor operates in the second mode according to some example embodiments.

FIG. 50 is a block diagram showing an operation of a detection sensor in a first mode and an operation of the detection sensor in a second mode according to some example embodiments, FIG. 51 is a view specifically showing a connection relationship between a sensor layer and a sensor controller when the detection sensor operates in the first mode according to some example embodiments, and FIG. 52 is a view specifically showing a connection relationship between a sensor layer and a sensor controller when the detection sensor operates in the second mode according to some example embodiments.

Referring to FIGS. 50 to 52, as shown in FIGS. 50 and 51, when the sensing sensor TSM2 operates in the first mode MD1, the touch driver 210 may provide a touch driving signal Ts1 to the second electrode member 130 through the first wiring 901 and the second wiring 903. The first electrode member 120 may form a mutual capacitance Cm between the first electrode member 120 and the second electrode member 130 in response to the touch driving signal Ts1, and may provide a touch detection signal Rs including information about the mutual capacitance Cm to the touch detector 270 through the third wiring 905.

A detailed description of the configuration and operation of the touch detector 270 is the same as that described above with reference to FIGS. 19 to 22, and thus will be omitted.

The first conductive member 150 and the second conductive member 170 may provide a noise detection signal Ns to the amplifying circuit 230a through the fourth wiring 907, and the amplifying circuit 230a may provide a noise detection signal Ns having an adjusted gain value to the sensing channel SC of each touch detector 270. A description of the amplifying circuit 230a is substantially the same as that described above with reference to FIGS. 36 and 37, and thus will be omitted.

As shown in FIGS. 50 and 51, when the sensing sensor TSM2 operates in the second mode MD2, the touch driver 210 may provide a proximity driving signal Ts2 to the third conductive member 190-2 through the sixth wiring 911. A mutual capacitance Cmp may be formed between the third conductive member 190-2 and the second electrode member 130 in response to the proximity driving signal Ts2, and the second electrode member 139 may provide a proximity detection signal Ps including information about the mutual capacitance Cmp to the proximity detector 270 through the first wiring 901 and the second wiring 903.

The proximity detector 290b may include a plurality of sensing channels SCp. In some embodiments, the number of sensing channels SCp may be substantially the same as the number of second electrode members 130. A description of configuration and operation of the proximity detector 290b is substantially the same as that described above with reference to FIGS. 19 to 22, and thus will be omitted.

The first conductive member 150 and the second conductive member 170 may provide a noise detection signal Ns to the amplifying circuit 230a through the fourth wiring 907. The amplifier circuit 230a may further include a fifth variable resistor VR5 connected to the proximity detector 290b, and may provide a noise detection signal Ns having an adjusted gain value to the proximity detector 290b.

According to some example embodiments, because the proximity of an object may be substantially detected over the entire sensing area SA of the sensor layer TSL1, there is a characteristic in that a proximity sensing area can be enlarged as compared with the embodiment of FIGS. 20 and 21.

The operation of the sensing sensor TSM2 in the second mode MD2 may be modified.

Figure 53:
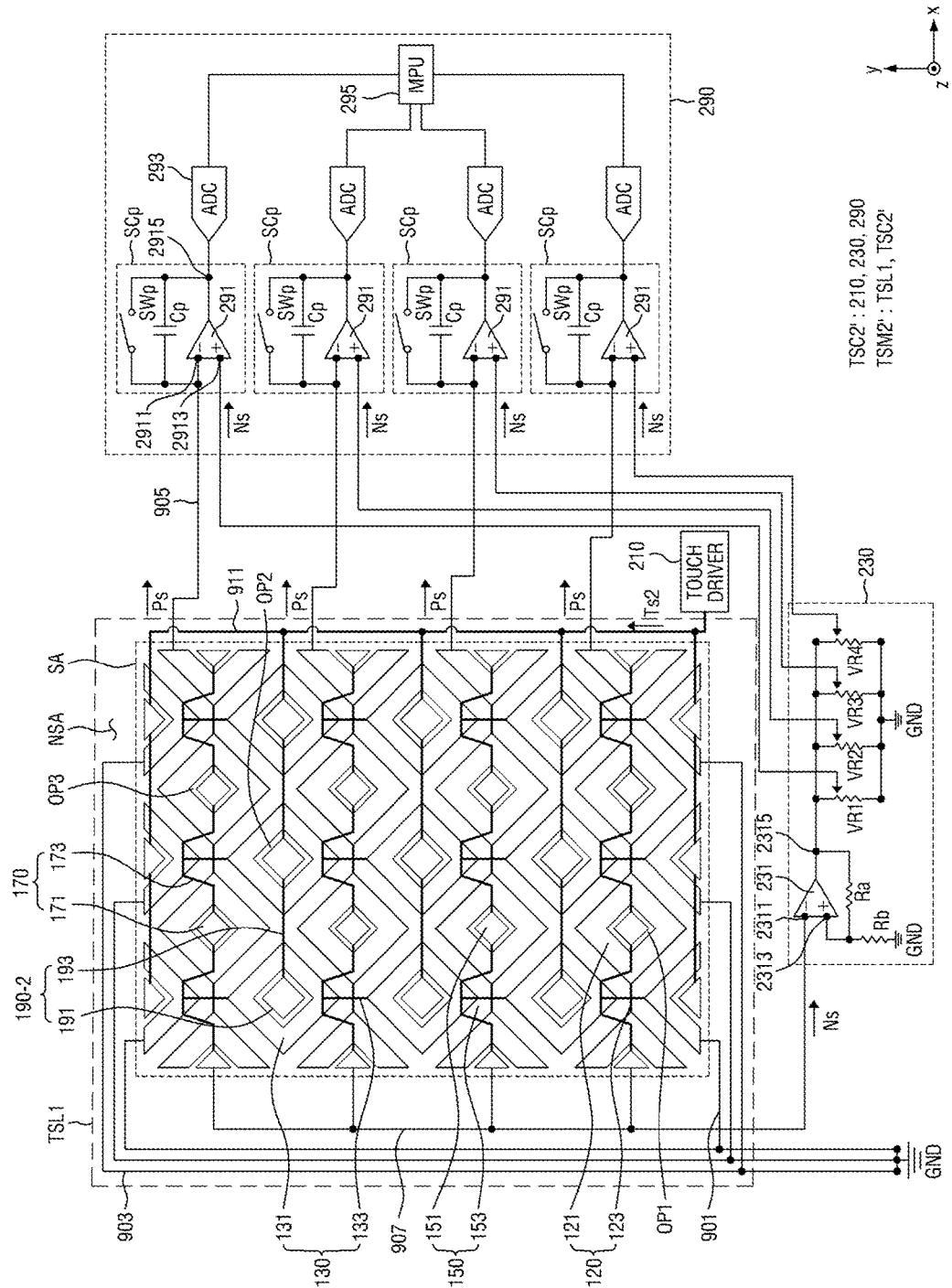
FIG. 53 is a view for explaining a proximity detection operation of a detection sensor according to some example embodiments.

FIG. 53 is a view for explaining another example of a proximity detection operation of a detection sensor according to some example embodiments.

Referring to FIG. 53, unlike that shown in FIGS. 45, 46, 50, and 52, a sensor controller TSC2' of a detection sensor TSM2' may include an amplifying circuit 230 and a proximity detector 290. A description of the amplifying circuit 230 and the proximity detector 290 is the same as that described above in the description of the detection sensor TSM, and thus will be omitted.

The operation of the sensing sensor TSM2' in the first mode may be substantially the same as that of the aforementioned sensing sensor TSM2.

In the second mode, the touch driver 210 of the sensing sensor TSM'2 may provide a proximity driving signal Ts2 to the third conductive member 190-2 through the sixth wiring 911. A mutual capacitance may be generated between the first electrode member 120 and the third conductive member 190-2 in response to the proximity driving signal Ts2. The first electrode member 120 may provide a proximity detection signal Ps including information about the mutual capacitance generated between the first electrode member 120 and the third conductive member 190-2 to the proximity detector 290 through the third wiring 905.

In some embodiments, unlike that shown in FIG. 52, in the second mode, the first wiring 901 and the second wiring 903 may be connected to a reference power supply, for example, a ground power supply GND.

The first conductive member 150 and the second conductive member 170 may provide a noise detection signal Ns to the amplifying circuit 230 through the fourth wiring 907, and the amplifying circuit 230 may provide a noise detection signal Ns having an adjusted gain value to each detection channel SCp of the proximity detector 290.

A description of the amplifying circuit 230 and the proximity detector 290 is the same as that described above in the description of the detection sensor TSM, and thus will be omitted.

Hereinafter, it will be described that a detection sensor includes a sensor controller TSC2, but the present invention is not limited thereto. The sensor controller TSC2 of the detection sensor may be modified into the sensor controller TSC2' described above with reference to FIG. 53.

Figure 54:
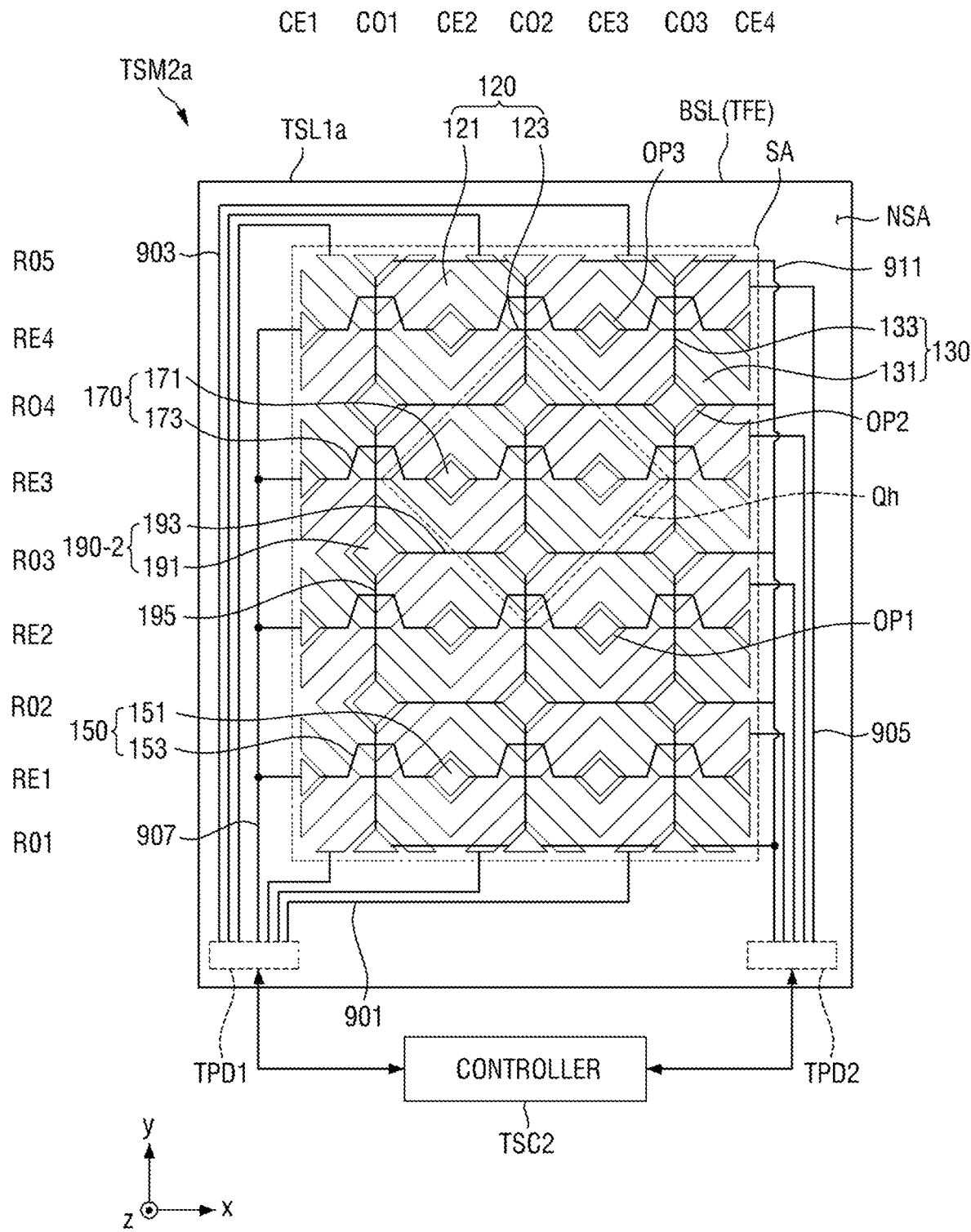
FIG. 54 is a view showing a modified example of the detection sensor shown in FIG. 47.
Figure 55:
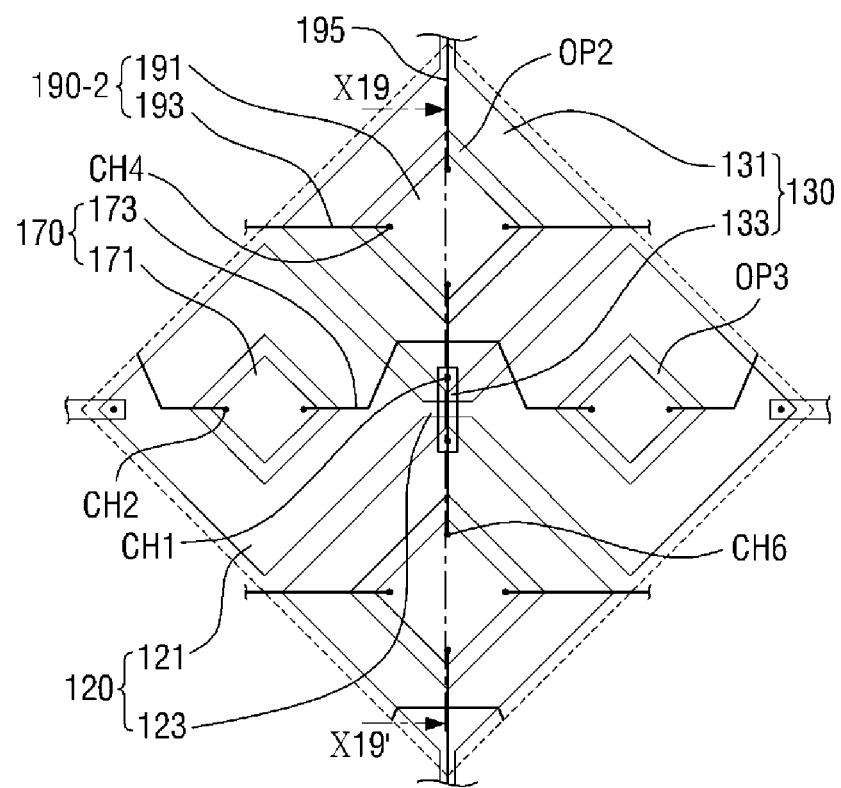
FIG. 55 is an enlarged plan view of the portion Qh of FIG. 54.
Figure 56:
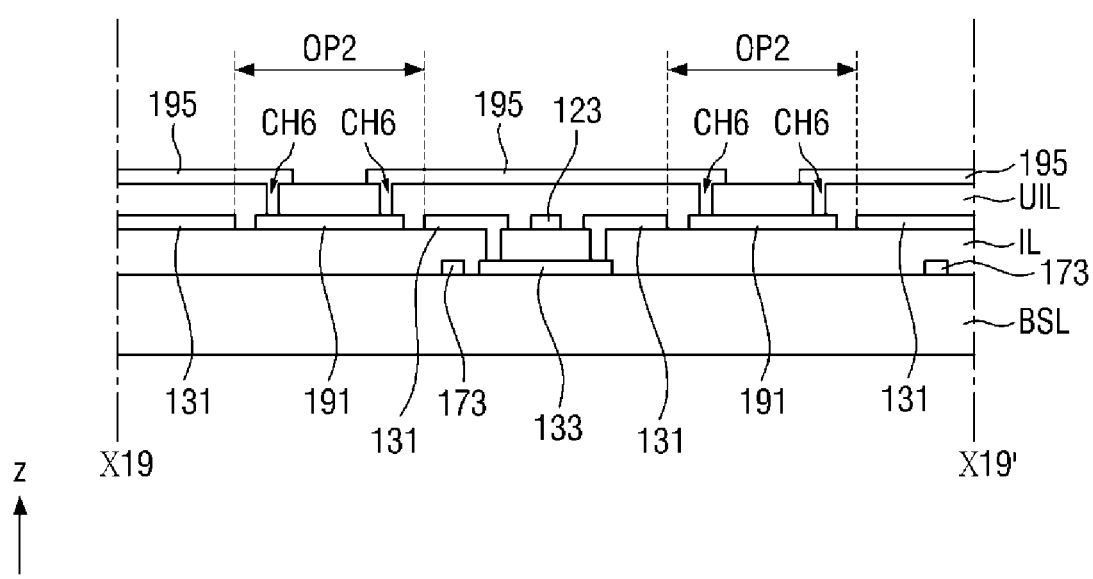
FIG. 56 is a cross-sectional view of the sensor layer taken along the line X19-X19' of FIG. 55.

FIG. 54 is a view showing a modified example of the detection sensor shown in FIG. 47, FIG. 55 is an enlarged plan view of the portion Qh of FIG. 54, and FIG. 56 is a cross-sectional view of the sensor layer taken along the line X19-X19' of FIG. 55.

Referring to FIGS. 54 to 56, a detection sensor TSM2*a* according to the present embodiment is different from the detection sensor TSM2 shown in FIG. 47 in that a sensor layer TSL1*a* further includes a second connection pattern 195 unlike the sensor layer TSL1 shown in FIG. 47. Other configurations thereof are substantially the same as or similar to those described above with reference to FIG. 47. Therefore, hereinafter, differences will be mainly described.

The second connection pattern 195 may electrically connect the third conductive patterns 191 neighboring along the second direction y to each other.

In some embodiments, the second connection pattern 195 may be formed of a different layer from the third conductive pattern 191 and the third connection line 193. In some embodiments, an upper insulating layer UIL may further be located on the third conductive pattern 191, and the second connection pattern 195 may be located on the upper insulating layer UIL.

The upper insulating layer UIL may be made of an insulating material, and may include an inorganic insulating material or an organic insulating material. In some embodiments, the upper insulating layer UIL may include any one of the example insulating materials described above in the description of FIG. 3.

The second connection pattern 195 may include a conductive material such as gold (Au), silver (Ag), aluminum (AL), molybdenum (Mo), chromium (Cr), titanium (Ti), nickel (Ni), neodymium (Nd), copper (Cu), platinum (Pt), or an alloy thereof. The second connection pattern 195 may have a single layer structure or a multi-layer structure.

In some embodiments, as shown in FIG. 56. the second connection pattern 195 and the third conductive pattern 191 may be connected to each other and be in direct contact with each other through the sixth contact hole CH6 formed in the upper insulating layer UIL.

Because the third conductive members 190-2 neighboring along the second direction y are electrically connected to each other through the second connection pattern 195, when the detection sensor TSM2*a* operates in the second mode (proximity detection mode), the occurrence of signal delay (or RC delay) between the third conductive members 190-2 located in different rows can be prevented or reduced.

Figure 57:
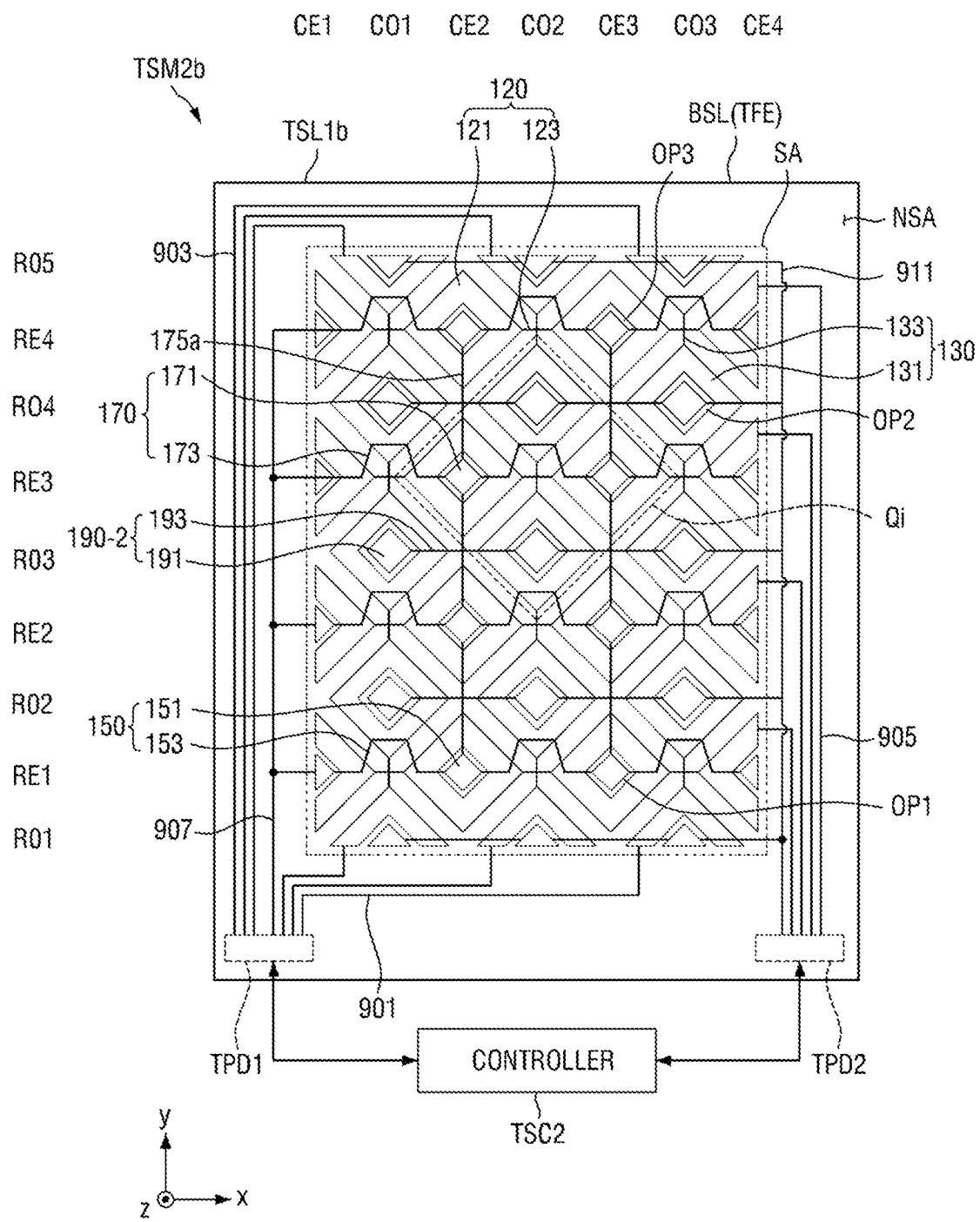
FIG. 57 is a view showing a modified example of the detection sensor shown in FIG. 54.
Figure 58:
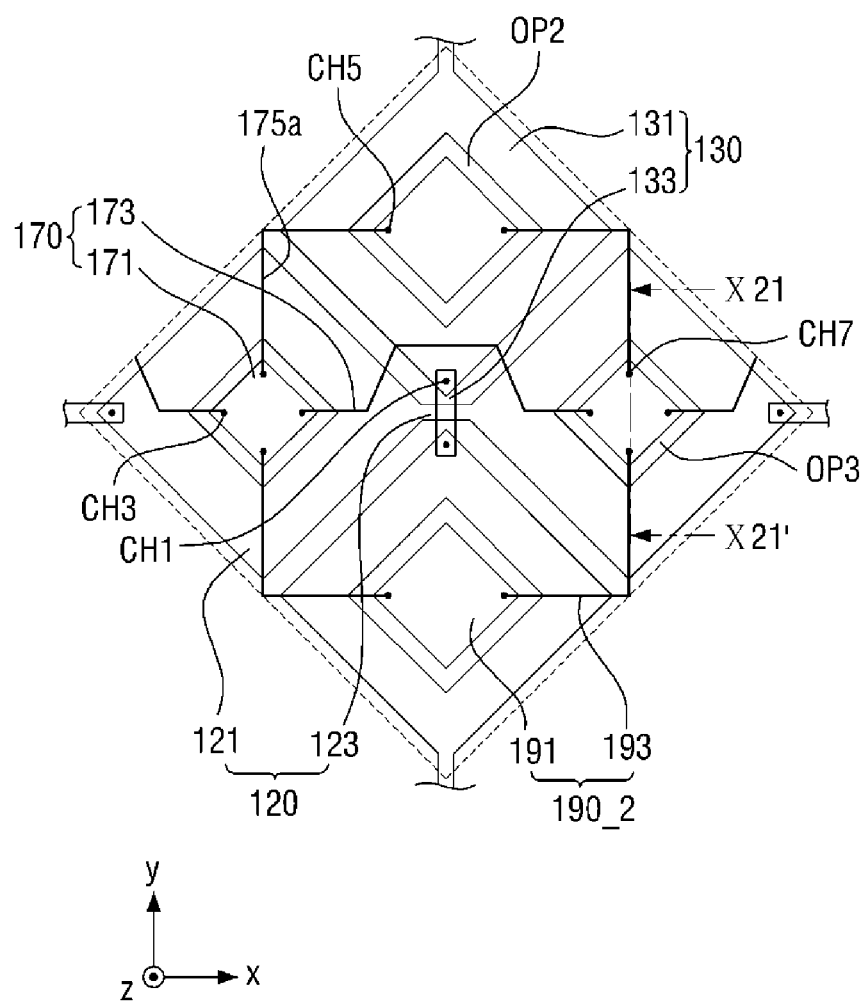
FIG. 58 is an enlarged plan view of the portion Qi of FIG. 57.
Figure 59:
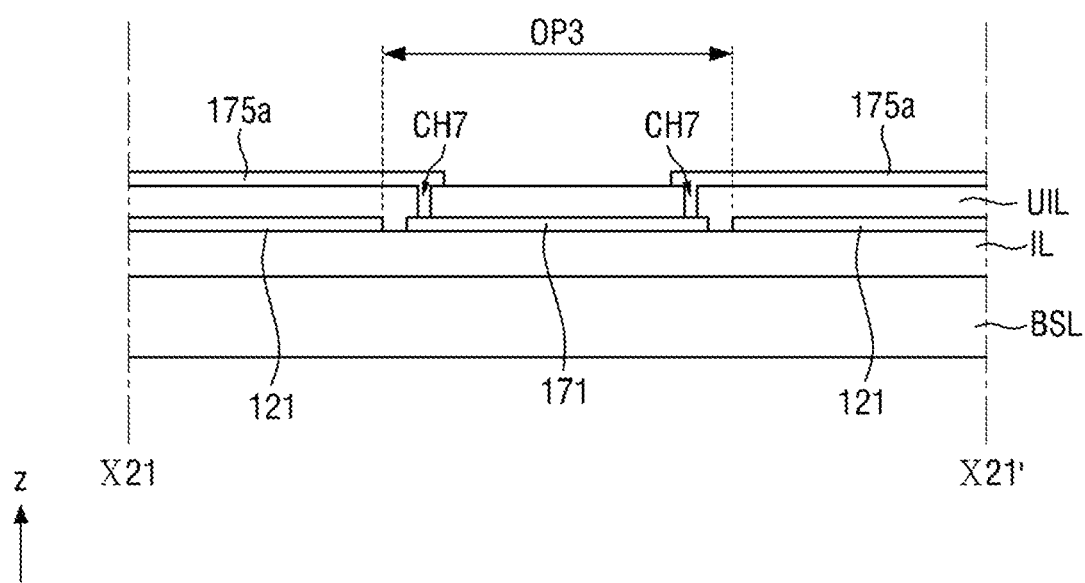
FIG. 59 is a cross-sectional view of the sensor layer taken along the line X21-X21' of FIG. 58.

FIG. 57 is a view showing a modified example of the detection sensor shown in FIG. 54, FIG. 58 is an enlarged plan view of the portion Qi of FIG. 57, and FIG. 59 is a cross-sectional view of the sensor layer taken along the line X21-X21' of FIG. 58.

Referring to FIGS. 57 to 59, a detection sensor TSM2*b* according to the present embodiment is different from the detection sensor TSM2 shown in FIG. 47 in that a sensor layer TSL1*b* further includes a first connection pattern 175*a* unlike the sensor layer TSL1 shown in FIG. 47. Other configurations thereof are substantially the same as or similar to those described above with reference to FIG. 47. Therefore, hereinafter, differences will be mainly described.

The first connection pattern 175*a* may electrically connect the second conductive patterns 171 neighboring along the second direction y to each other. Further, the first connection pattern 175*a* may electrically connect the first conductive patterns 151 neighboring along the second direction y to each other. Moreover, the first connection pattern 175*a* may electrically connect the second conductive pattern 171 and the first conductive pattern 151 neighboring along the second direction y to each other.

The first connection pattern 175*a* may include a conductive material. The conductive material included in the first connection pattern 175*a* may include at least one of the example conductive materials listed as examples of the material of the second connection pattern 195 (see FIG. 54) described above with reference to FIGS. 54 to 56.

In some embodiments, an upper insulating layer UIL may further be located on the third conductive pattern 191, and the first connection pattern 175*a* may be located on the upper insulating layer UIL. As shown in FIG. 59, the first connection pattern 175*a* may be connected to the second conductive pattern 171 and be in contact with the second conductive pattern 171 through a seventh contact hole CH7 formed in the upper insulating layer UIL.

Further, as described above, the first connection pattern 175*a* connected to the first conductive pattern 151 may also be connected to the first conductive pattern 151 and be in contact with the first conductive pattern 151 through a contact hole formed in the upper insulating layer UIL.

According to some example embodiments, it is possible to further prevent the deviation of the noise detection signal for each electrode row.

FIGS. 60, 61, 62, 63, and 64 showing modified examples of the detection sensor shown in FIG. 47.

Figure 60:
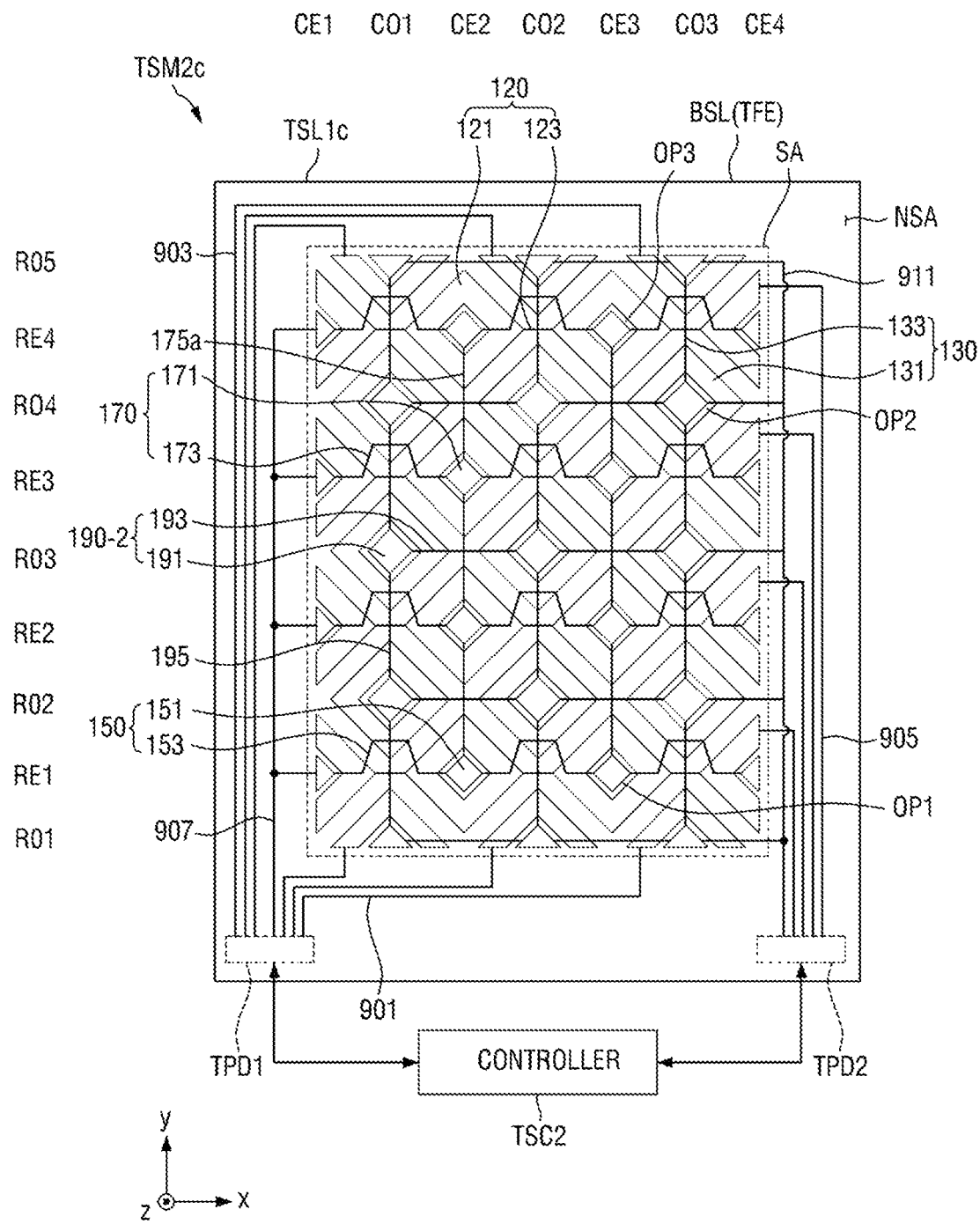
FIGS. 60, 61, 62, 63, and 64 showing modified examples of the detection sensor shown in FIG. 47.

Referring to FIG. 60, a detection sensor TSM2*c* according to the present embodiment is different from the detection sensor TSM2 shown in FIG. 47 in that a sensor layer TSL1*c* further includes a first connection pattern 175*a* and a second connection pattern 195 unlike the sensor layer TSL1 shown in FIG. 47. Other configurations thereof are substantially the same as or similar to those described above with reference to FIG. 47.

A detailed description of the first connection pattern 175*a* is the same as that described above with reference to FIGS. 57 to 59, and a detailed description of the second connection pattern 195 is the same as that described above with reference to FIGS. 54 to 56. Therefore, the detailed descriptions thereof will be omitted.

Figure 61:
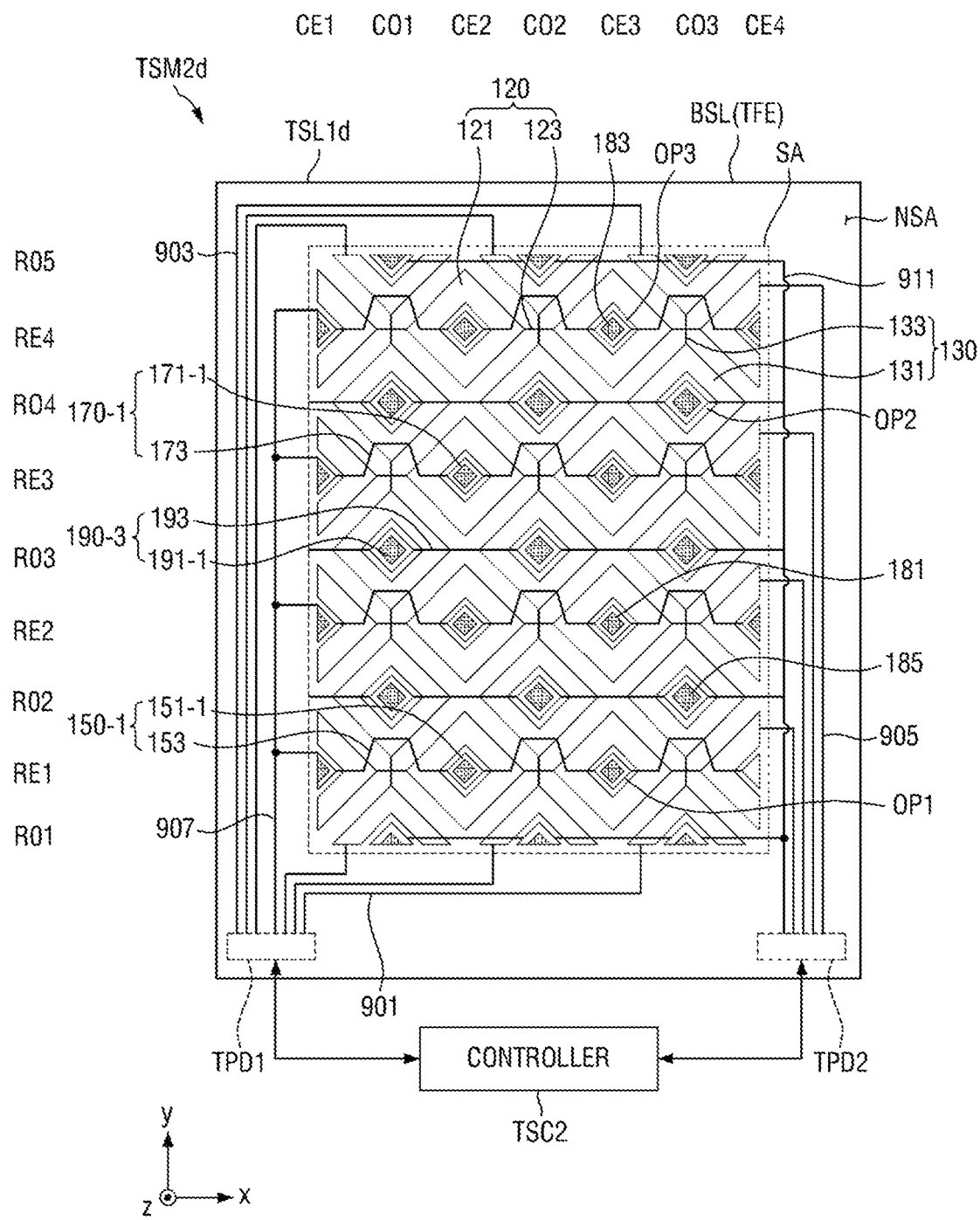

Referring to FIG. 61, a detection sensor TSM2*d* according to the present embodiment is different from the detection sensor TSM2 shown in FIG. 47 in that a sensor layer TSL1*d* includes a first conductive member 150-1, a second conductive member 170-1, a third conductive member 190-3, a first auxiliary pattern 181, a second auxiliary pattern 183, and a third auxiliary pattern 185 unlike the sensor layer TSL1 shown in FIG. 47. Other configurations thereof are substantially the same as or similar to those described above with reference to FIG. 47.

Descriptions of the first conductive member 150-1, the second conductive member 170-1, the first auxiliary pattern 181, the second auxiliary pattern 183, and the third auxiliary pattern 185 are substantially the same as those described above with reference to FIGS. 25 to 29. Further, as described in the embodiments of FIGS. 25 to 29, the third conductive pattern 191-1 of the third conductive member 190-3 may include a third auxiliary opening, and the third auxiliary pattern 185 may be located in the third auxiliary opening. Therefore, details thereof will be omitted.

Figure 62:
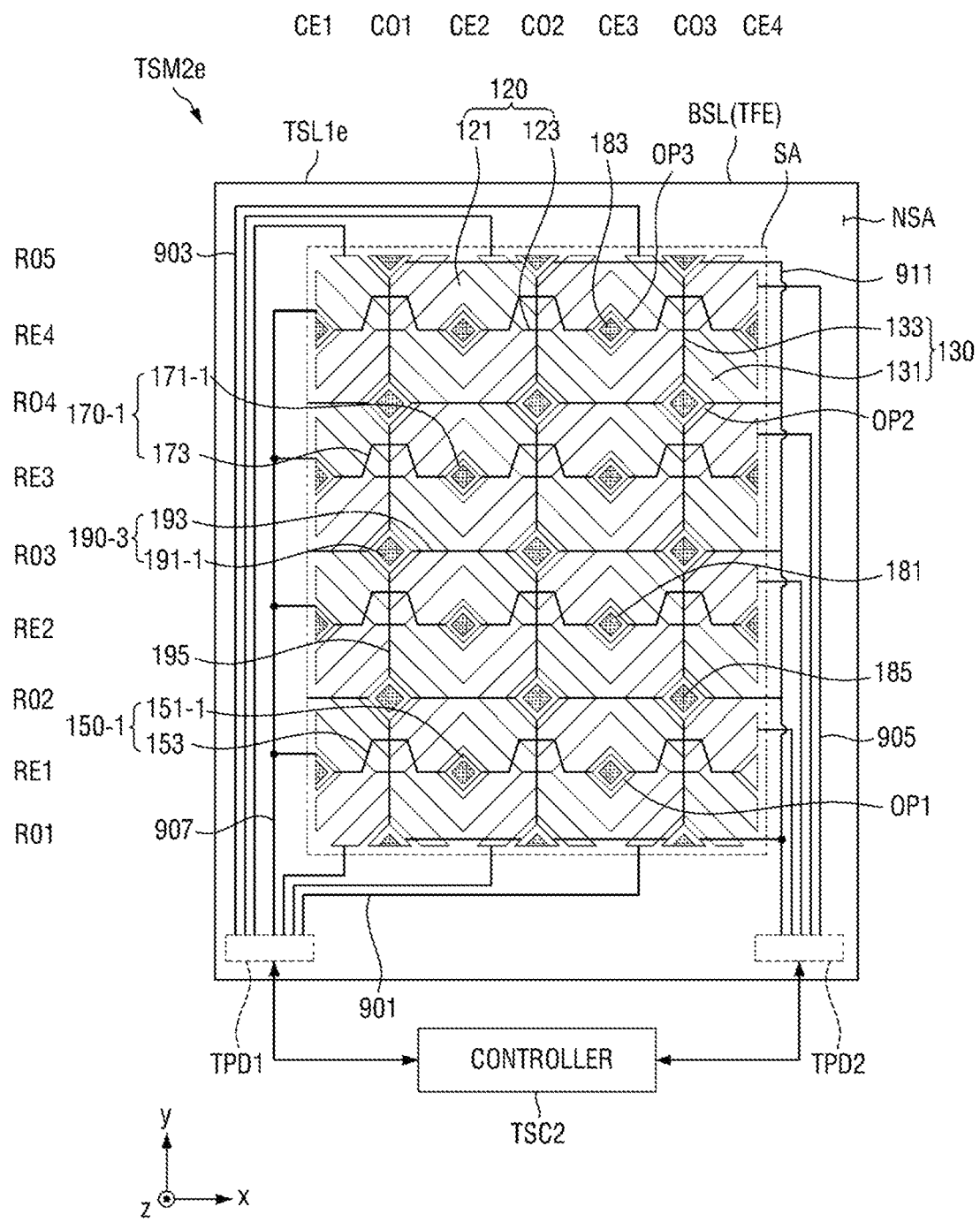

Referring to FIG. 62, a detection sensor TSM2*e* according to the present embodiment is different from the detection sensor TSM2*d* shown in FIG. 61 in that a sensor layer TSL1*e* further includes a second connection pattern 195, and the second connection pattern 195 electrically connects the third conductive patterns 191-1 neighboring along the second direction y to each other, unlike the sensor layer TSLd shown in FIG. 61. Other configurations thereof are substantially the same as or similar to those described above with reference to FIG. 61. A more detailed description of the second connection pattern 195 is substantially the same as or similar to that described above with reference to FIGS. 54 to 56, and thus will be omitted.

Figure 63:
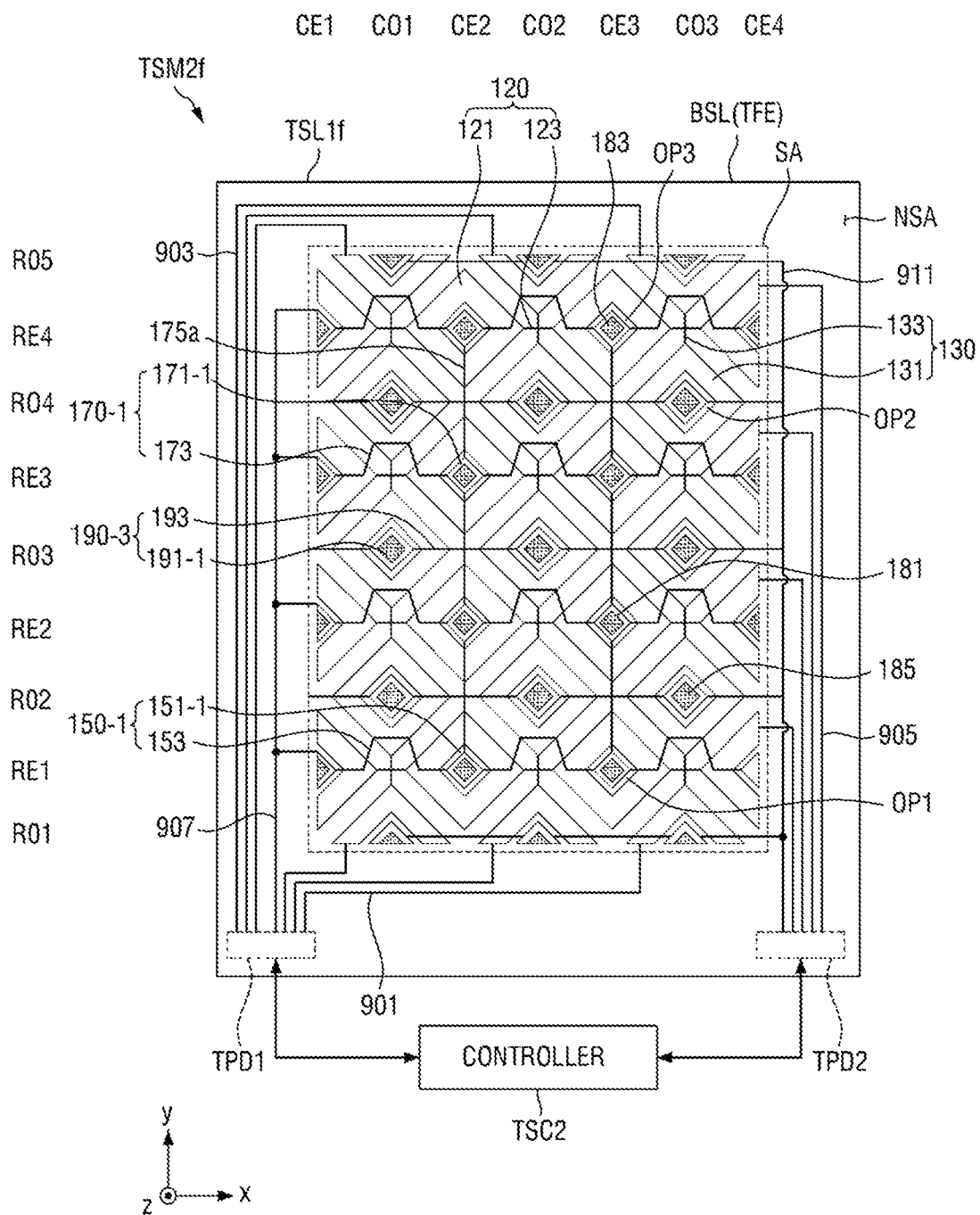

Referring to FIG. 63, a detection sensor TSM2f according to the present embodiment is different from the detection sensor TSM2d shown in FIG. 61 in that a sensor layer TSL1f further includes a first connection pattern 175a unlike the sensor layer TSLd shown in FIG. 61. Other configurations thereof are substantially the same as or similar to those described above with reference to FIG. 61. A more detailed description of the first connection pattern 175a is substantially the same as or similar to that described above with reference to FIGS. 57 to 59, and thus will be omitted.

Figure 64:
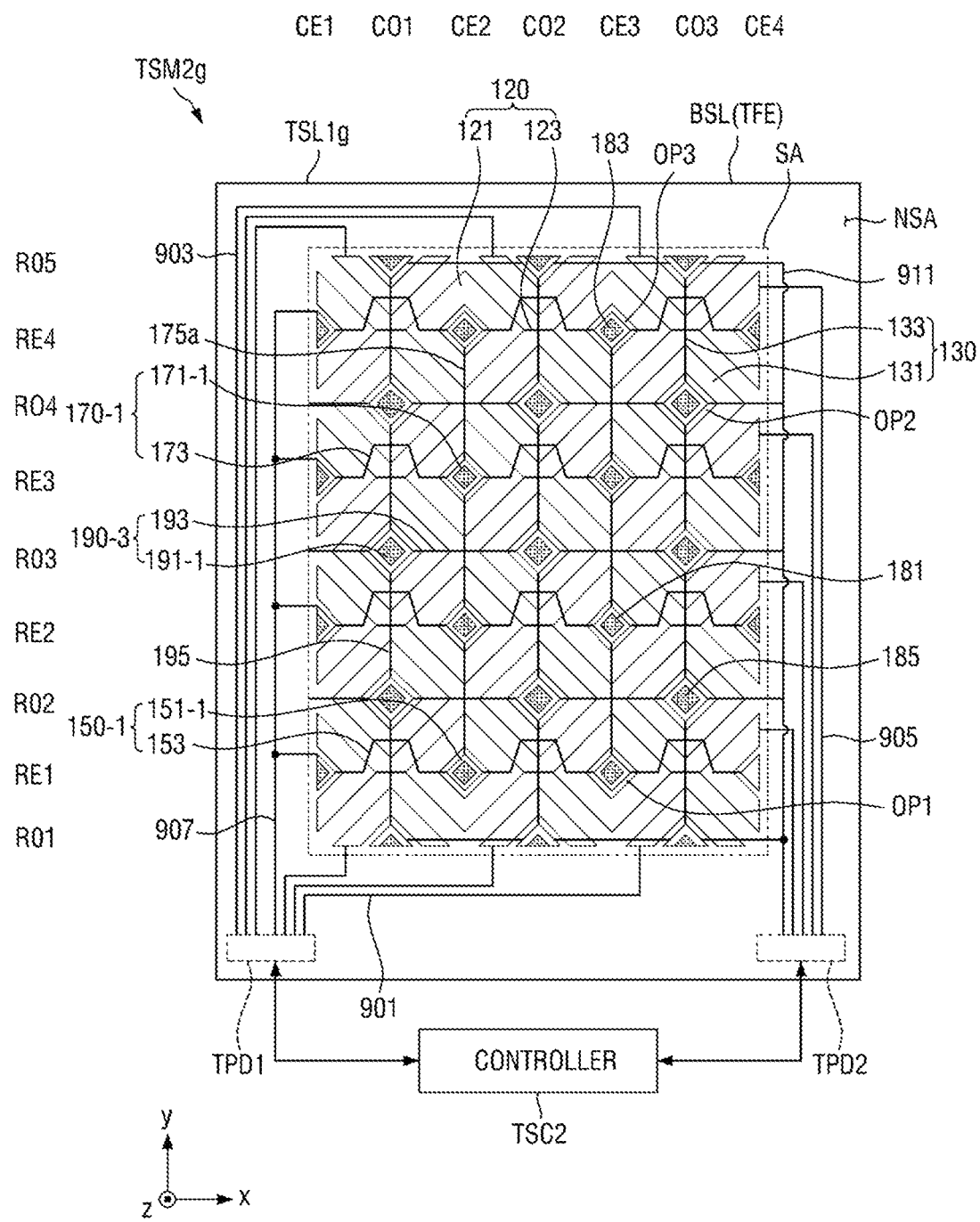

Referring to FIG. 64, a detection sensor TSM2g according to the present embodiment is different from the detection sensor TSM2d shown in FIG. 61 in that a sensor layer TSL1g further includes a first connection pattern 175a and a second connection pattern 195 unlike the sensor layer TSLd shown in FIG. 61. Other configurations thereof are substantially the same as or similar to those described above with reference to FIG. 61. A more detailed description of the first connection pattern 175a is substantially the same as or similar to that described above with reference to FIGS. 57 to 59, and a more detailed description of the second connection pattern 195 is substantially the same as or similar to that described above with reference to FIGS. 54 to 56. Therefore, the descriptions thereof will be omitted.

In the detection sensors and display device including the same according to the aforementioned embodiments, because the detection sensor can detect the proximity of an object as well as the detection of a touch, there is a characteristic that an additional proximity sensor can be omitted. Further, because conductive members are formed together in the process of manufacturing the electrode members and connection portions, there is a characteristic that the thickness of the touch sensor does not increase.

Moreover, because the detection sensor can cancel or reduce the noise transmitted from the display panel, there is a characteristic of improving touch sensitivity and proximity sensitivity.

According to embodiments of the present invention, a detection sensor for sensing the proximity of an object and a display device including the detection sensor can be provided.

Further, according to embodiments of the present invention, a detection sensor for sensing both the proximity of an object and a touch input and a display device including the detection sensor can be provided.

The effects of the present invention are not limited by the foregoing, and other various effects are anticipated herein.

Although the example embodiments of the present invention have been disclosed for illustrative purposes, those skilled in the art will appreciate that various modifications, additions and substitutions are possible, without departing from the scope and spirit of the invention as disclosed in the accompanying claims, and their equivalents.

What is claimed is:

1. A detection sensor, comprising:
a first electrode member on a base layer and including a plurality of first sensing electrodes each including a first opening and electrically connected to each other along a first direction;
a second electrode member on the base layer and including a plurality of second sensing electrodes electrically connected to each other along a second direction crossing the first direction;
a first conductive member including a plurality of first conductive patterns electrically connected to each other along the first direction;
a second conductive member including a plurality of second conductive patterns electrically connected to each other along the first direction and spaced apart from the first conductive member; and
a sensor controller configured to detect a change of a mutual capacitance between the first electrode member and the second electrode member in a first mode and configured to detect a change of a mutual capacitance between the first conductive member and the second conductive member in a second mode different from the first mode,
wherein the plurality of first sensing electrodes are arranged along the second direction to form electrode rows,
a first conductive pattern is in a first electrode row from among the electrode rows and is in the first opening of the first electrode row, and a second conductive pattern is in a second electrode row from among the electrode rows, different from the first electrode row in which the first conductive pattern is located, and is in the first opening of the second electrode row.

2. The detection sensor of claim 1,
wherein the sensor controller is configured to detect a touch in the first mode based on the change of the mutual capacitance between the first electrode member and the second electrode member, and
wherein the sensor controller is configured to detect proximity of an object in the second mode based on the change of the mutual capacitance between the first conductive member and the second conductive member.

3. The detection sensor of claim 1,
wherein the sensor controller includes:
a touch driver configured to be electrically connected to the second electrode member in the first mode and configured to provide a touch driving signal to the second electrode member; and
a touch detector configured to be electrically connected to the first electrode member in the first mode, configured to receive a touch detection signal generated in response to the touch driving signal from the first electrode member and to detect a touch,
wherein the touch detector is configured to receive a noise detection signal from the first conducive member in the first mode and to cancel noise of the touch detection signal based on the noise detection signal.

4. The detection sensor of claim 3,
wherein the sensor controller further includes a proximity detector electrically connected to the first electrode member in the second mode,
the touch driver is configured to be electrically connected to the second conductive member in the second mode and to provide a proximity driving signal to the second conductive member, and
the proximity detector is configured to receive a proximity detection signal generated in response to the proximity driving signal from the first electrode member and to detect proximity of an object.

5. The detection sensor of claim 4,
wherein the proximity detector is configured to receive the noise detection signal from the first conductive member in the second mode and to cancel noise of the proximity detection signal based on the noise detection signal.

6. The detection sensor of claim 4,
wherein the touch driver is configured to be electrically connected to the second electrode member in the second mode and to provide the proximity driving signal to the second electrode member.

7. The detection sensor of claim 4,
wherein the sensor controller further includes an amplifying circuit electrically connected to the first conductive member and the touch detector in the first mode and electrically connected to the first conductive member and the proximity detector in the second mode, and
the amplifying circuit includes an amplifier electrically connected to the first conductive member and a plurality of variable resistors connected in parallel to an output terminal of the amplifier.

8. The detection sensor of claim 3,
wherein the sensor controller further includes a proximity detector electrically connected to the second conductive member in the second mode,
the touch driver is configured to be electrically connected to the first conductive member in the second mode and to provide a proximity driving signal to the first electrode member, and
the proximity detector is configured to receive a proximity detection signal generated in response to the proximity driving signal from the second conductive member and to detect proximity of an object.

9. The detection sensor of claim 1,
wherein the first electrode member further includes a first connection portion electrically connecting two first sensing electrodes neighboring along the first direction among the plurality of first sensing electrodes,
the second electrode member further includes a second connection portion electrically connecting two second sensing electrodes neighboring along the second direction among the plurality of second sensing electrodes and insulated from the first connection portion,
the first conductive member further includes a first connection line connecting two first conductive patterns neighboring along the first direction among the plurality of first conductive patterns,
the second conductive member further includes a second connection line connecting two second conductive patterns neighboring along the first direction among the plurality of second conductive patterns,
the first connection line and the second connection line are formed of a first conductive layer,
the first sensing electrode, the second sensing electrode, the first conductive pattern and the second conductive pattern are formed of a second conductive layer different from the first conductive layer, and
any one of the first connection portion and the second connection portion is formed of the first conductive layer, and the other one of the first connection portion and the second connection portion is formed of the second conductive layer.

10. The detection sensor of claim 9, further comprising:
an insulating layer on the base layer,
wherein the first conductive layer is on the base layer,
the insulating layer is on the first conductive layer and between the first conductive layer and the second conductive layer, and
the second conductive layer is on the insulating layer.

11. The detection sensor of claim 9, further comprising:
an edge conductive pattern in the first opening in another electrode row and spaced apart from the second conductive member,
wherein the edge conductive pattern is formed of the second conductive layer.

12. The detection sensor of claim 9, further comprising:
an auxiliary pattern formed of the second conductive layer,
wherein the second conductive pattern further includes an auxiliary opening, and the auxiliary pattern is in the auxiliary opening and spaced apart from the second conductive pattern.

13. The detection sensor of claim 9,
wherein the second sensing electrodes are arranged along the second direction and further include a connection pattern electrically connecting two second conductive patterns neighboring along the second direction, and
the connection pattern is formed of the first conductive layer.

14. The detection sensor of claim 1,
wherein each second sensing electrode of the second sensing electrodes includes a second opening,
the detection sensor further includes a third conductive pattern in the second opening and spaced apart from the second sensing electrode, and
the third conductive pattern is made of a same material as the first conductive pattern and the second conductive pattern and on a same layer.

15. A detection sensor, comprising:
a first electrode member on a base layer and including a plurality of first sensing electrodes each including a first opening and electrically connected to each other along a first direction;
a second electrode member on the base layer and including a plurality of second sensing electrodes each including a second opening and electrically connected to each other along a second direction crossing the first direction;
a first conductive member including a plurality of first conductive patterns electrically connected to each other along the first direction;
a second conductive member including a plurality of second conductive patterns electrically connected to each other along the first direction and spaced apart from the first conductive member; and
a sensor controller configured to detect a change of a mutual capacitance between the first electrode member and the second electrode member in a first mode and configured to detect a change of a mutual capacitance between the second conductive member and the second electrode member or a change of a mutual capacitance between the second conductive member and the first electrode member in a second mode different from the first mode,
wherein the first conductive pattern is in the first opening, and the second conductive pattern is in the second opening.

16. The detection sensor of claim 15,
wherein the sensor controller includes:
a touch driver configured to be electrically connected to the second electrode member in the first mode and to provide a touch driving signal to the second electrode member and configured to be electrically connected to the second conductive member in the second mode and to provide a proximity driving signal to the second conductive member;
a touch detector configured to be electrically connected to the first electrode member in the first mode, to receive a touch detection signal generated in response to the touch driving signal from the first electrode member and to detect a touch; and a proximity detector configured to be electrically connected to the second electrode member in the second mode, to receive a proximity detection signal generated in response to the proximity driving signal from the second electrode member and to detect proximity of an object.

17. The detection sensor of claim 16, wherein the touch detector is configured to be electrically connected to the first conductive member in the first mode, to receive a noise detection signal from the first conducive member and to cancel noise of the touch detection signal based on the noise detection signal, and the proximity detector is configured to be electrically connected to the first conductive member in the second mode, to receive the noise detection signal from the first conductive member and to cancel noise of the proximity detection signal based on the noise detection signal.

18. The detection sensor of claim 15, wherein the sensor controller includes:

a touch driver configured to be electrically connected to the second electrode member in the first mode and to provide a touch driving signal to the second electrode member and configured to be electrically connected to the second conductive member in the second mode and to provide a proximity driving signal to the second conductive member;

a touch detector configured to be electrically connected to the first electrode member in the first mode, to receive a touch detection signal generated in response to the touch driving signal from the first electrode member and to detect a touch; and a proximity detector configured to be electrically connected to the first electrode member in the second mode, to receive a proximity detection signal generated in response to the proximity driving signal from the first electrode member and to detect proximity of an object.

19. The detection sensor of claim 15, wherein the first electrode member further includes a first connection portion electrically connecting two first sensing electrodes neighboring along the first direction among the plurality of first sensing electrodes, the second electrode member further includes a second connection portion electrically connecting two second sensing electrodes neighboring along the second direction among the plurality of second sensing electrodes and insulated from the first connection portion, the first conductive member further includes a first connection line connecting two first conductive patterns neighboring along the first direction among the plurality of first conductive patterns, the second conductive member further includes a second connection line connecting two second conductive patterns neighboring along the first direction among the plurality of second conductive patterns, the first connection line and the second connection line are formed of a first conductive layer, the first sensing electrode, the second sensing electrode, the first conductive pattern and the second conductive pattern are formed of a second conductive layer different from the first conductive layer, and any one of the first connection portion and the second connection portion is formed of the first conductive layer, and the other one of the first connection portion and the second connection portion is formed of the second conductive layer.

20. The detection sensor of claim 19, further comprising:

an edge conductive pattern in the second opening and spaced apart from the second conductive pattern, wherein the edge conductive pattern is formed of the second conductive layer.

21. The detection sensor of claim 19, an auxiliary pattern including a same material as the second conductive pattern, wherein the second conductive pattern further includes an auxiliary opening, and the auxiliary pattern is in the auxiliary opening and spaced apart from the second conductive pattern.

22. The detection sensor of claim 19, wherein the second sensing electrodes are arranged along the second direction and further include a connection pattern electrically connecting two second conductive patterns neighboring along the second direction, and the connection pattern is formed of a third conductive layer different from the first conductive layer and the second conductive layer.

23. The detection sensor of claim 22, further comprising:

an insulating layer on the base layer and between the first conductive layer and the second conductive layer; and an upper insulating layer on the insulating layer and between the second conductive layer and the third conductive layer, wherein the second conductive layer is between the first conductive layer and the third conductive layer.

24. The detection sensor of claim 19, wherein the first sensing electrodes are arranged along the second direction and further include a connection pattern electrically connecting two first conductive patterns neighboring along the second direction, and the connection pattern is formed of a third conductive layer different from the first conductive layer and the second conductive layer.

25. A display device, comprising:

a base substrate;

a self-light emitting element on the base substrate;

a thin film encapsulation layer on the self-light emitting element;

a first sensing electrode on the thin film encapsulation layer and including an opening;

a second sensing electrode on the thin film encapsulation layer and spaced apart from the first sensing electrode;

a conductive pattern in the opening and spaced apart from the first sensing electrode; and a sensor controller configured to detect a change of a mutual capacitance between the first sensing electrode and the second sensing electrode in a first mode and configured to detect a change of a mutual capacitance between the conductive pattern and the first sensing electrode in a second mode different from the first mode.

26. The display device of claim 25, wherein the sensor controller is configured to detect a touch in the first mode based on the change of the mutual capacitance between the first sensing electrode and the second sensing electrode, and is configured to detect proximity of an object in the second mode based on the change of the mutual capacitance between the conductive pattern and the first sensing electrode.

27. The display device of claim 25,
wherein the thin film encapsulation layer includes a first inorganic layer, an organic layer on the first inorganic layer, and a second inorganic layer on the organic layer, and
the first sensing electrode, the second sensing electrode, and the conductive pattern are on the second inorganic layer.

* * * * *